(12) United States Patent
Roy et al.

(10) Patent No.: US 11,795,638 B2
(45) Date of Patent: Oct. 24, 2023

(54) SAFETY TRUCK ATTACHMENTS, AND METHODS OF SAFETY TRUCK USE

(71) Applicant: ROYAL TRUCK & EQUIPMENT, INC., Coopersburg, PA (US)

(72) Inventors: Robert H Roy, Emmaus, PA (US); Andrew C Washburn, Coopersburg, PA (US); Joseph T Piggott, Easton, PA (US); Siddharth Balasubramanian, Allentown, PA (US)

(73) Assignee: Royal Truck & Equipment, Inc., Coopersburg, PA (US)

( * ) Notice: Subject to any disclaimer, the term of this patent is extended or adjusted under 35 U.S.C. 154(b) by 0 days.

(21) Appl. No.: 17/322,838

(22) Filed: May 17, 2021

(65) Prior Publication Data

US 2021/0269995 A1    Sep. 2, 2021

Related U.S. Application Data

(63) Continuation-in-part of application No. 16/896,776, filed on Jun. 9, 2020, now Pat. No. 11,408,138, and a continuation-in-part of application No. 16/427,242, filed on May 30, 2019, now Pat. No. 11,008,717, said application No. 16/896,776 is a continuation of application No. 16/159,813, filed on Oct. 15, 2018, now Pat. No. 10,801,169, said application No. 16/427,242 is a continuation-in-part of application No. 16/159,813, said application No. 16/159,813 is a continuation-in-part of application No. 16/132,376, (Continued)

(51) Int. Cl.
| | |
|---|---|
| E01F 9/70 | (2016.01) |
| B60R 11/06 | (2006.01) |
| B60R 21/02 | (2006.01) |
| B60P 3/14 | (2006.01) |
| B60R 21/00 | (2006.01) |

(52) U.S. Cl.
CPC .................. *E01F 9/70* (2016.02); *B60P 3/14* (2013.01); *B60R 11/06* (2013.01); *B60R 21/00* (2013.01); *B60R 21/02* (2013.01)

(58) Field of Classification Search
CPC .......... G09F 27/005; E01F 9/662; E01F 9/70; B60W 30/08; G08G 1/00
See application file for complete search history.

(56) References Cited

U.S. PATENT DOCUMENTS

| 6,183,042 B1 * | 2/2001 | Unrath | E01F 9/70 |
| | | | 296/183.1 |
| 6,364,400 B2 * | 4/2002 | Unrath | E01F 9/70 |
| | | | 296/25 |

(Continued)

*Primary Examiner* — Hoi C Lau
(74) *Attorney, Agent, or Firm* — Design IP

(57) ABSTRACT

Embodiments of safety trucks incorporate multiple connection points to which a variety of attachments, or combinations of attachments, can be releasably and interchangeably coupled to enable their use with increased effectiveness to safeguard roadway construction, maintenance and repair personnel as they perform tasks within or relatively near to roadway workzones and worksites. Also, methods of operation of the safety truck embodiments enhance their ability to guard and protect roadway construction, maintenance and repair personnel while they work within or relatively near to roadway workzone and worksite locations.

18 Claims, 49 Drawing Sheets

Related U.S. Application Data filed on Sep. 15, 2018, now Pat. No. 10,556,545, which is a continuation-in-part of application No. 15/913,562, filed on Mar. 6, 2018, now Pat. No. 10,319,227, which is a continuation-in-part of application No. 15/197,685, filed on Jun. 29, 2016, now abandoned.

(60) Provisional application No. 62/780,909, filed on Dec. 17, 2018, provisional application No. 62/638,818, filed on Mar. 5, 2018, provisional application No. 62/631,840, filed on Feb. 18, 2018, provisional application No. 62/186,036, filed on Jun. 29, 2015.

(56) References Cited

U.S. PATENT DOCUMENTS

| | | | | |
|---|---|---|---|---|
| 6,752,582 | B2* | 6/2004 | Garcia | E01F 9/654 |
| | | | | 414/467 |
| 8,653,988 | B2* | 2/2014 | Legare | G08G 1/0955 |
| | | | | 340/908 |
| 9,056,572 | B2* | 6/2015 | Hemphill | E01F 9/70 |
| 10,319,227 | B2* | 6/2019 | Roy | G08G 1/09 |
| 10,556,545 | B2* | 2/2020 | Roy | B60R 9/048 |
| 10,801,169 | B2* | 10/2020 | Roy | B60R 21/00 |
| 11,008,717 | B2* | 5/2021 | Roy | B62D 33/02 |
| 11,396,256 | B2* | 7/2022 | York | B66F 3/46 |
| 11,400,884 | B1* | 8/2022 | Maus | B60R 19/00 |
| 11,408,138 | B2* | 8/2022 | Roy | B60P 3/14 |
| 2001/0000120 | A1* | 4/2001 | Unrath | E01F 9/70 |
| | | | | 296/25 |
| 2004/0057822 | A1* | 3/2004 | Orthaus | E01F 9/70 |
| | | | | 414/539 |
| 2004/0057824 | A1* | 3/2004 | Orthaus | E01F 9/70 |
| | | | | 414/501 |
| 2006/0291957 | A1* | 12/2006 | Lidster | E01F 9/70 |
| | | | | 404/73 |
| 2009/0097914 | A1* | 4/2009 | Flynn | E01F 9/70 |
| | | | | 404/9 |
| 2009/0166998 | A1* | 7/2009 | Groeneweg | E01F 15/10 |
| | | | | 256/13.1 |
| 2011/0163517 | A1* | 7/2011 | Groeneweg | F41H 11/00 |
| | | | | 280/789 |
| 2011/0205085 | A1* | 8/2011 | Legare | E01F 9/662 |
| | | | | 340/908 |
| 2013/0156532 | A1* | 6/2013 | Hemphill | B60P 1/02 |
| | | | | 414/495 |
| 2017/0106780 | A1* | 4/2017 | Tovornik | B60P 3/14 |
| 2018/0261088 | A1* | 9/2018 | Roy | G08G 1/054 |
| 2019/0031111 | A1* | 1/2019 | Roy | B60R 9/048 |
| 2019/0048543 | A1* | 2/2019 | Roy | B60R 21/02 |
| 2019/0330811 | A1* | 10/2019 | Roy | E01F 9/70 |
| 2020/0276927 | A1* | 9/2020 | York | B66F 11/04 |
| 2020/0332484 | A1* | 10/2020 | Roy | E01F 9/662 |
| 2021/0269995 | A1* | 9/2021 | Roy | B62D 33/0207 |
| 2022/0380991 | A1* | 12/2022 | Roy | B60P 3/14 |

* cited by examiner

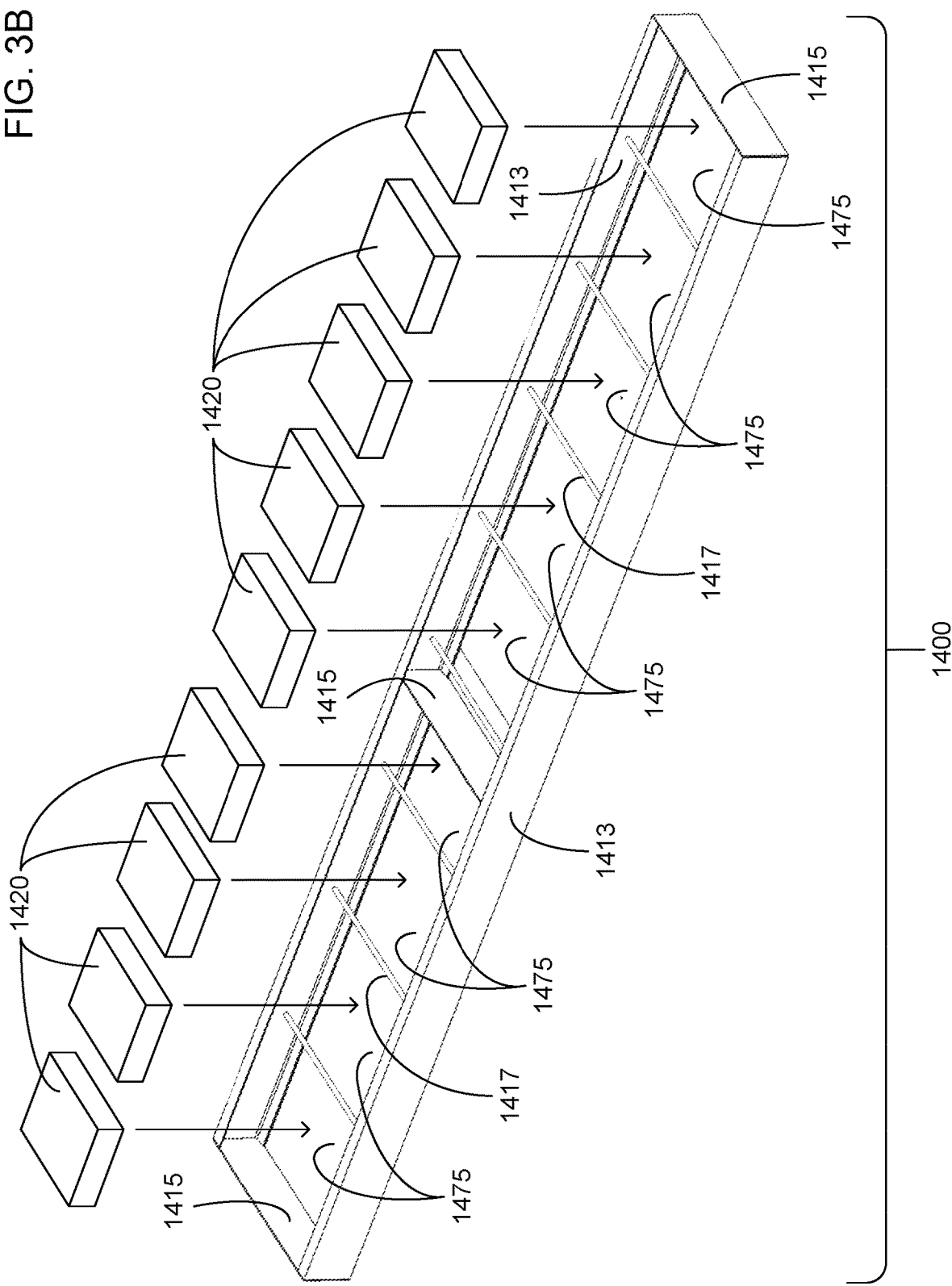

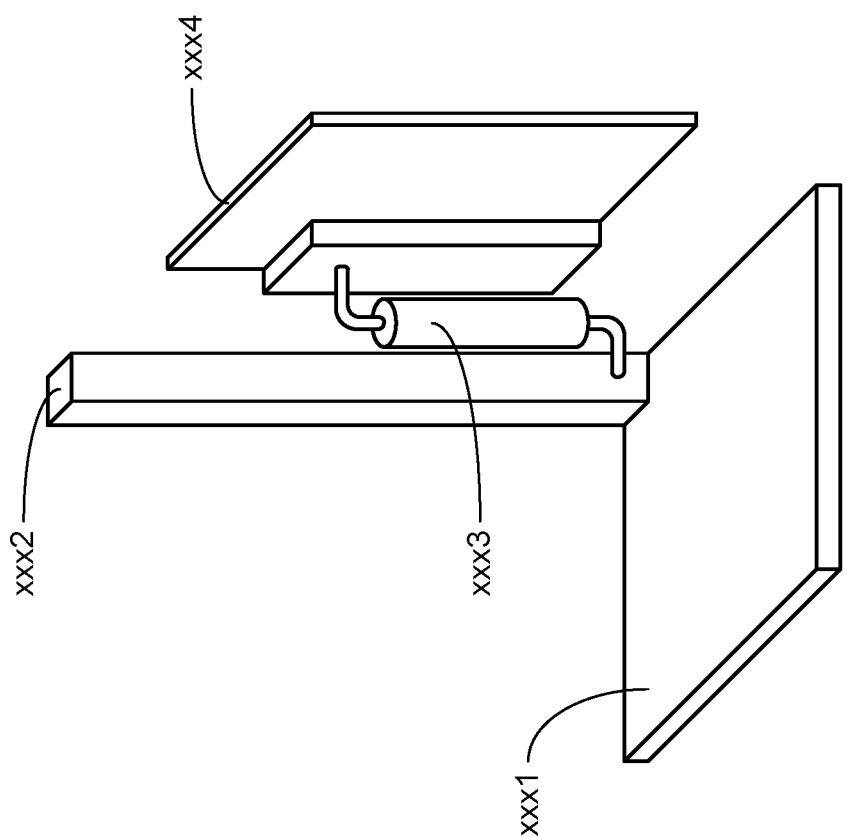

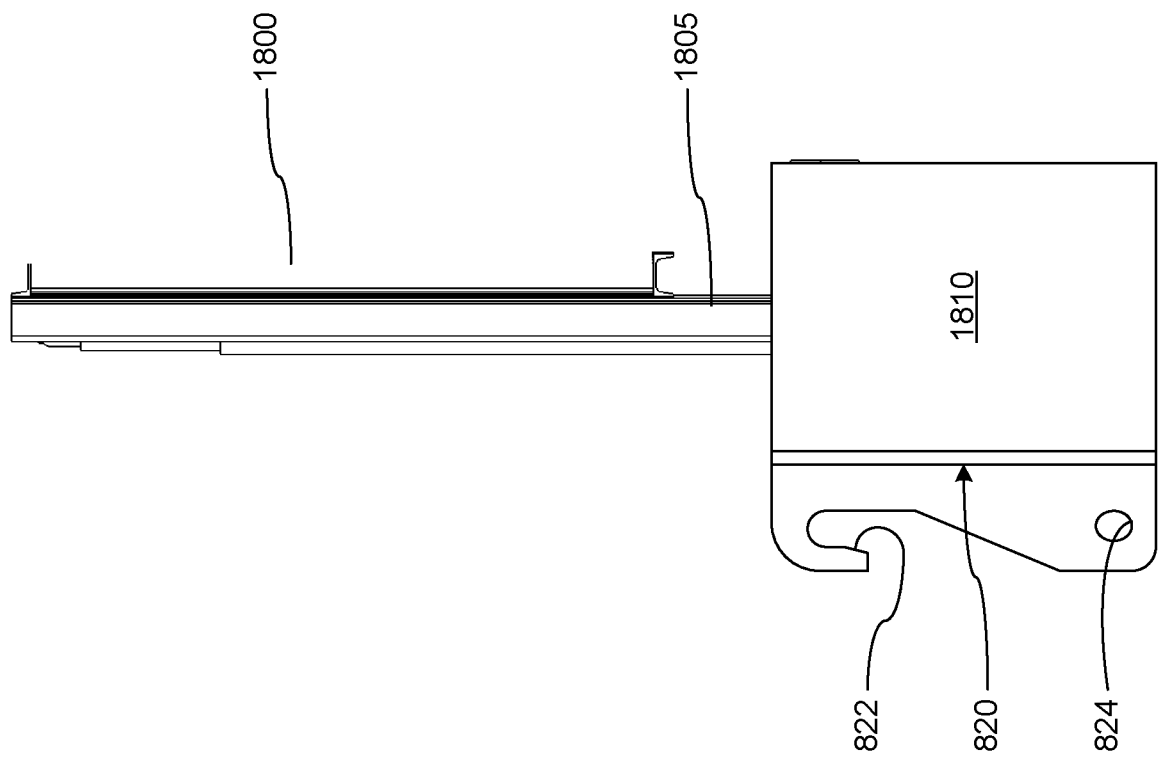

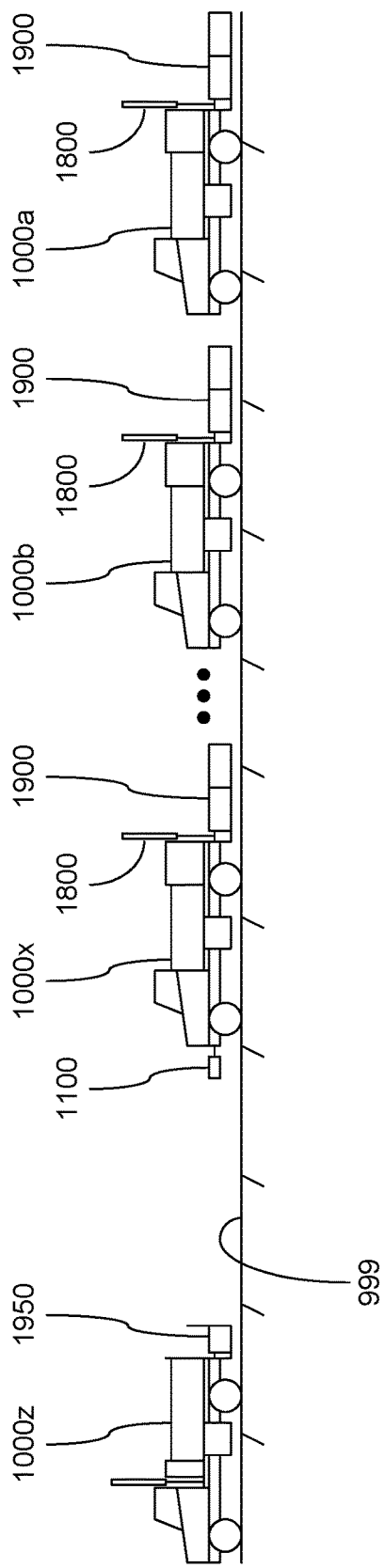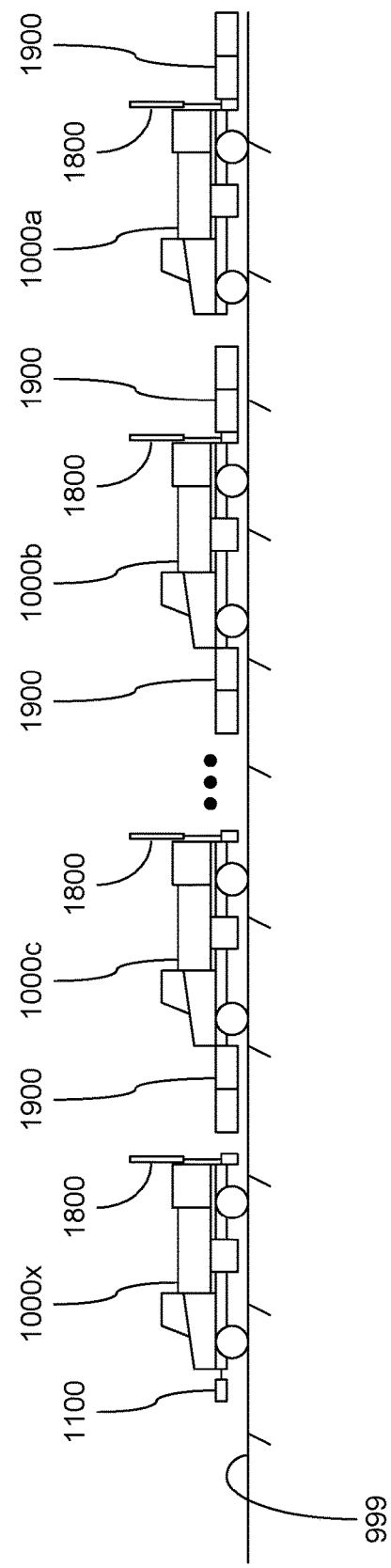

SAFETY TRUCK ATTACHMENTS, AND METHODS OF SAFETY TRUCK USE

REFERENCES TO RELATED APPLICATIONS

This Utility Application is a continuation-in-part of U.S. patent application Ser. No. 16/427,242 filed May 30, 2019; which is a continuation-in-part of U.S. patent application Ser. No. 16/159,813 filed Oct. 15, 2018 (since issued Oct. 13, 2020 as U.S. Pat. No. 10,801,169); which is a continuation-in-part of U.S. patent application Ser. No. 16/132,376 filed Sep. 15, 2018 (since issued Feb. 11, 2020 as U.S. Pat. No. 10,556,545); which is a continuation-in-part of U.S. patent application Ser. No. 15/913,562 filed Mar. 6, 2018 (since issued Jun. 11, 2019 as U.S. Pat. No. 10,319,227); which is a continuation-in-part of U.S. patent application Ser. No. 15/197,685 filed Jun. 29, 2016 (since abandoned); the disclosure of each of which is incorporated herein by reference in its entirety for all purposes.

U.S. patent application Ser. No. 16/427,242 also claims the benefit of the filing date of U.S. Provisional Application 62/780,909 filed Dec. 17, 2018, the disclosure of which is incorporated herein by reference in its entirety for all purposes.

U.S. patent application Ser. No. 15/913,562 (since issued Jun. 11, 2019 as U.S. Pat. No. 10,319,227) also claims the benefit of the filing dates of each of U.S. Provisional Application 62/638,818 filed Mar. 5, 2018, and U.S. Provisional Application 62/631,840 filed Feb. 18, 2018, the disclosure of each of which is incorporated herein by reference in its entirety for all purposes.

U.S. patent application Ser. No. 15/197,685 (since abandoned) also claims the benefit of the filing date of U.S. Provisional Application 62/186,036 filed Jun. 29, 2015, the disclosure of which is incorporated herein by reference in its entirety for all purposes.

U.S. patent application Ser. No. 16/896,776 filed Jun. 9, 2020, the disclosure of which is incorporated herein by reference in its entirety for all purposes, is a continuation of U.S. application Ser. No. 16/159,813.

FIELD OF THE INVENTION

The present invention relates to what have come to be known in the roadway construction, maintenance, and repair industry as "safety trucks" used to protect roadway construction, maintenance and repair personnel.

More particularity, the present invention relates to 1) new safety truck attachments, to 2) new connection points where attachments can releasably couple to safety trucks, and to 3) new methods of use of safety trucks to enhance the protection safety trucks can provide to roadway construction, maintenance and repair personnel working within and relatively near to roadway workzones and worksites.

In this document, the term "safety truck" almost always refers to the combination of a safety truck and towed Truck Mounted Attenuator (or TMA unit). Those who are skilled in the art understand that a TMA unit provides an associated safety truck with what amounts to a sacrificial crumple zone designed to incur a majority of the physical damage that would otherwise be inflicted on the associated safety truck due to a collision of another vehicle therewith.

Modern-day TMA units are designed and engineered to crumple in a controlled manner that 1) not only extends the period of the time during which an accidental impact with a TMA unit takes place, 2) but also diminishes the total magnitude of the resulting force exerted on a safety truck associated with the impacted TMA unit. Indeed, modern-day TMA units are often so well designed that they often succeed in reducing the severity of a highway speed accidental collision with a TMA unit to a level nearly on par with vehicle collisions occurring at lower speeds on residential roads.

The present invention not only recognizes, but also takes advantage of the fact that an accidental impact with a combination safety truck and TMA unit not only causes controlled crumpling of the TMA unit, but also often causes the impacted combination safety truck and TMA unit to roll forwardly for a considerable distance away from the original location of the impact. This tendency of a combination safety truck and TMA unit to roll forwardly from the original location of an impact sometimes causes a safety truck to invade the very same workzone or worksite that the combination safety truck and TMA unit was intended to protect. Accordingly, attempting to use ONLY A SINGLE combination safety truck and TMA unit to protect a workzone or worksite is often not a proper solution to protecting a workzone or worksite.

The present invention takes into account and makes use of the roll forward tendency of impacted combination safety trucks and TMA units by providing a new method of safety truck use that calls for the use of a PLURALITY of combination safety truck and TMA units arranged in spaced relationship to protect each workzone or worksite.

The present invention also urges the addition of weights to selected ones of the spaced-apart safety trucks to thereby increase truck mass (and hence the inertia of weighted safety trucks), to diminish the total distance traveled by the spaced-apart combination safety truck and TMA units when they roll forwardly in response to an accidental impact of a roadway vehicle with the rearmost TMA unit of the spaced-apart combination safety trucks and TMA units.

BACKGROUND OF THE INVENTION

As is explained in introductory portions of the patent applications listed in the foregoing Sections A), B) and C) of this document, when maintenance, repair and/or new construction work is to be performed on portions of busy roadways, the important goal of diminishing and preventing injury-causing accidents to roadway workers, roadway vehicles, construction vehicles, construction machinery and the like often renders it desirable to completely close lengthy reaches of the roadway that is to be repaired, rebuilt or reconstructed. Certainly it is sensible to close at least the roadway reaches where active workzones and worksites are to be located.

Unfortunately, the closing of even a short reach of a busy roadway is often deemed to be impractical, or even impossible—which may require that roadway maintenance, repair and new construction work must be undertaken quite near to, or even alongside where vehicular traffic must be maintained, or must frequently be permitted to flow.

The proximity of maintained flows of traffic to the locations of active workzones and worksites opens the door to instances wherein vehicular traffic may accidentally collide with construction vehicles, construction equipment and/or construction personnel as a result of impatient, distracted, sleep-deprived, intoxicated and/or otherwise impaired motorists who may drive adjacent roadway workzones and worksites, sometimes unnecessarily close to where roadway personnel are performing their work and/or at unnecessarily high speeds.

Various prior art measures have been undertaken to mitigate the dangers and likelihood of injury and death to roadway construction, maintenance and repair personnel. Such measures have included scheduling work during night hours and at other times when traffic volumes are low; imposing reduced speed limits accompanied by stiff fines for speed limit violations; posting brightly colored workzone warning signage together with the use of heavy concrete protective barriers; and the strategic positioning of police vehicles with flashing lights near and adjacent to roadway workzones and worksites.

Advisory signs have often been positioned to warn motorists as they begin to approach the locations of roadway workzones and worksites, with the signs also advising of the times when roadway work is, or will be active. Such measures are typically intended to encourage motorists to slow down as they drive along roadway portions near and adjacent to the locations of active roadway workzones and worksites, to diligently watch for developing dangers, and to be prepared to respond appropriately when developing dangers are noted.

To provide sufficient advance notice to motorists that they are approaching roadway workzones and worksites, and to protect roadway construction, maintenance and repair personnel who work in and relatively near to roadway workzones and worksites, warning signage and safety barriers typically need to be placed as far back as at least a mile or two, or more, before motorists reach the locations of active roadway workzones and worksites.

A significant problem associated with the task of providing adequate warning signage and safety barriers, is the substantial set-up time and manpower required to accomplish these tasks—which takes away from the time and manpower needed to perform actual roadway repair and construction work.

Still another problem associated with the advanced placement of warning signage and safety barriers has to do with the fact that the active work within many roadway workzones and worksites does not remain stationary, but rather is of a "rolling nature." As active repair and/or construction work within an initial length of a roadway workzone or worksite is completed, the location of active work within the roadway workzone or worksite often moves progressively forwardly along the associated roadway.

Accordingly, warning signage and safety barriers often need to be mounted on vehicles that can move forwardly as the active areas within workzones and worksites move forwardly as work is completed within a succession of portions of the workzones and worksites.

Despite the many efforts that always are made to eliminate workzone and worksite dangers, serious accidents still occur each year when impatient, inattentive and/or impaired motorists fail to take notice of, and/or fail to respond appropriately when in the vicinity of roadway workzones and worksites, thereby causing their vehicles often traveling a highway speeds to barrel into roadway workzones and worksites, where the high kinetic energy of their invading vehicles frequently causes deaths and devastating injuries to roadway construction, maintenance and repair personnel.

The present invention provides new methods of use of safety trucks that protect roadway workzones and worksites.

SUMMARY OF THE INVENTION

The present invention addresses the foregoing and other drawbacks of the prior art by providing both methods and apparatus designed to enhance the protection provided by safety trucks to roadway construction, maintenance and repair personnel working in and near roadway workzones and worksites.

More particularly, the present invention improves the protection that can be provided by safety trucks to personnel working within and near to roadway workzones and worksites by providing not only 1) new methods of safety truck use, but also 2) more than a dozen new attachments for safety trucks, and 3) many new connection points where the new attachments can be interchangeably coupled to safety trucks.

As a direct result of the utilization of the inventive subject matter summarized above, the present invention enhances and improves how safety trucks and their attachments are used to guard and protect roadway construction, maintenance and repair personnel who work at locations within and relatively near to roadway workzones and worksites.

BRIEF DESCRIPTIONS OF THE DRAWINGS

A fuller understanding of the invention disclosed herein, as well as other features and advantages of the present invention may be had by referring to the description and claims that follow, taken together with the accompanying drawings, wherein:

FIG. 1A is a front and right side perspective view of a first embodiment of a combination flatbed safety truck and TMA unit that is provided with forwardmost connection point, with an over-cab rack attachment coupled atop bulkhead connection points, with the view also showing a generator-compartment connection point that can contain an auxiliary electric generator attachment for supplying auxiliary electrical power to the safety truck and its attachments, and with the view also showing a relatively wide man basket attachment installed in an inset located along the right side of the flat bed of the truck, with a rear region of the flatbed supporting a rear sign cage attachment atop a rear flatbed connection point, with the safety truck shown towing a rearwardly extending TMA unit attachment for attenuating the kinetic energy of such roadway vehicles as may accidentally crash into the TMA unit;

FIG. 1B is a left side elevational view of another combination safety truck and TMA unit embodiment carrying an over-cab rack attachment for traffic delineators, with a connection point compartment being provided beneath the flatbed for carrying an auxiliary electrical generator attachment, with a rear region of the flatbed shown carrying a rear sign cage attachment, and with a display board attachment connected to the rear of the truck and shown in a raised, and deployed state, with the TMA unit extending rearwardly from the truck in the deployed state as is also shown in FIG. 1A;

FIG. 1C is a front and right side perspective view from above of another combination safety truck and TMA unit embodiment having an upstanding bulkhead separating the cab of the truck from the truck's flatbed, with two flat members atop the bulkhead providing dual bulkhead connection points that can support upstanding rear members of the over-cab rack as is shown in FIGS. 1A, 1B and 1E, with the truck having relatively wide man basket attachments installed in insets along opposite left and right sides of the truck's flatbed, with a rear sign cage attachment supported atop a rear region of the truck's flatbed, with a rear-mounted display board attachment shown lowered to a stowed position, and with the TMA unit shown folded upwardly and forwardly in its transport position;

FIG. 1D is a left side elevational view of another combination safety truck and TMA unit embodiment, with a wide man basket attachment shown midway along the flatbed of the truck, with a rear sign cage attachment supported atop a rear region of the flatbed, with a rear-mounted display board attachment shown lowered to a stowed position, and with the TMA unit shown folded upwardly and forwardly for transport;

FIG. 1E is a left side elevational view of another combination safety truck and TMA unit embodiment that includes the over-cab rack for traffic delineators, a connection point compartment for an auxiliary electrical generator attachment, a new form of man basket attachment that can be raised and lowered as needed, with this safety truck embodiment also being provided with a rear sign cage attachment carried atop a rear connection point region of the flatbed, with the display board attachment shown in FIG. 1D raised to a deployed position, with several camera and speed detection radar attachments connected to parts of the safety truck and its attachments, and with the TMA unit unfolded and extending rearwardly from the truck as is shown in FIGS. 1A and 1B;

FIG. 1F is a rear and left side perspective view from above showing yet another safety truck embodiment provided with an arrow board attachment shown in a raised, operational position at a location between the cab and an upstanding bulkhead that closes an open front of a forward sign cage attachment carried by a front region of the flatbed, with a pair of relatively narrow man baskets installed in insets along opposite sides of the truck's flat bed, and with a safety basket attachment connected to a heavy duty rear connection point of the safety truck, and with the safety basket attachment defining another connection point that opens rearwardly;

FIG. 1G is a left side elevational view of the safety truck embodiment shown in FIG. 1F;

FIG. 1H is a perspective view showing the left side and the rear of another safety truck embodiment having an arrow board in its lowered, stowed position, having a generator compartment defining a connection point beneath where a forward sign cage attachment is carried atop a front region of the truck's flatbed, with dual narrow man basket attachments carried in insets along opposite left and right sides of the flat bed, and with a step bumper attachment connected to the truck's rear that defines another connection point that opens rearwardly;

FIG. 1I is a left side elevational view of yet another combination safety truck and TMA unit embodiment which has a rear sign cage attachment atop a rear flatbed connection point, with the same type of man basket attachment shown in FIG. 1E installed in an inset along the left side of the safety truck, with camera and radar speed detection attachments mounted on connection points atop a bulkhead of the truck and between upwardly and forwardly folded sections of the truck's TMA unit attachment which is connected to the truck's rear, and shown folded upwardly and forwardly to its stowed position for transport;

FIG. 3B is a perspective view of a weight frame attachment that can be installed atop the channel members shown in FIG. 3A, with the weight frame attachment defining a series of compartments into which the depicted weights can be inserted;

Figure 3A:
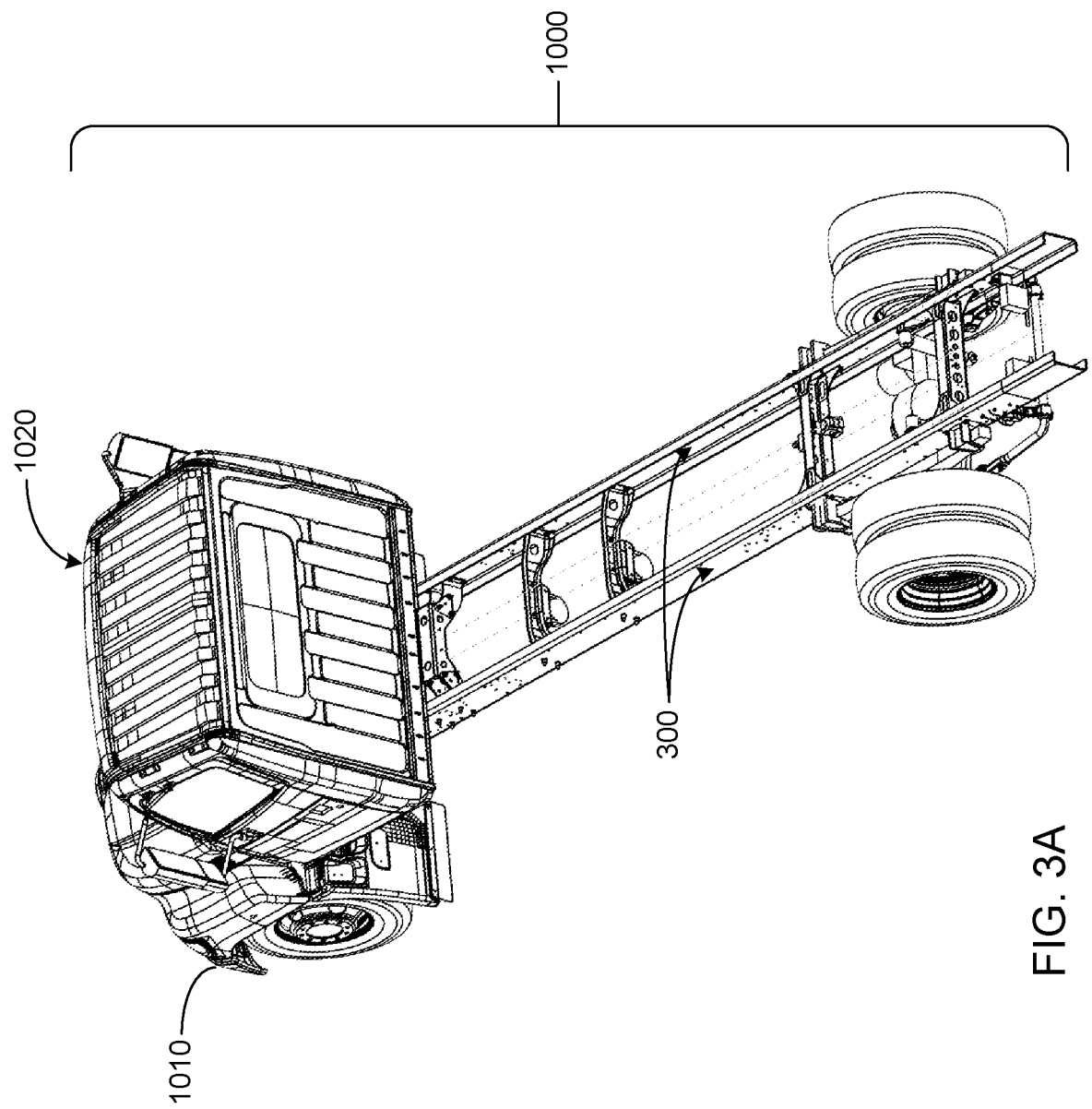
FIG. 3A is a rear and left side perspective view from above showing the cab of a safety truck together with a pair of elongate, horizontally extending channel members of a frame of the safety truck that underlie and extend rearwardly from the cab of a safety truck for overlying a rear axle assembly of the safety truck.
Figure 6A:
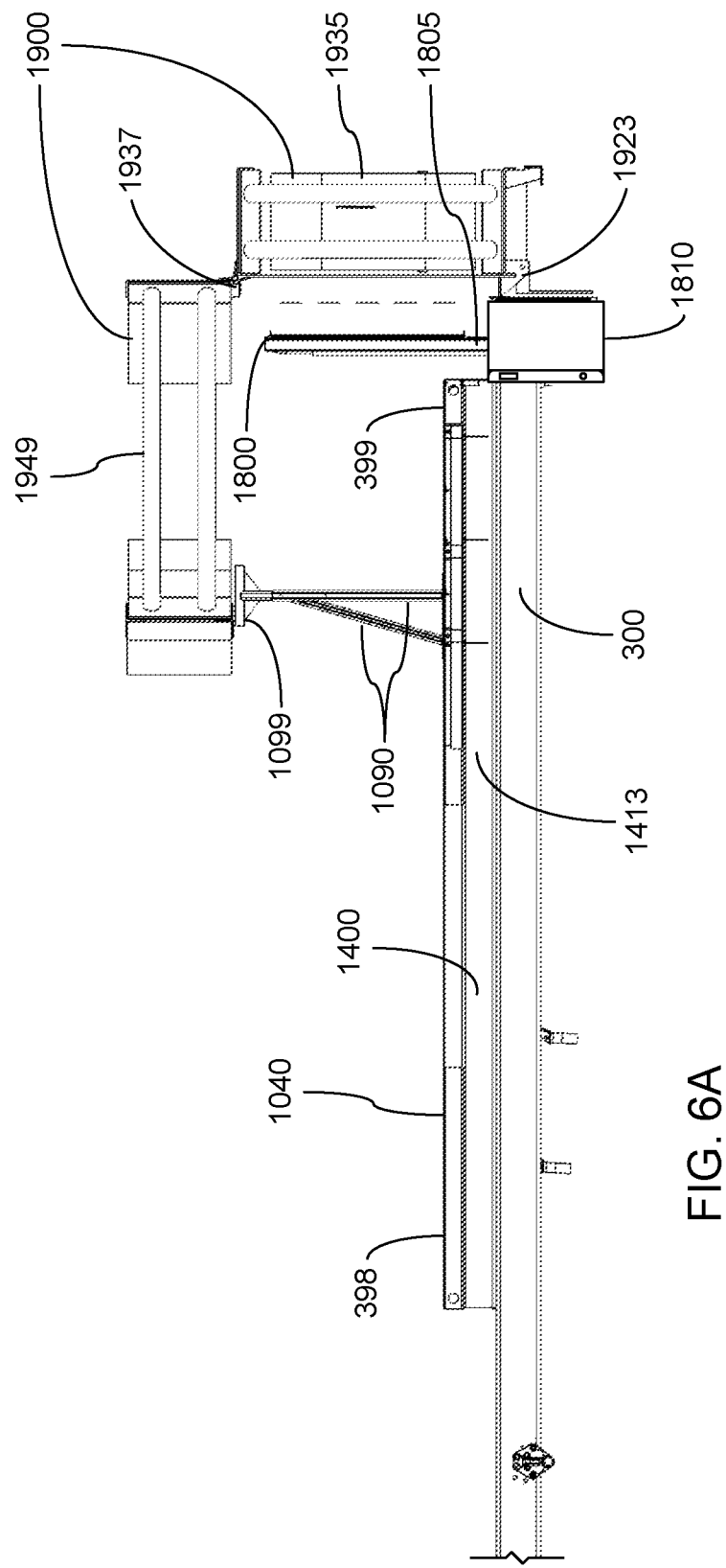

FIG. 6A is a left side elevational view of the pair of elongate channel members of the frame of a safety truck shown in FIG. 3A that underlie and support the weight frame attachment shown in FIG. 3B, with a display board attachment and a TMA unit attachment connected to the a heavy duty rear connection point at the rear of the channel members, with the TMA unit attachment folded upwardly and forwardly to a transport position where a portion of the TMA unit rests atop a support that connects to the top of a safety truck's flatbed.

Figure 1A:
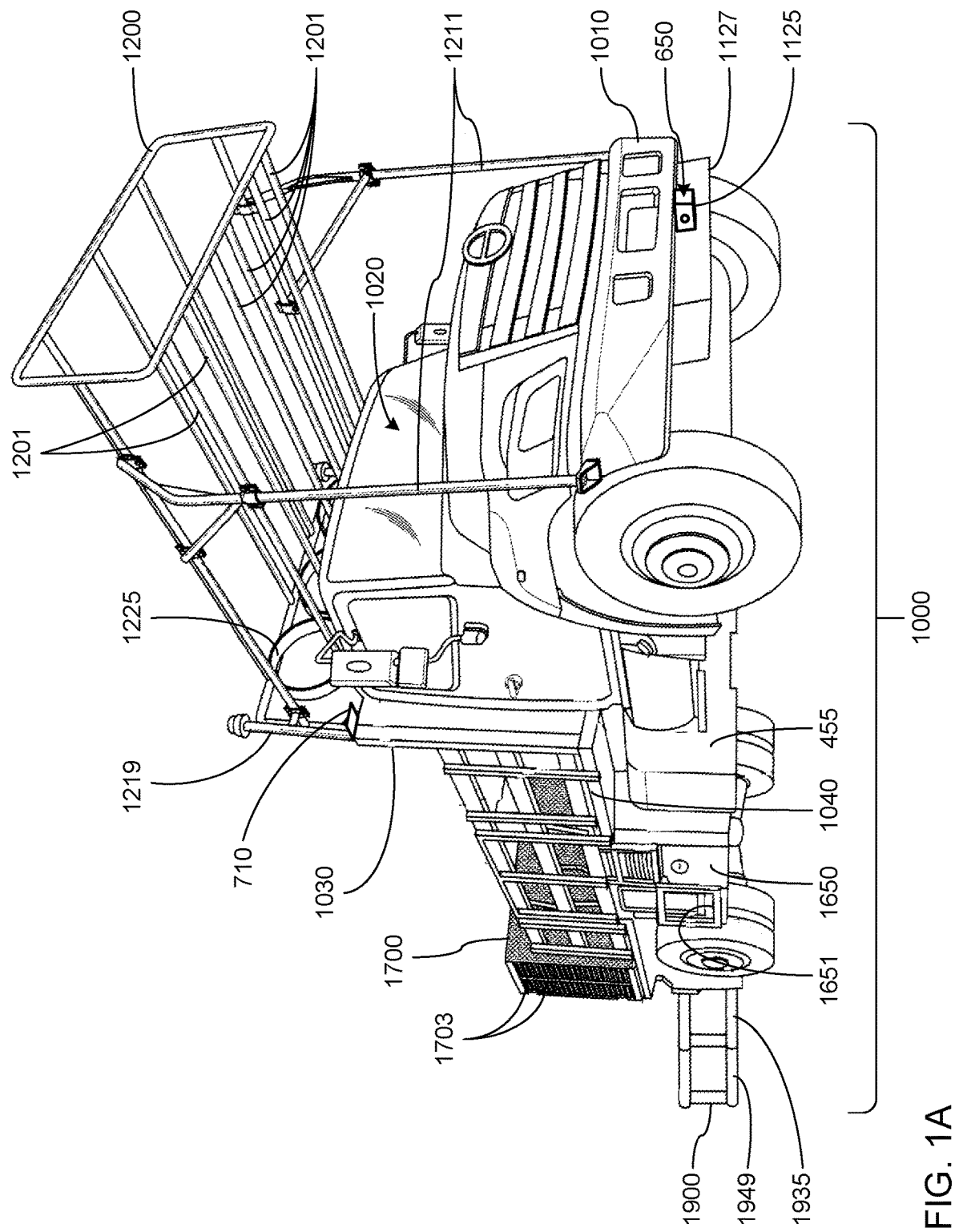
FIG. 1J is a perspective view of the over-cab rack attachment for transporting traffic delineators, which rack attachment is shown connected to front fenders and to upstanding bulkheads of safety trucks in FIGS. 1A, 1B, 1E.
FIG. 1K is a perspective view on an enlarged scale of portions of one of the three side-by-side delineator racks provided by the over-cab rack shown in FIG. 1J, with portions of two traffic delineators shown atop the one depicted rack portion.
Figure 1B:
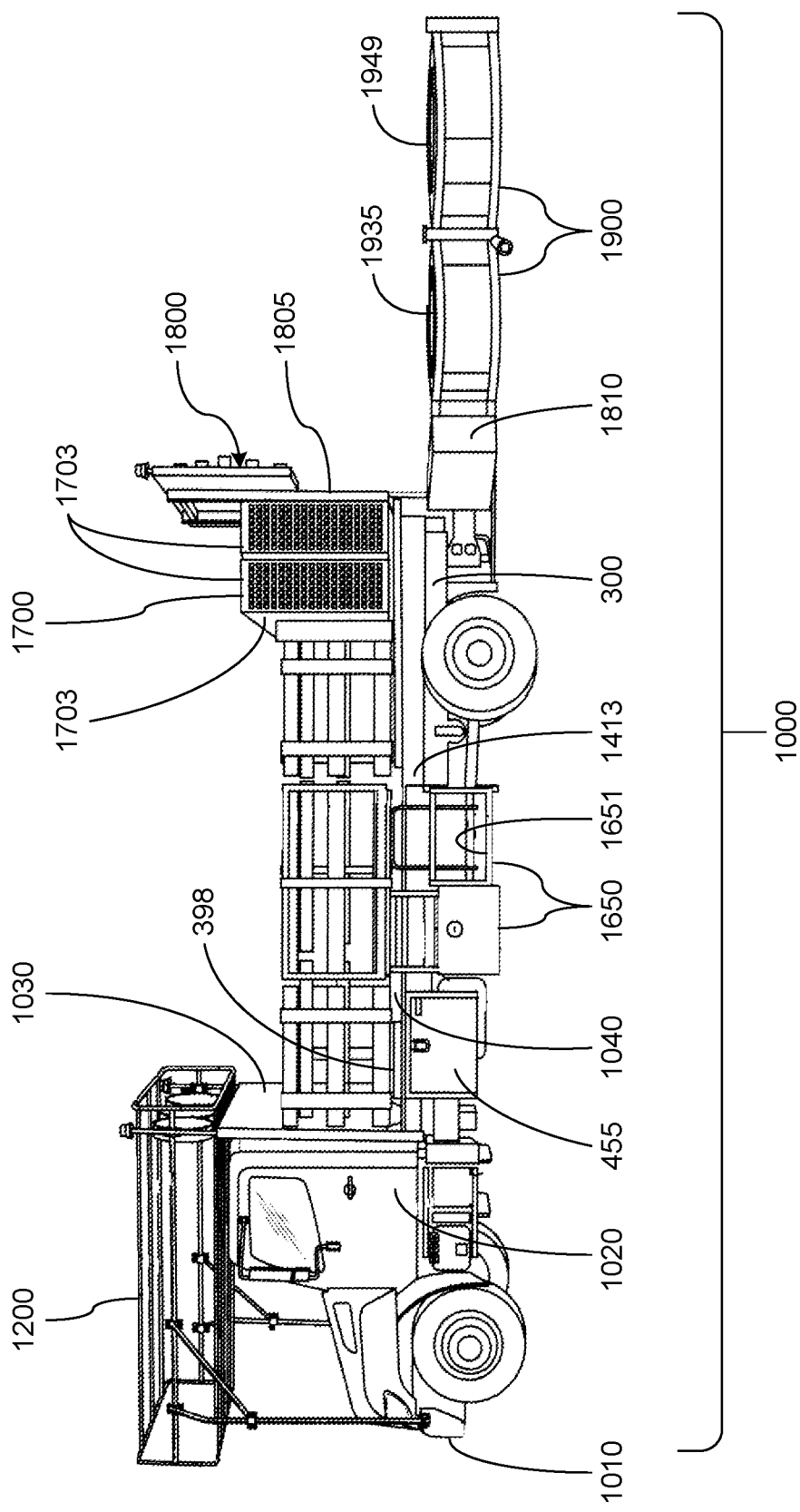
Figure 1C:
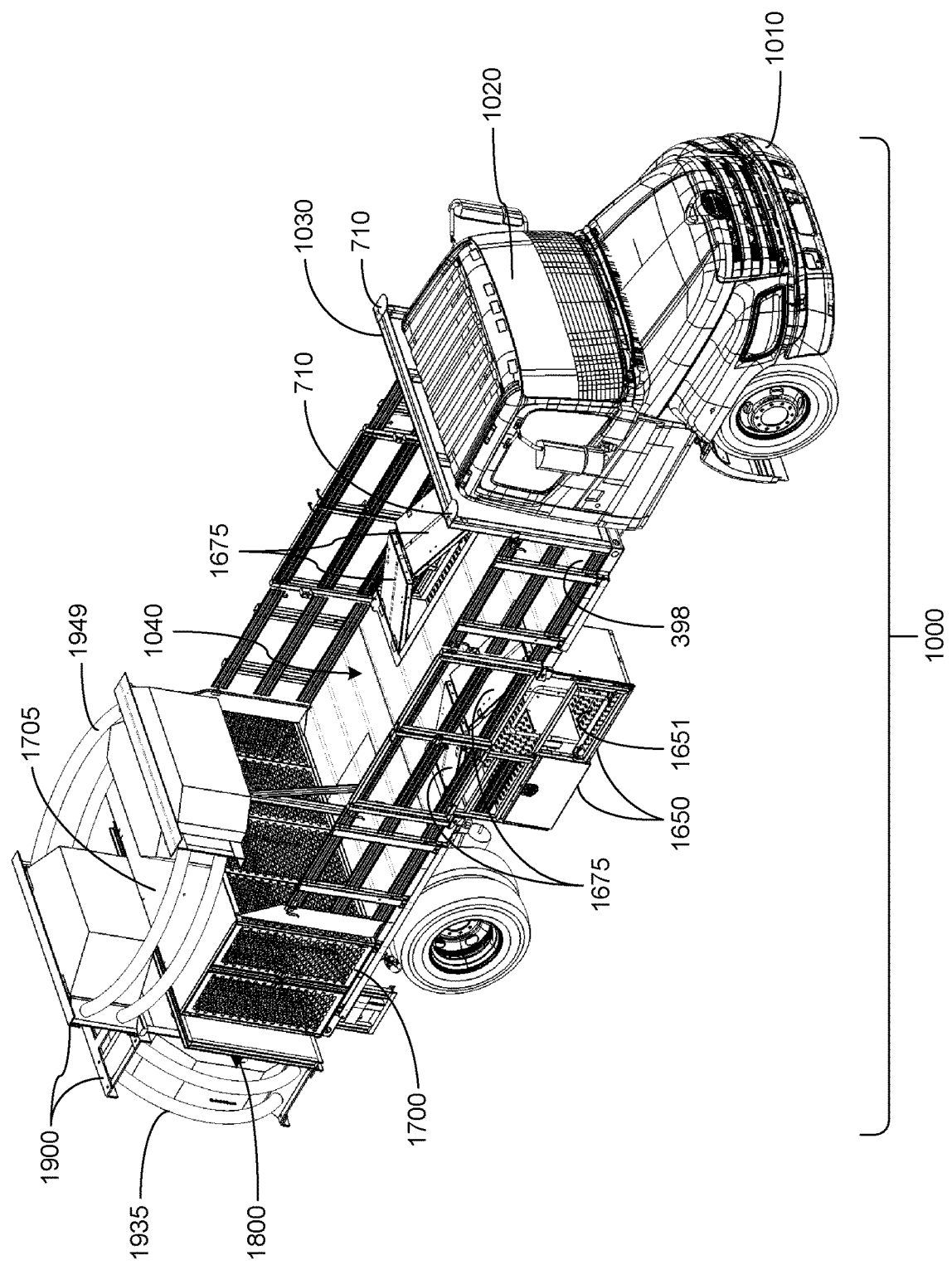
Figure 1D:
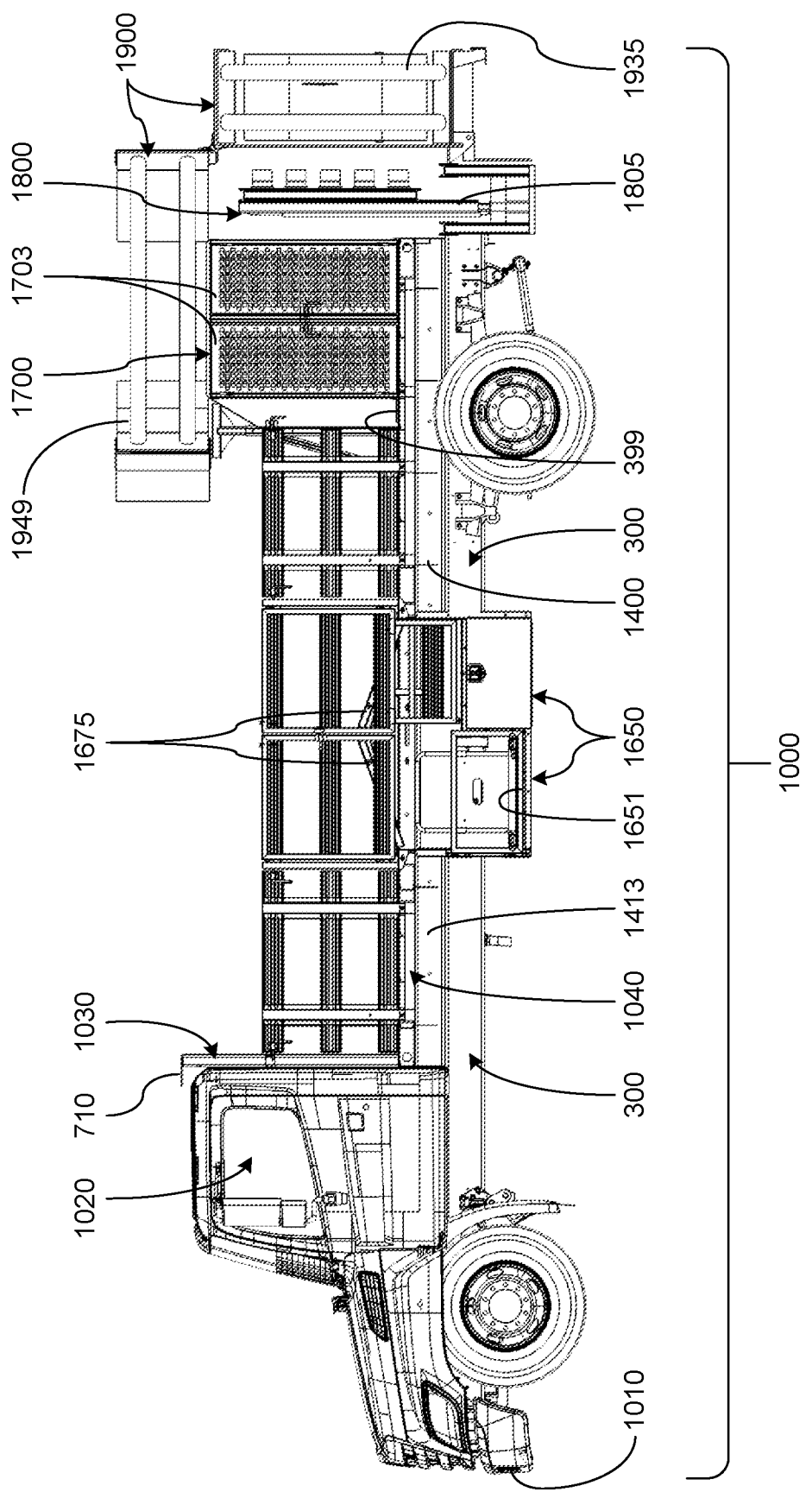
Figure 1E:
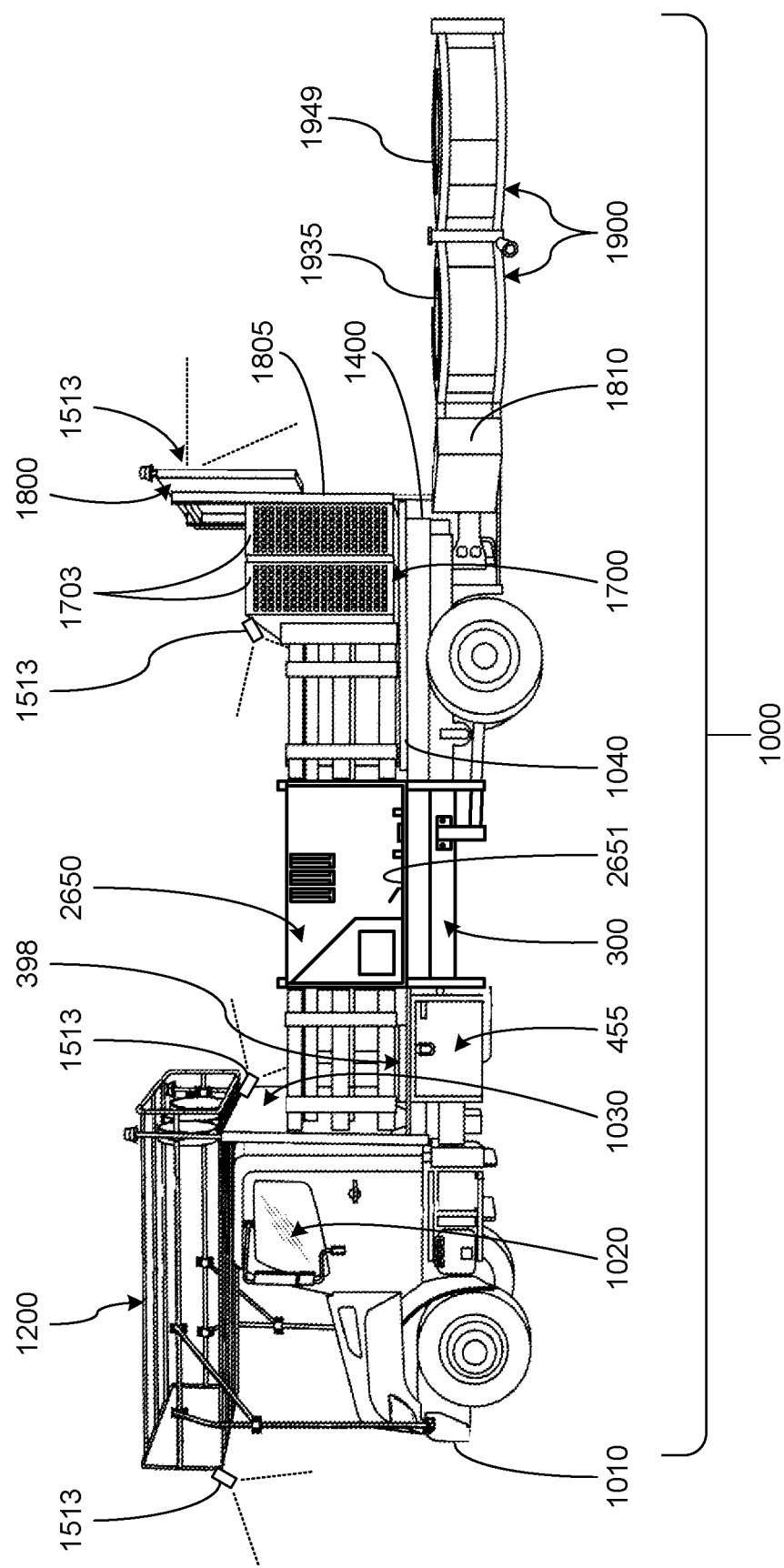
Figure 1F:
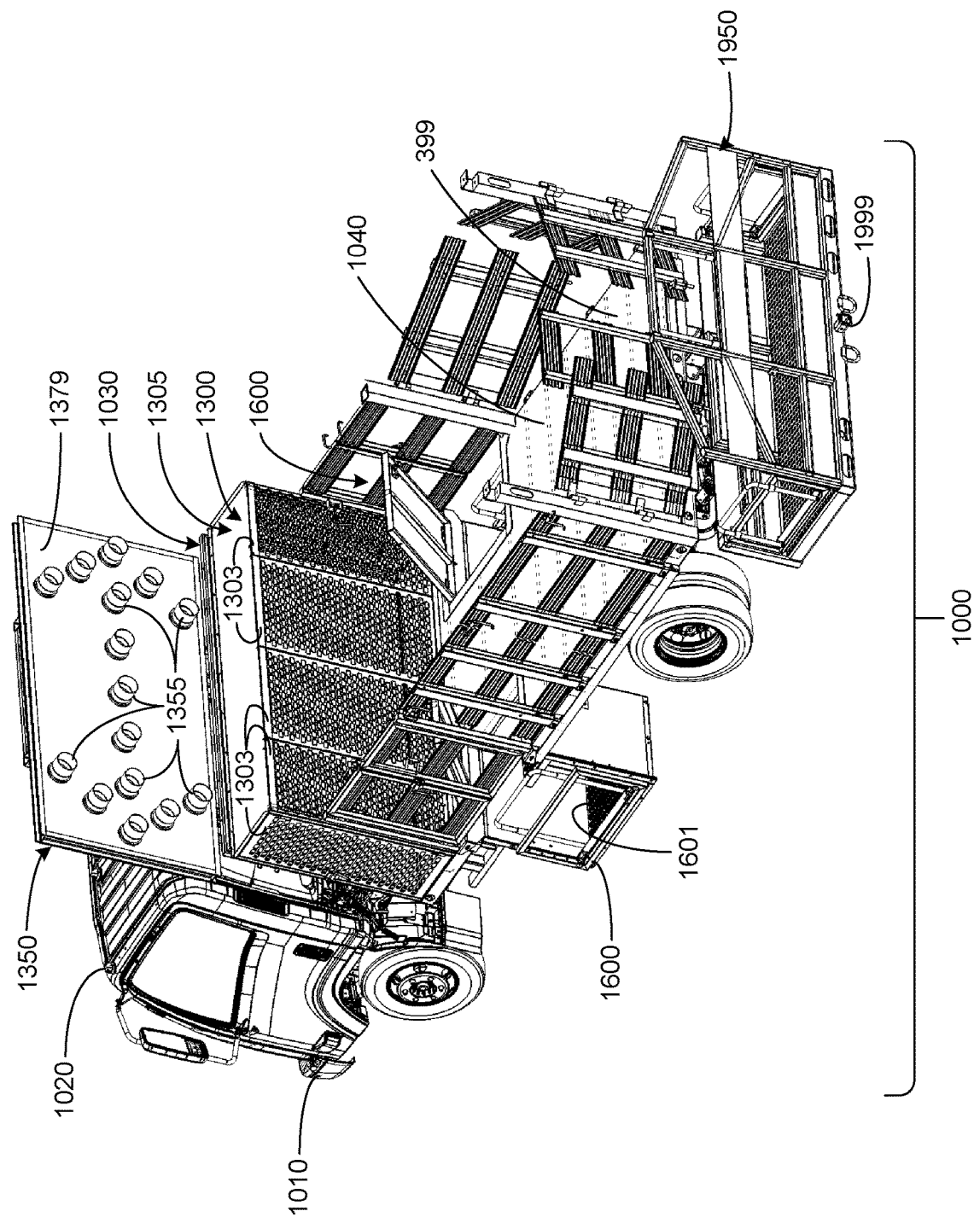
Figure 1G:
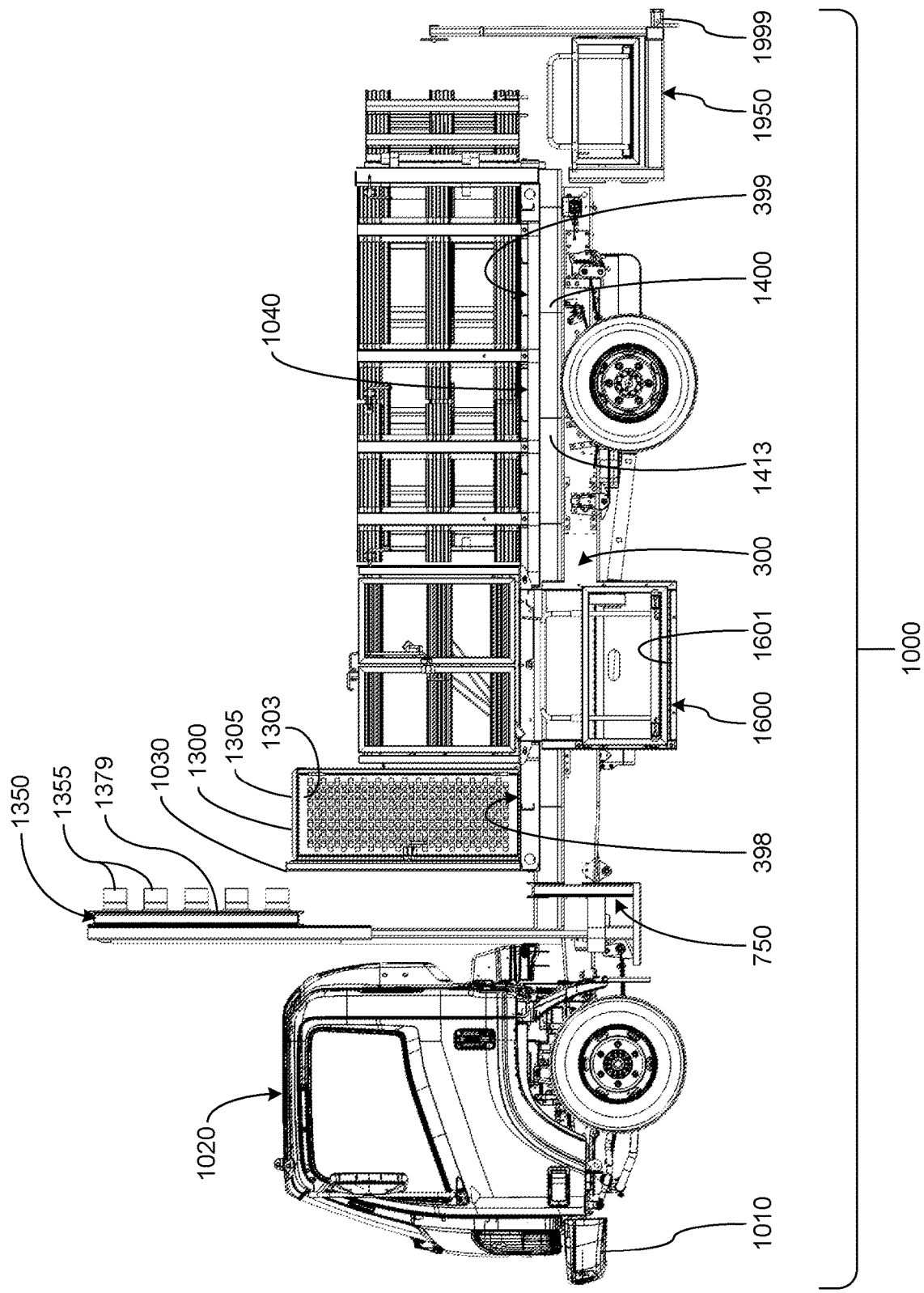
Figure 1H:
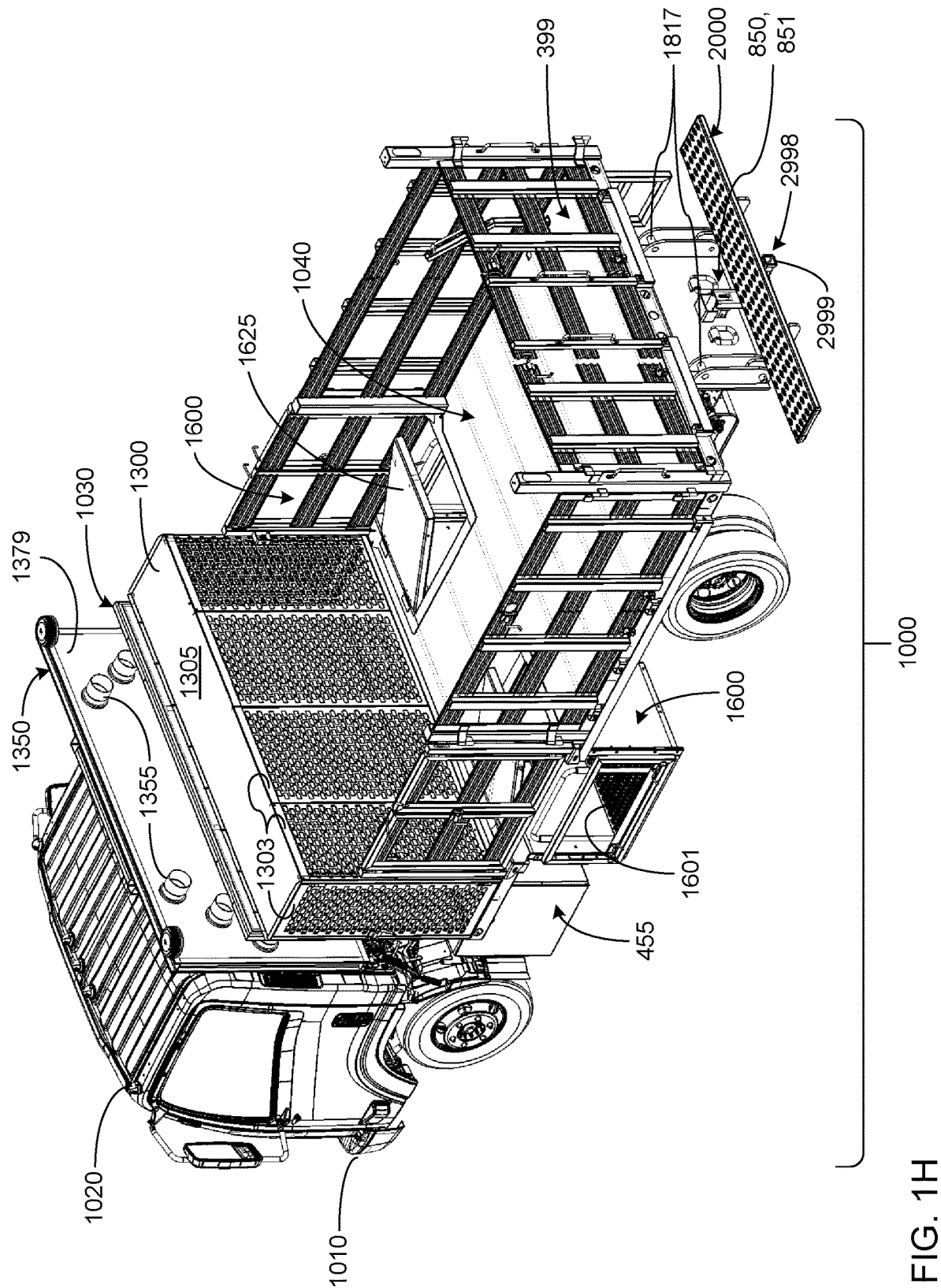
Figure 1I:
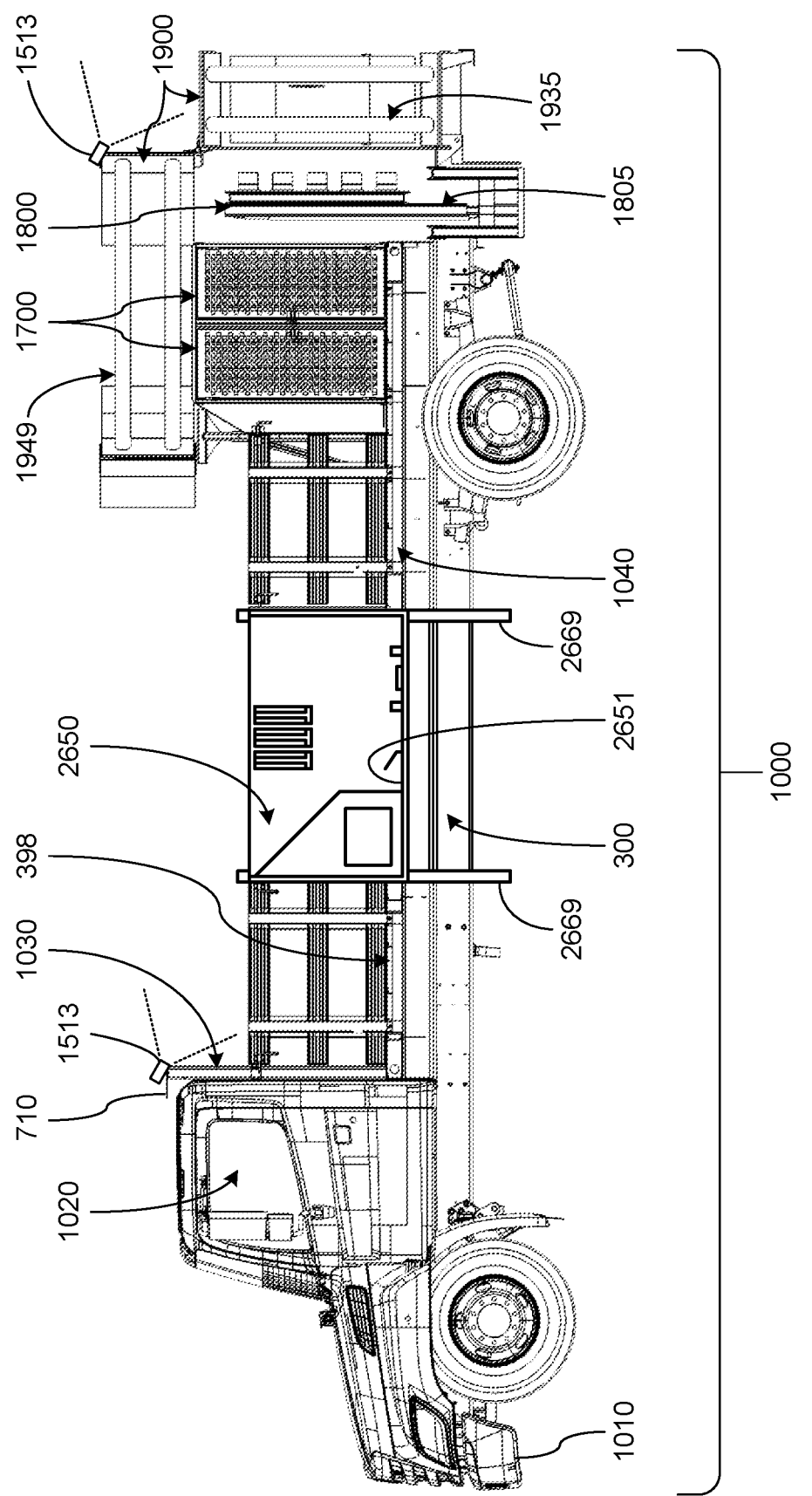
Figure 6C:
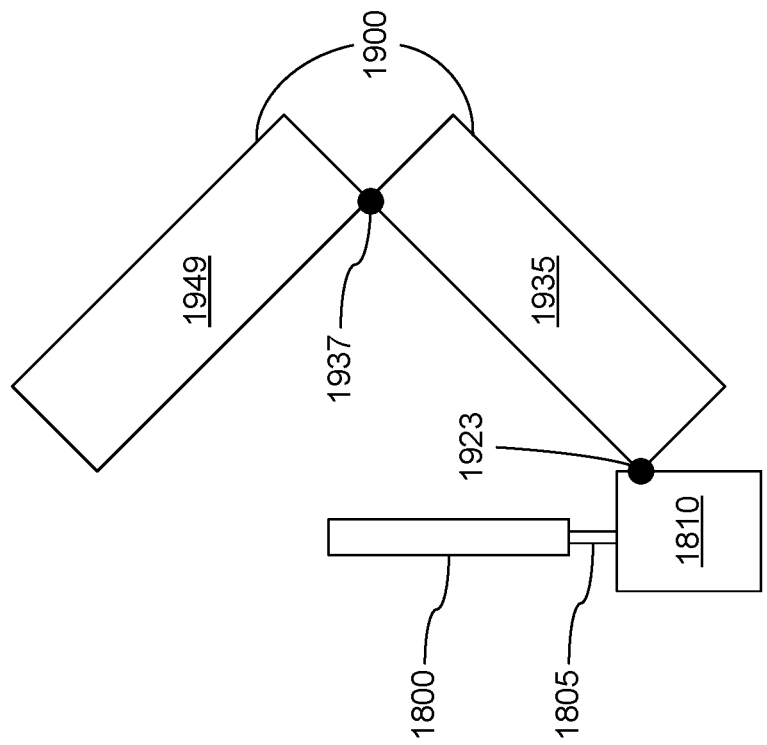
Figure 6B:
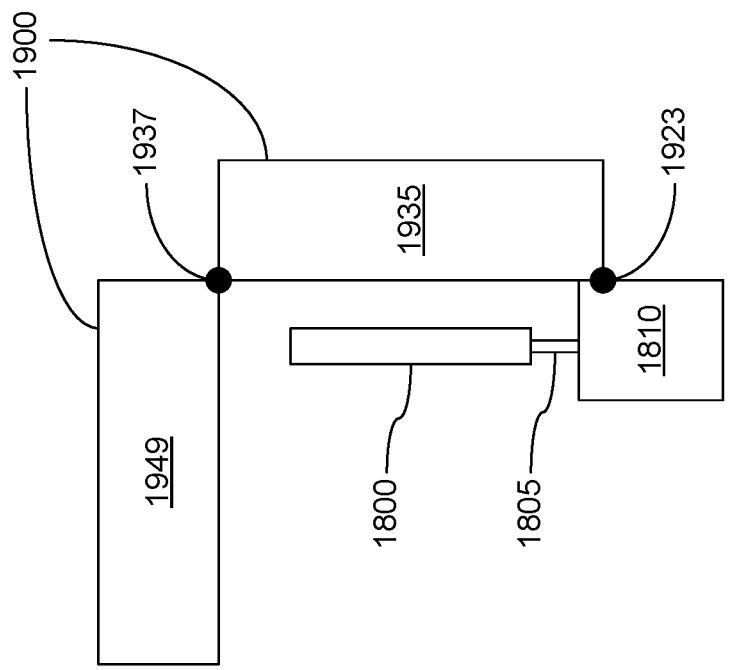
Figure 6D:
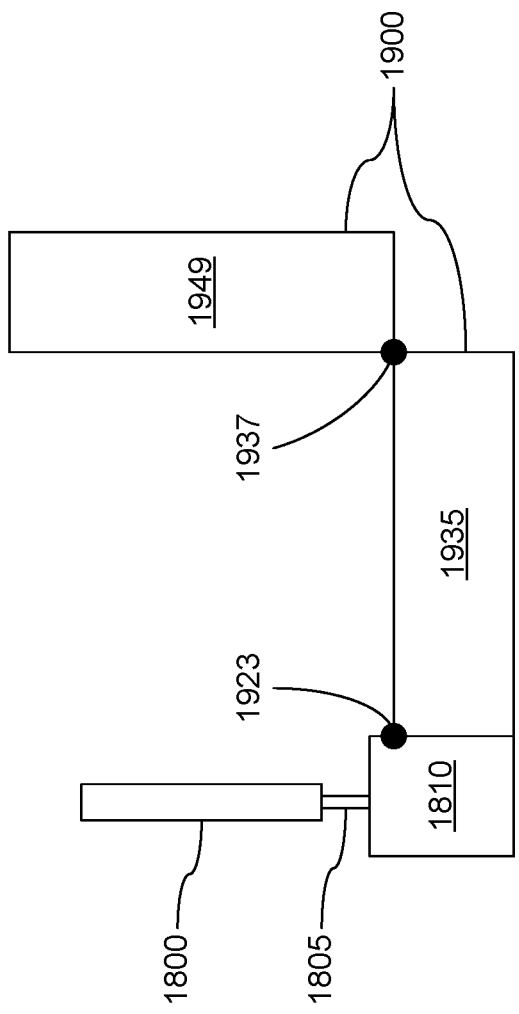
Figure 6E:
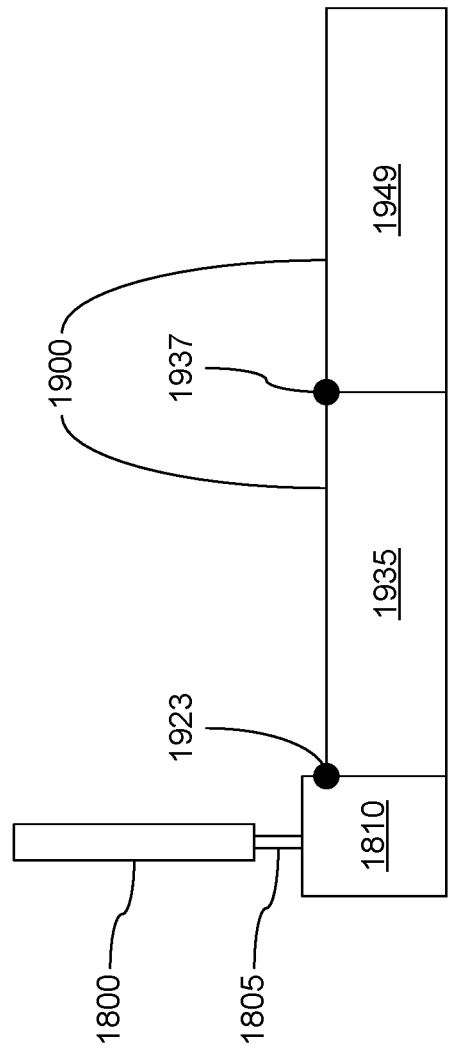
Figure 7A:
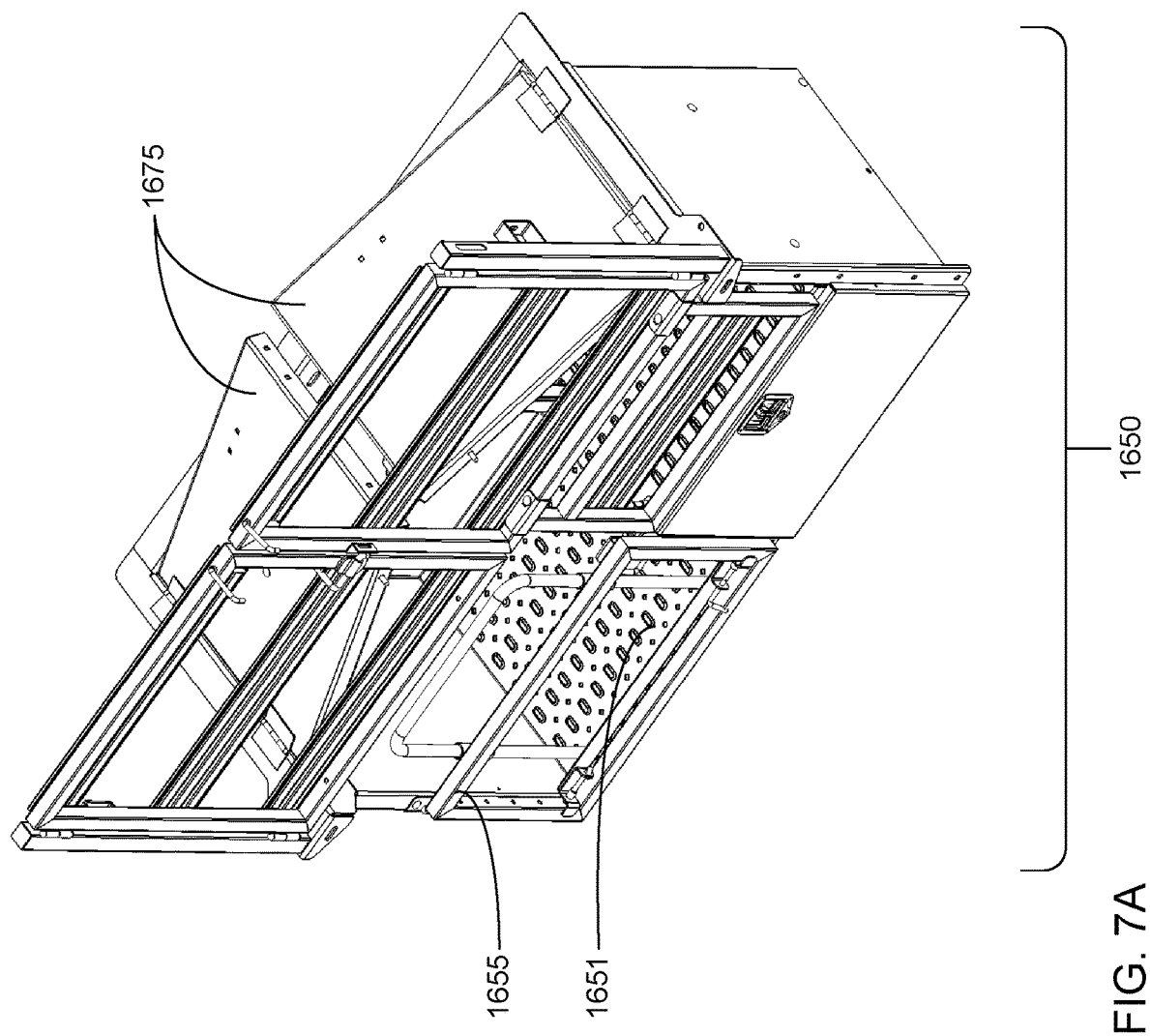
Figure 7B:
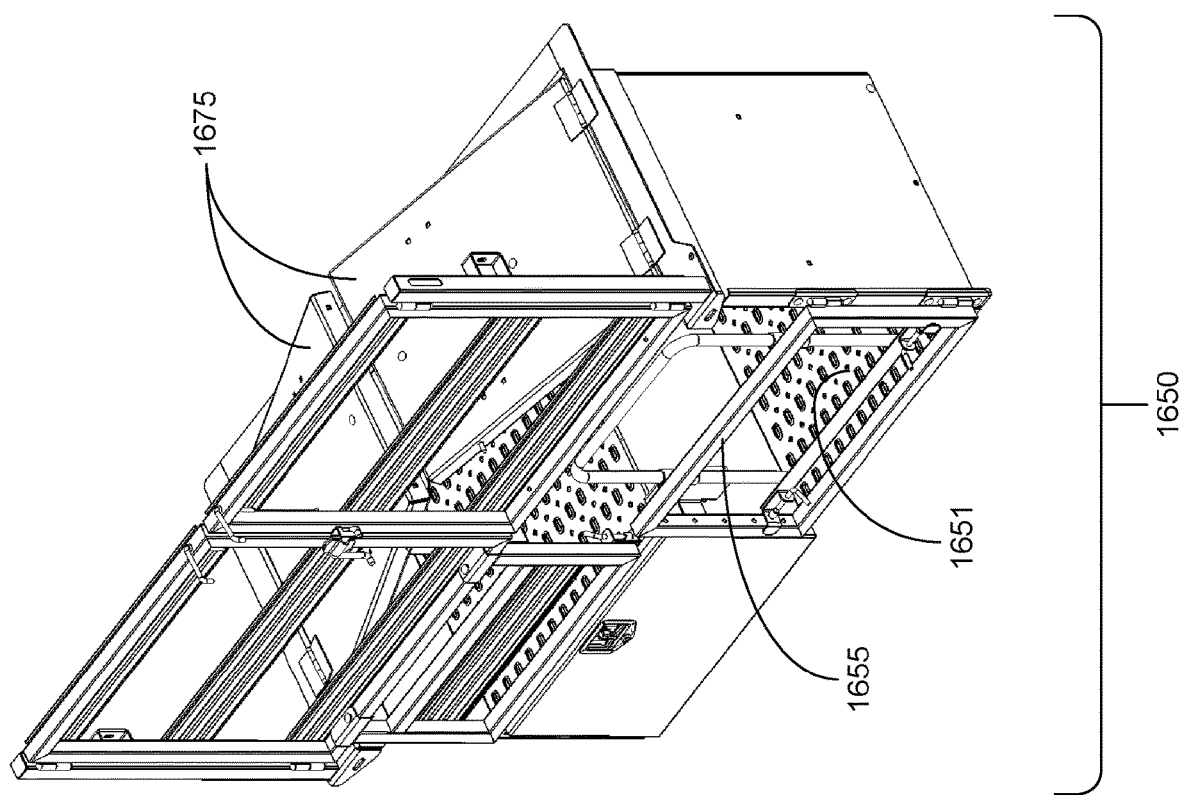
Figure 7C:
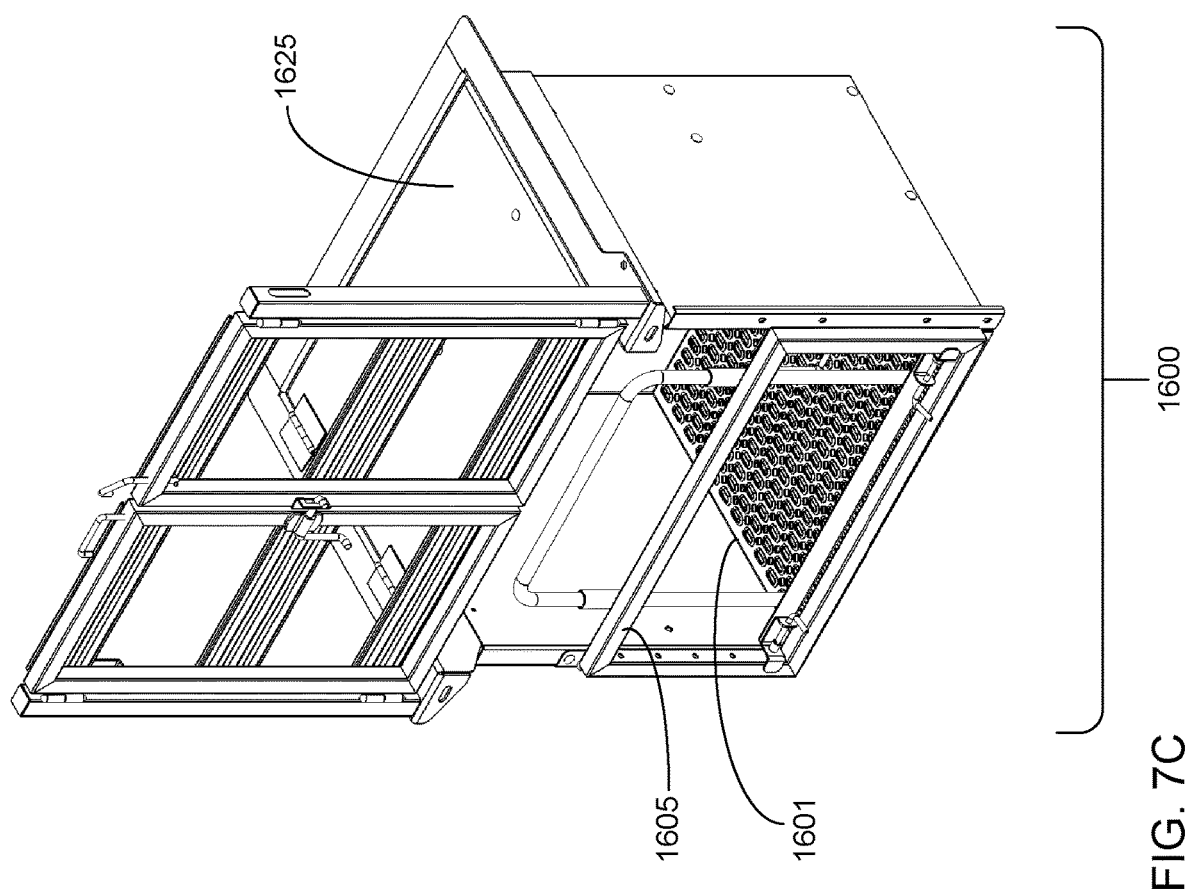
Figure 7D:
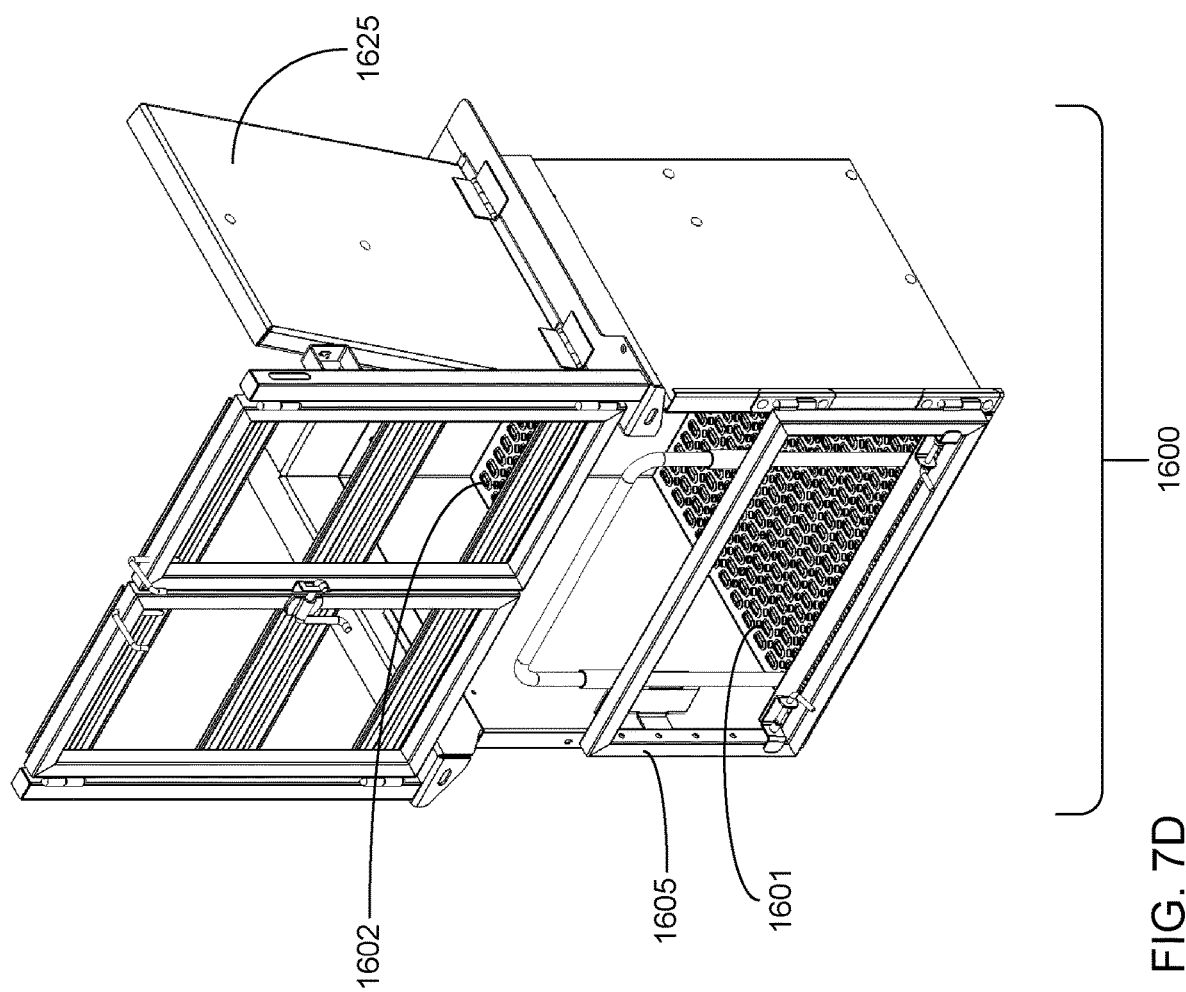
Figure 7E:
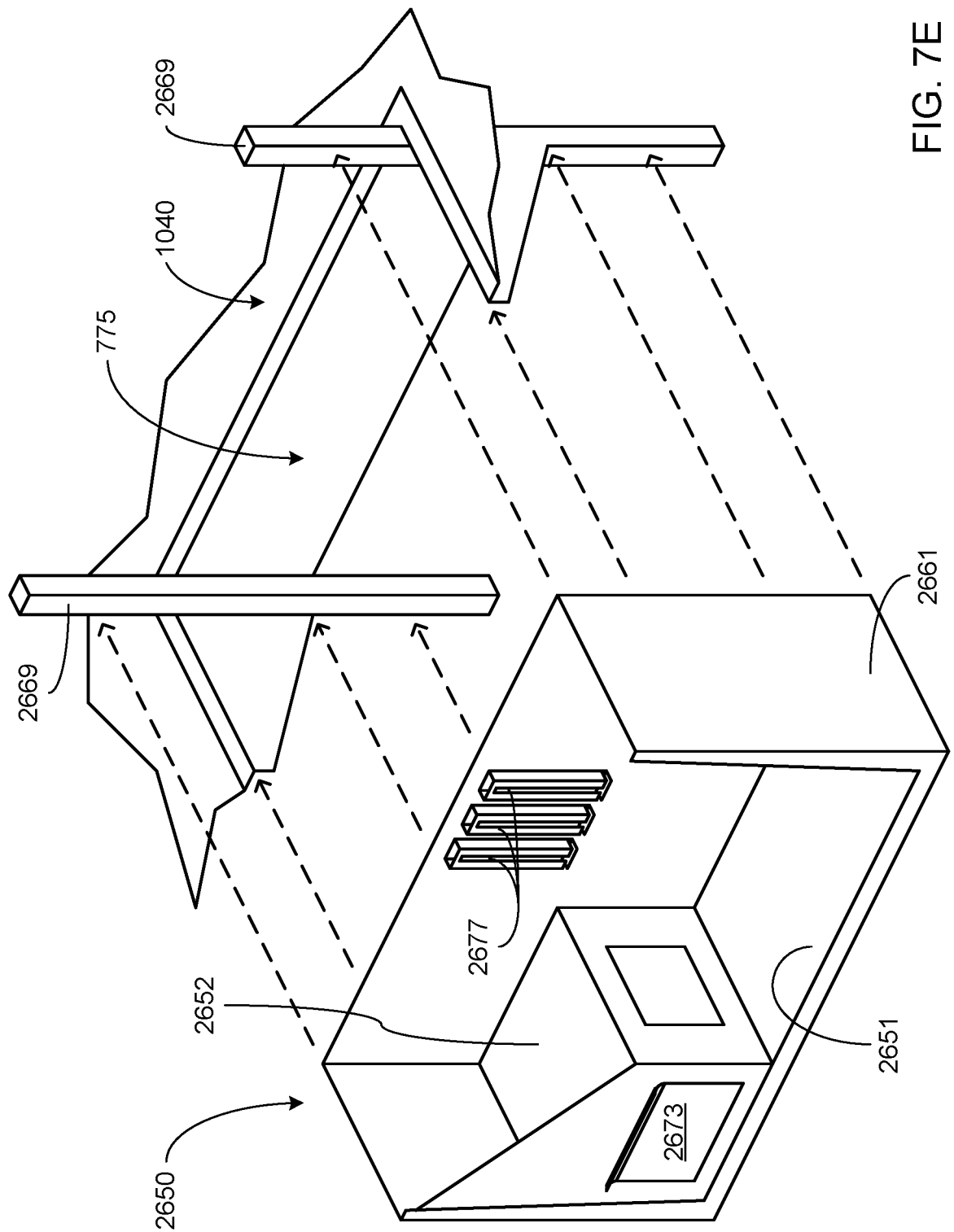
Figure 7F:
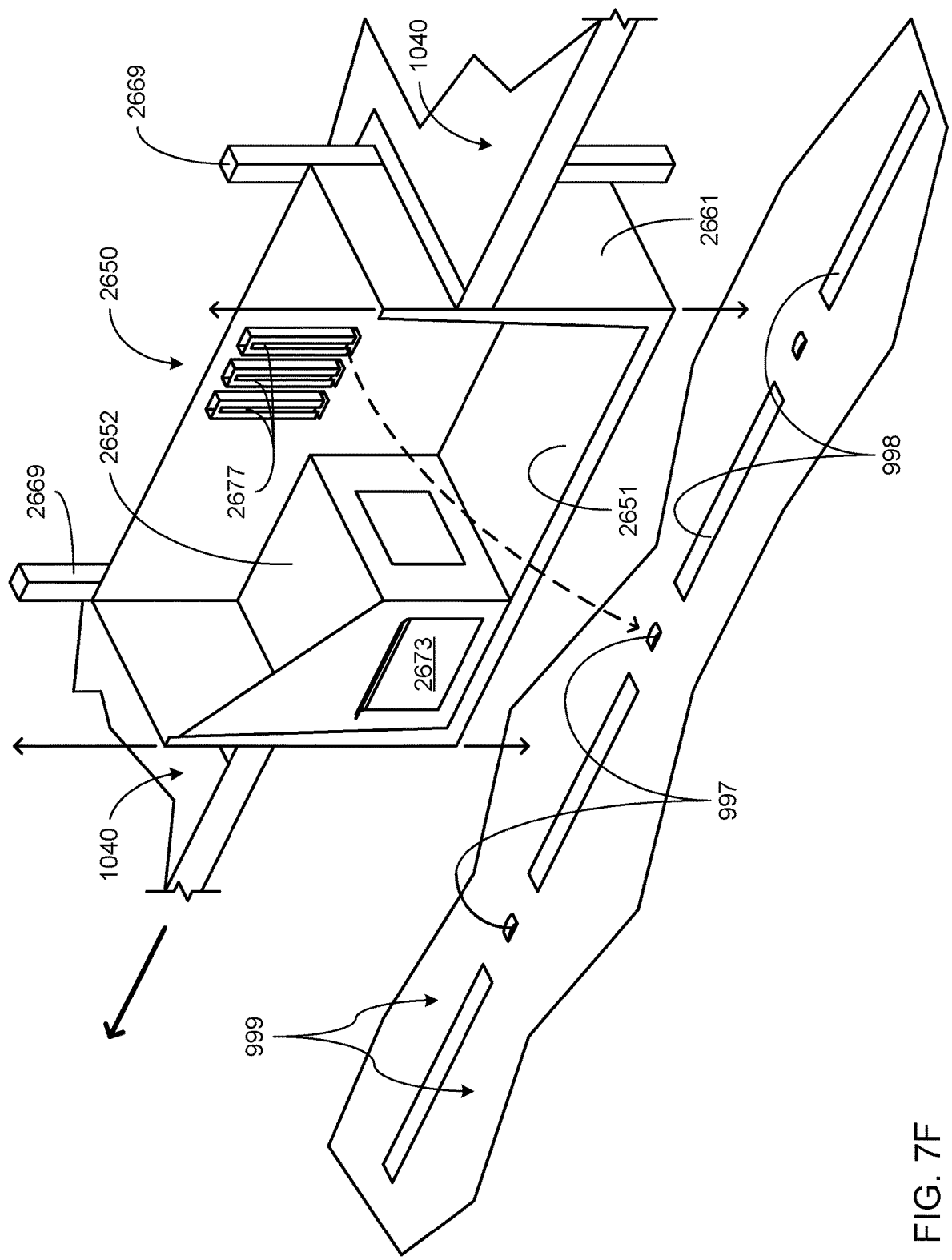
Figure 7G:
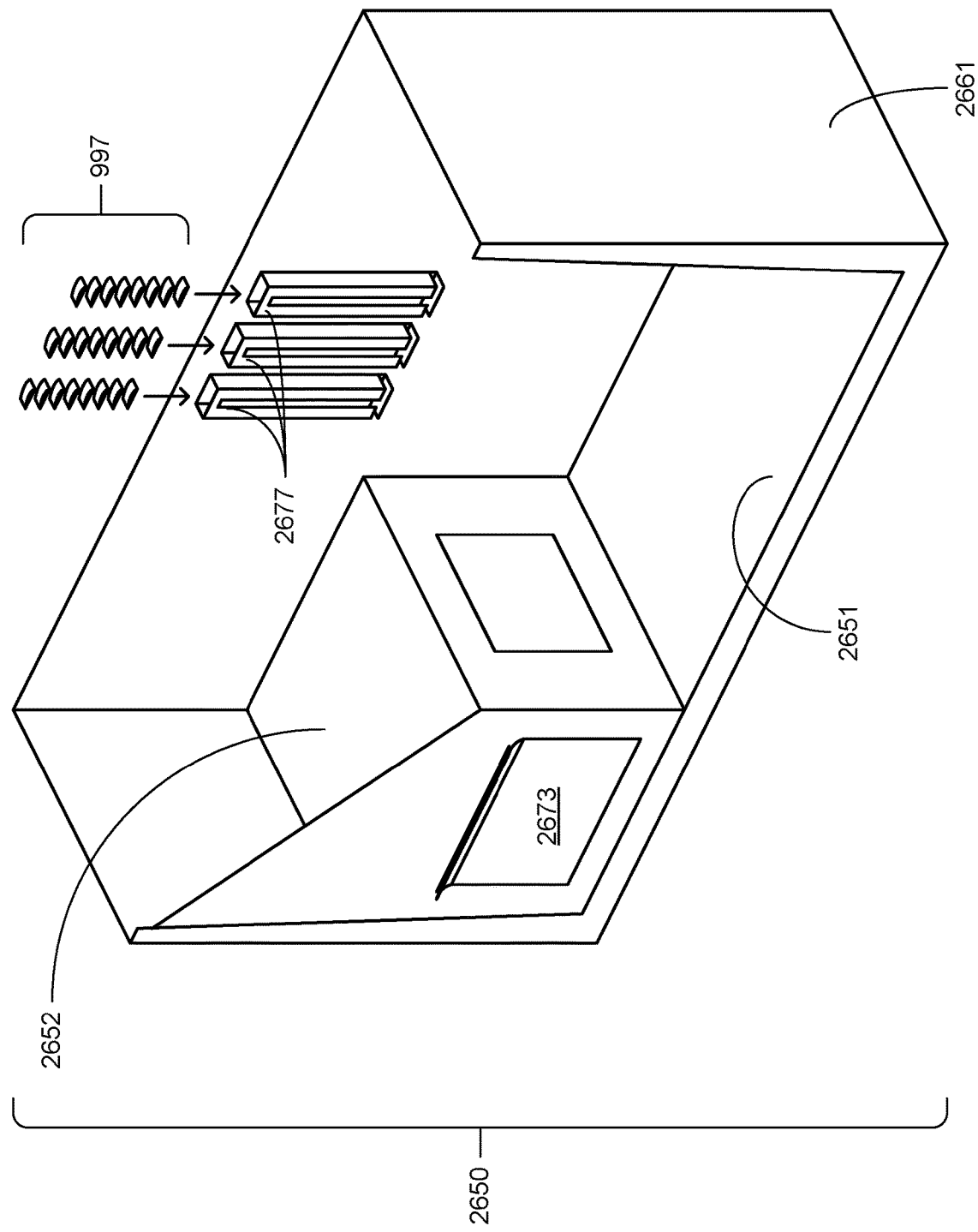
Figure 8A:
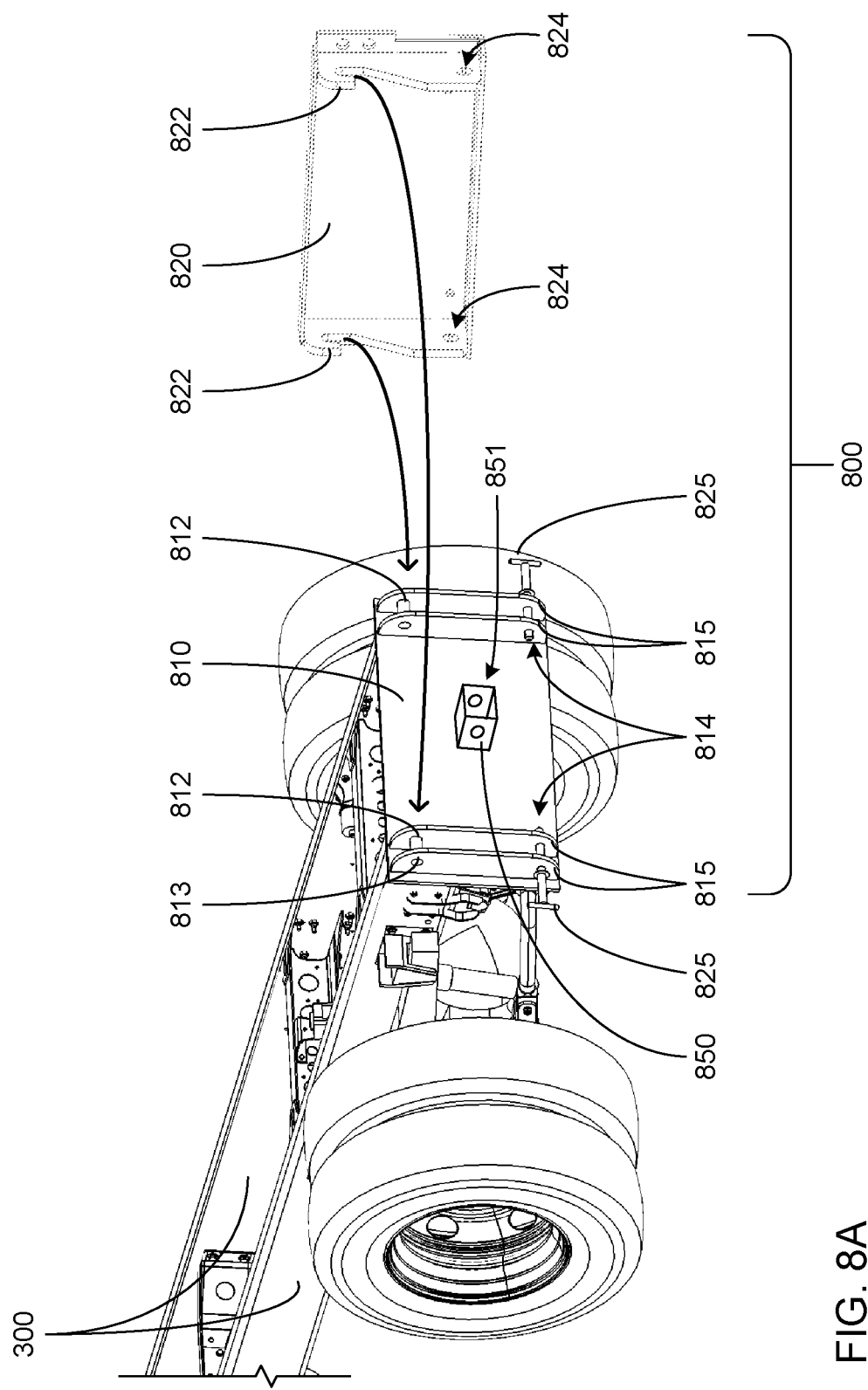
Figure 8B:
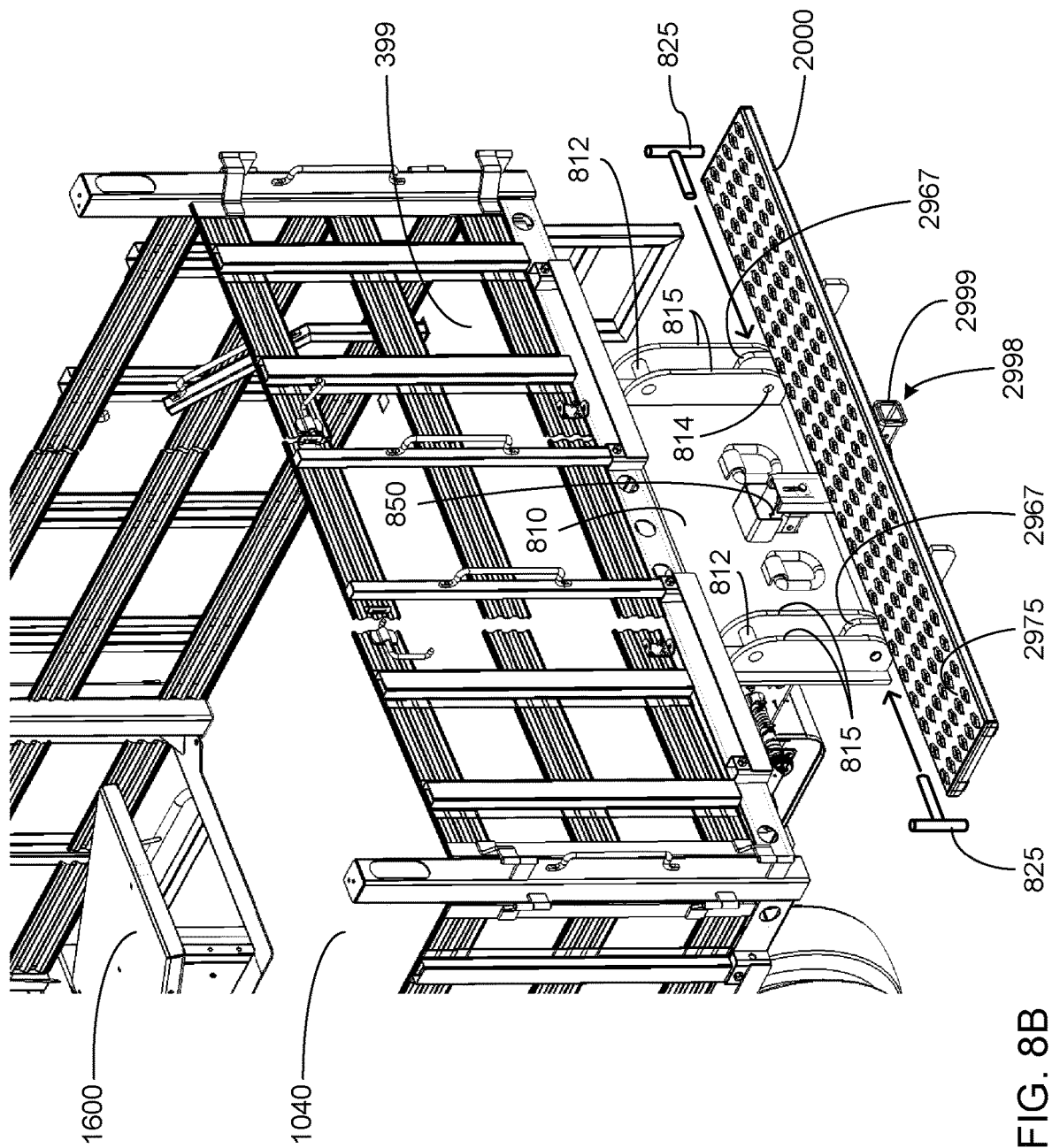
Figure 8C:
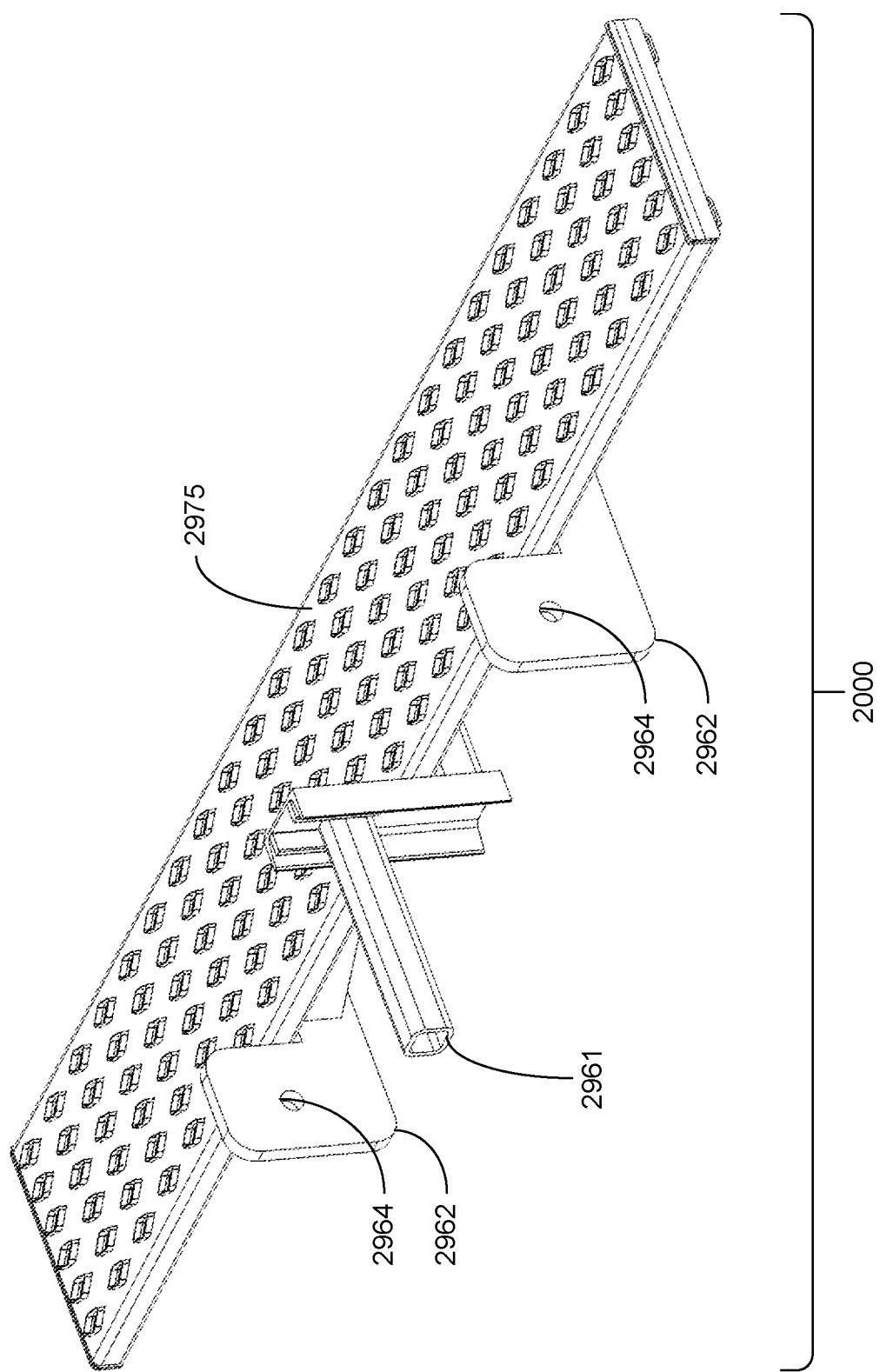
Figure 8D:
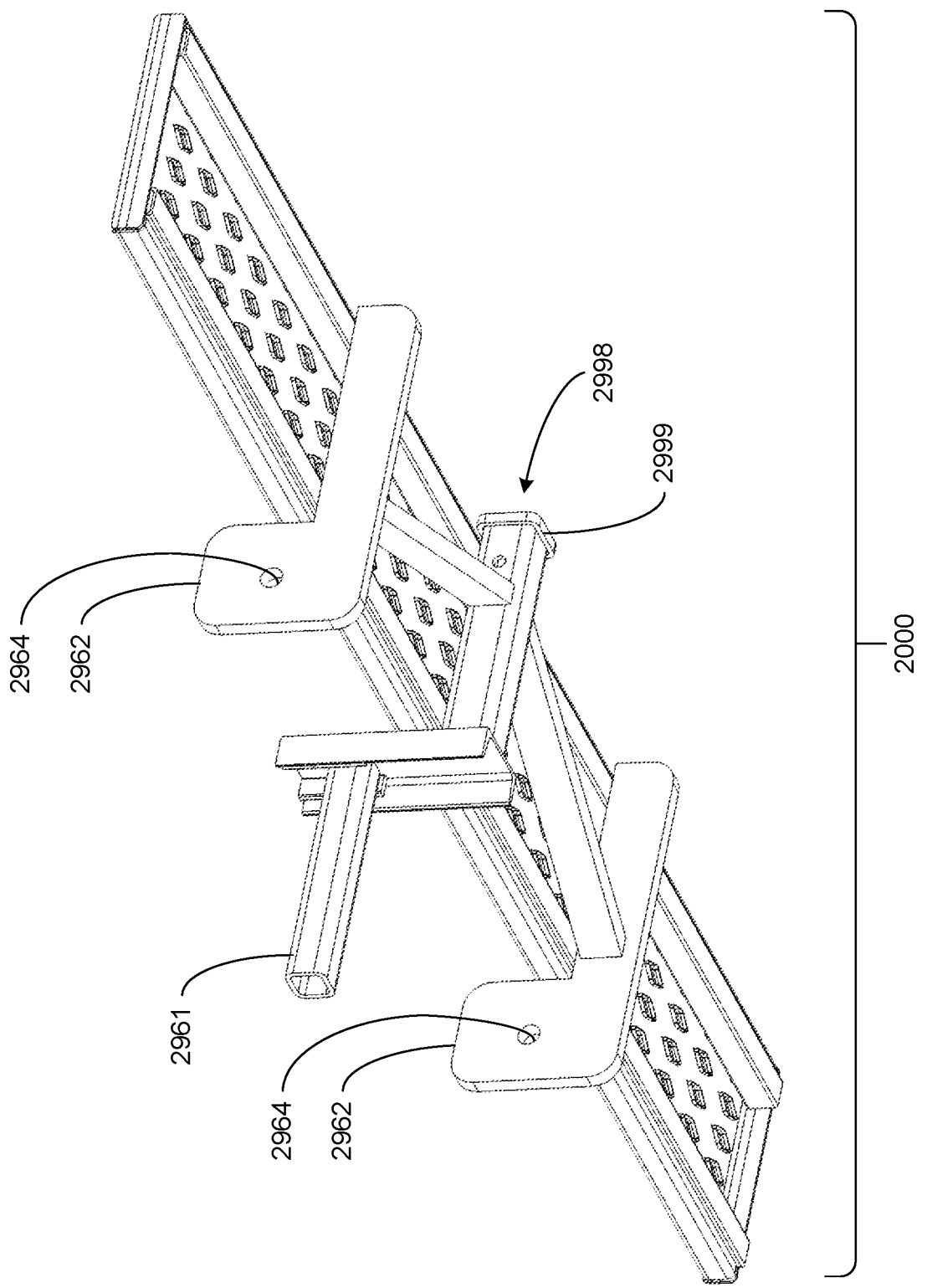
Figure 8F:
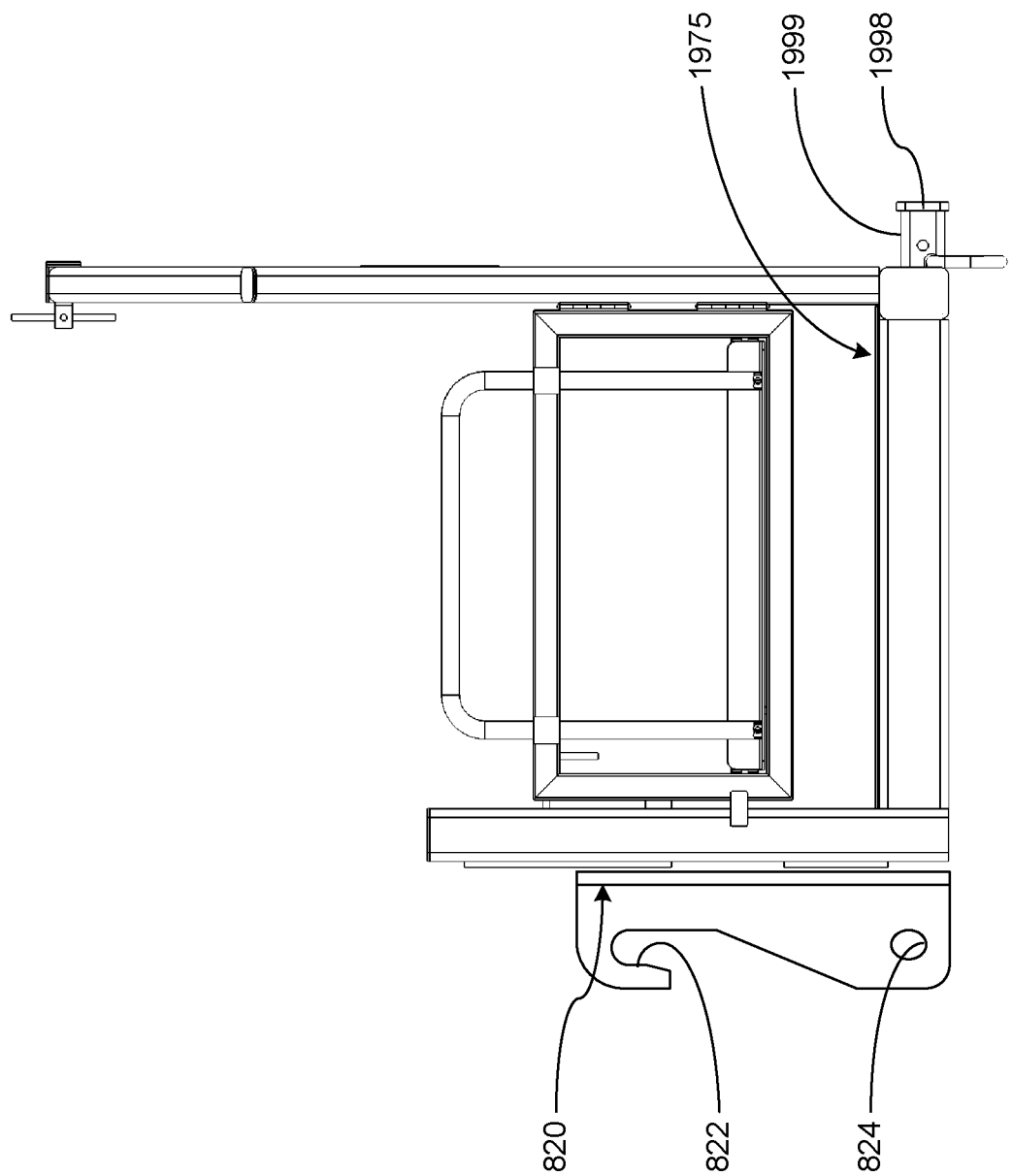
Figure 8G:
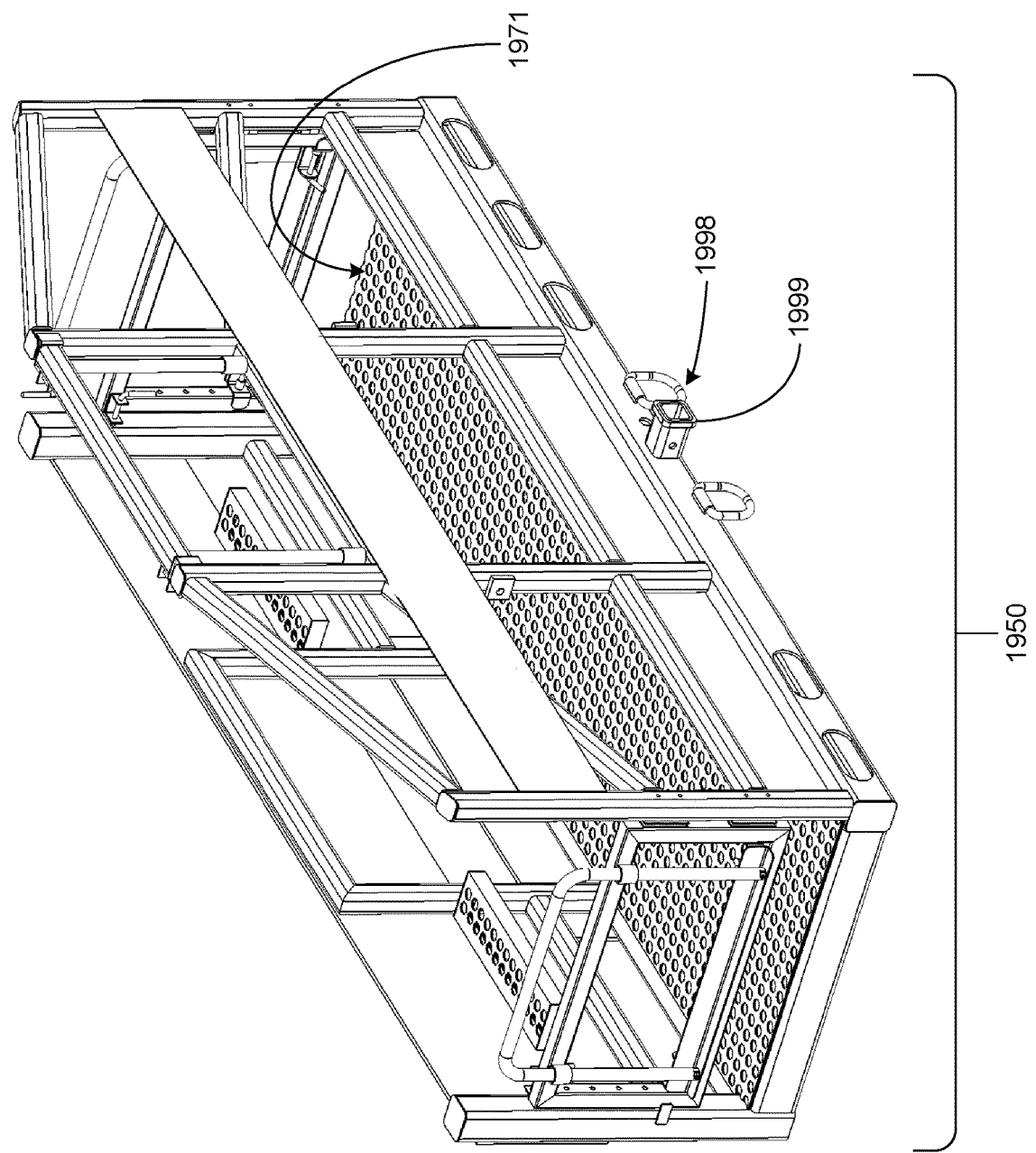
Figure 9C:
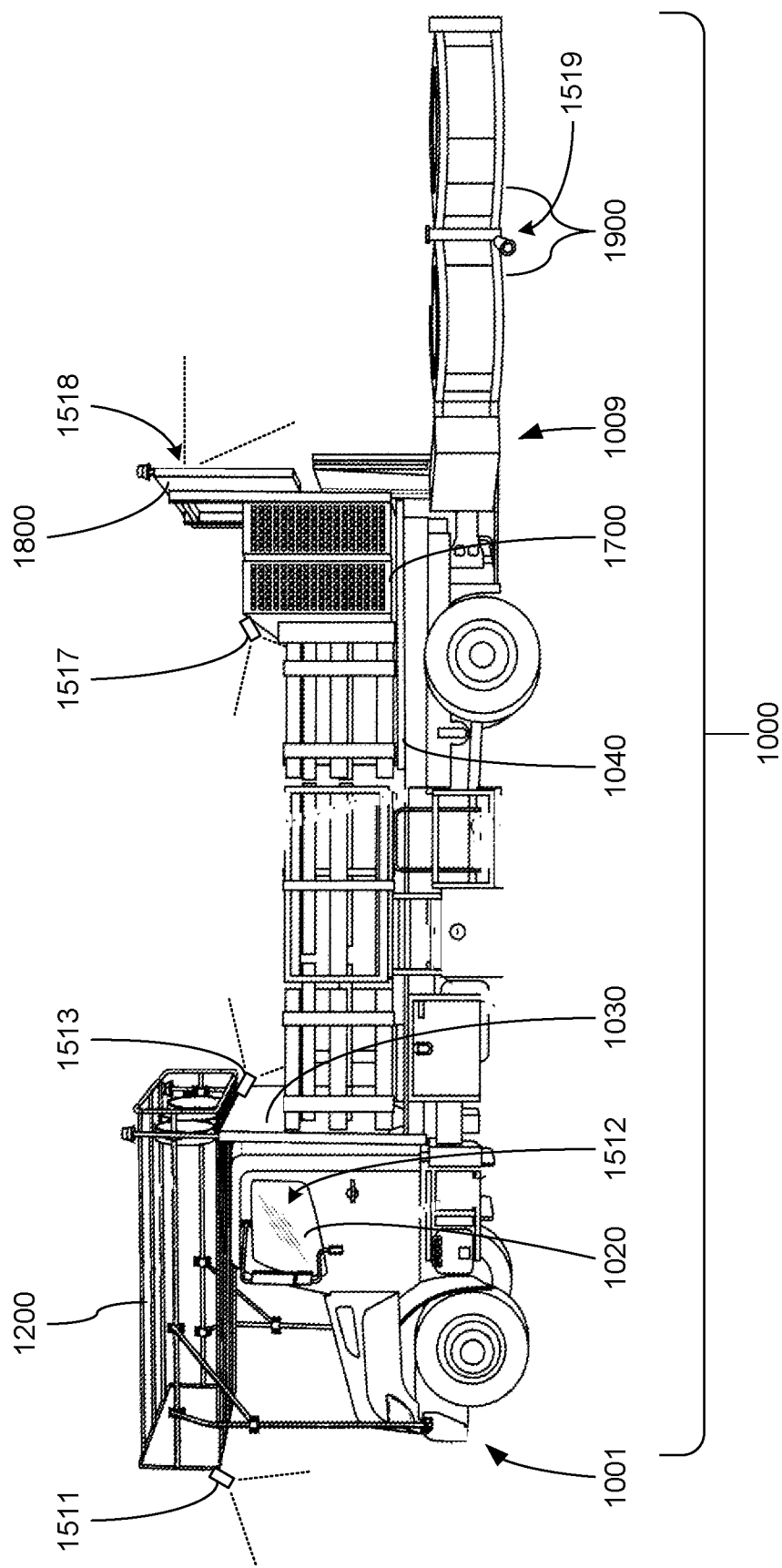
Figure 9D:
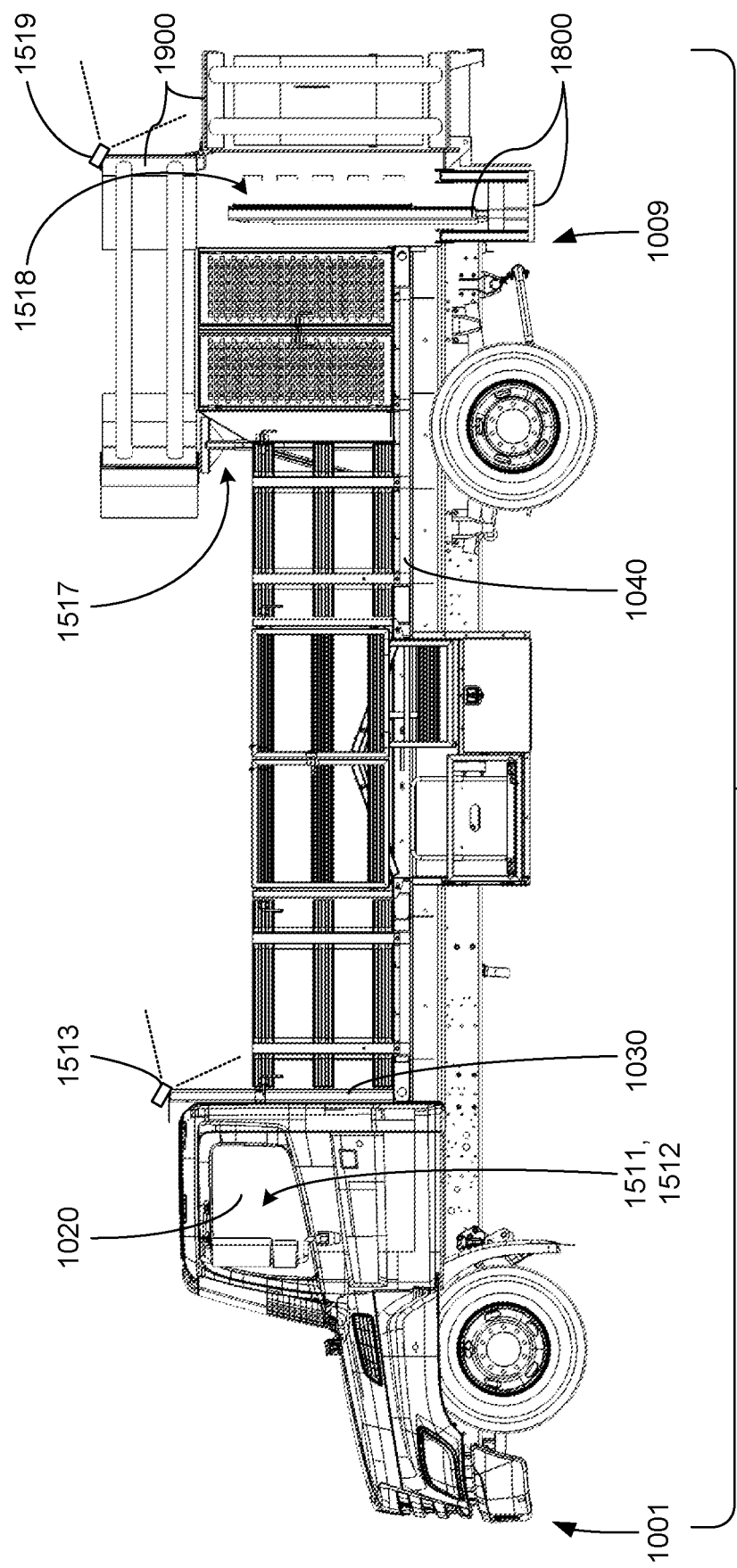
Figure 9E:
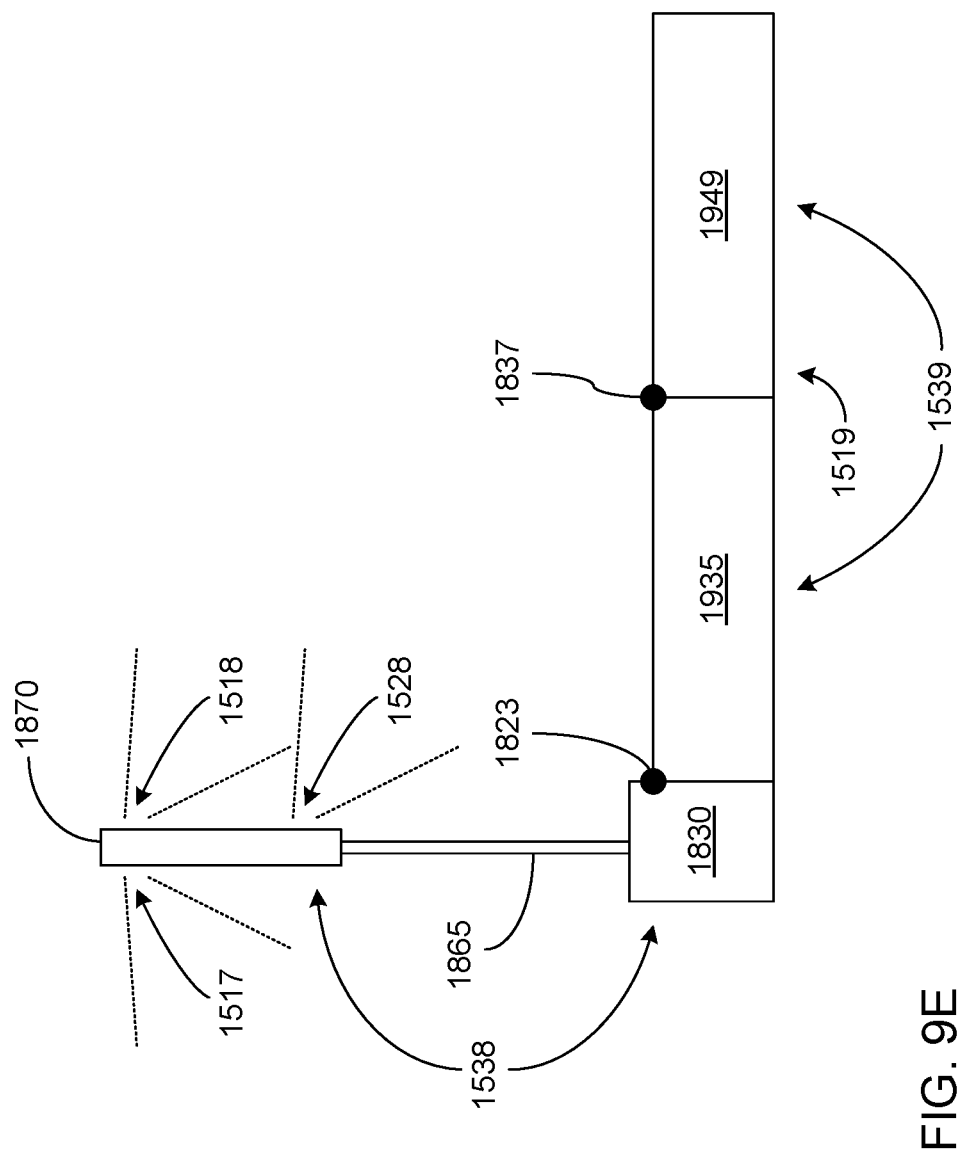
Figure 9F:
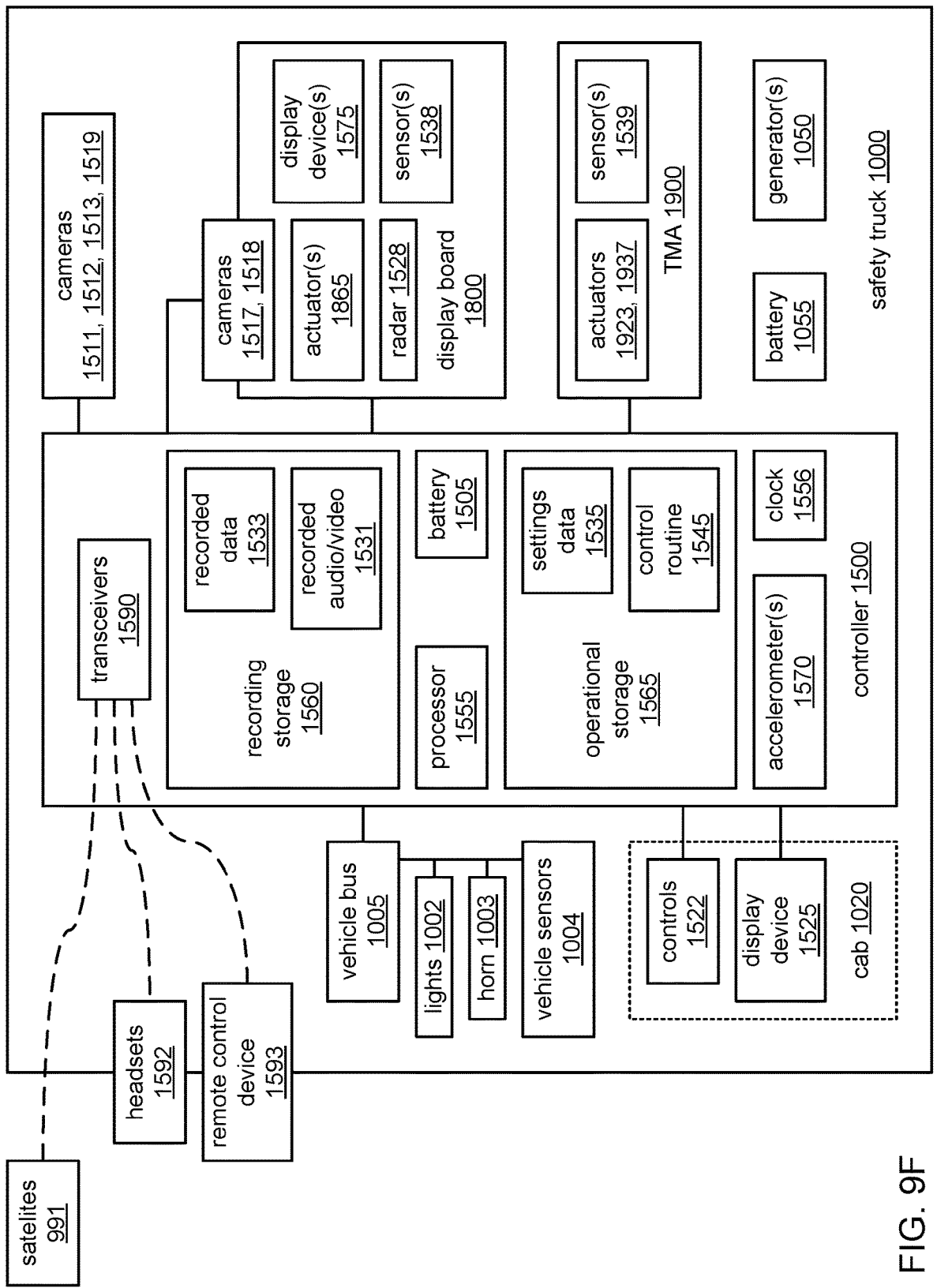
Figure 9G:
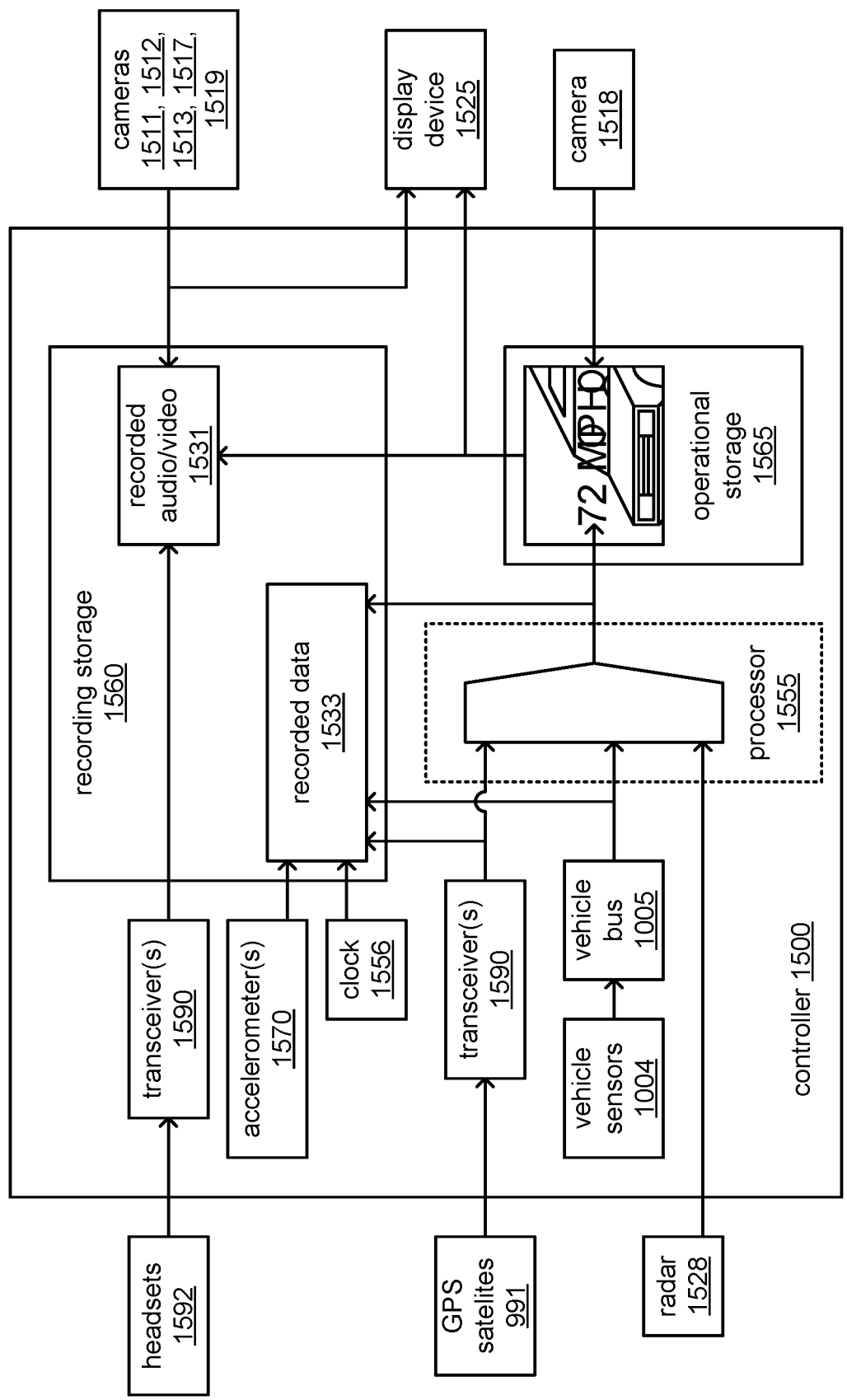
Figure 9H:
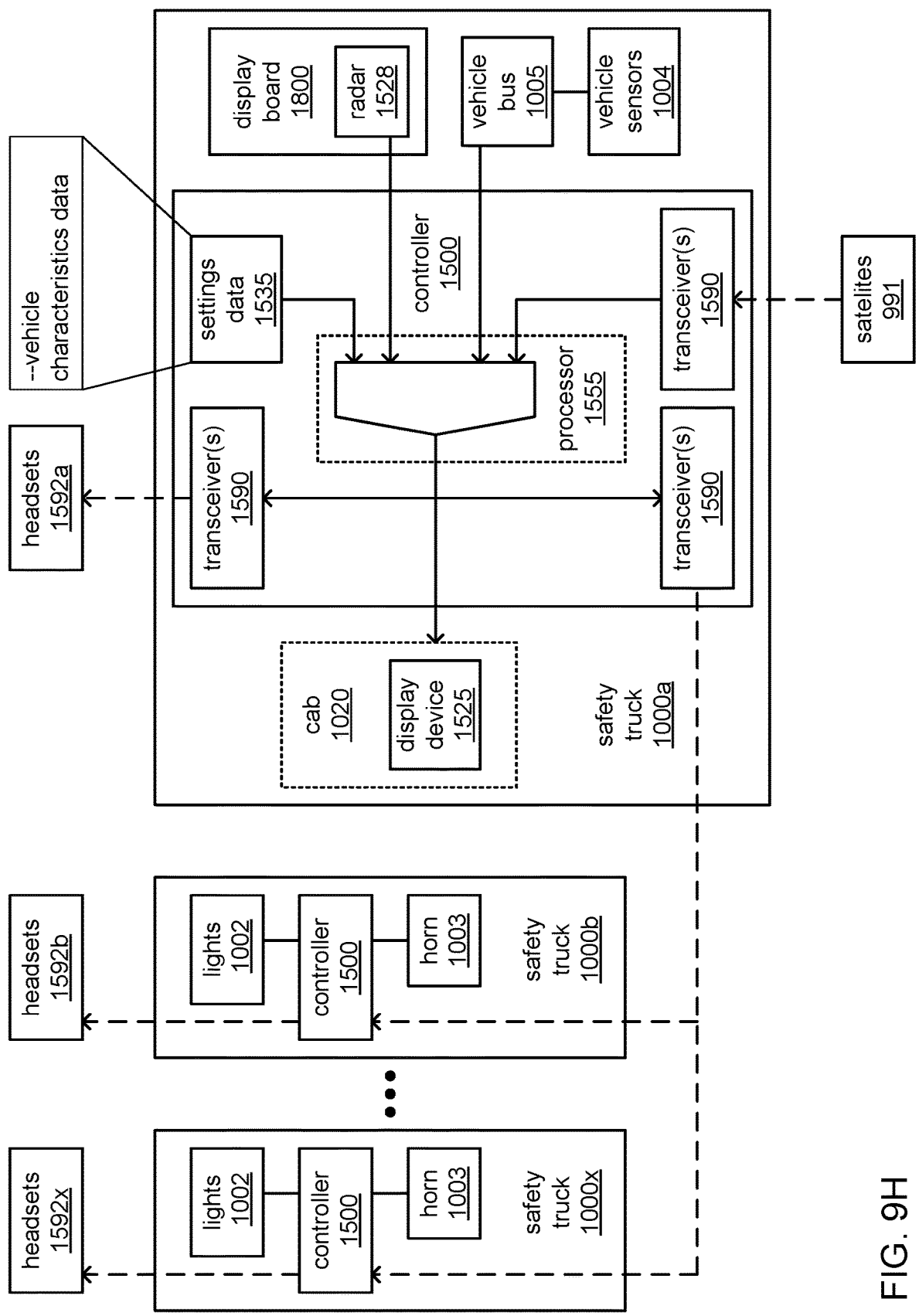

FIG. 6B is a schematic depiction of a TMA unit attachment folded upwardly and forwardly to a transport position overlying the stowed display board attachment;

FIG. 6C is a schematic depiction of the TMA unit attachment mid-way between being folded upwardly and forwardly towards its transport position, and being unfolded downwardly and rearwardly toward its operational position;

FIG. 6D is a schematic depiction of the TMA unit attachment with one of its two components extending rearwardly in its operational position;

FIG. 6E is a schematic depiction of the TMA unit attachment with both of its two components extending rearwardly in their operational position;

FIG. 7A is a perspective view of one of two embodiments of the relatively wide man basket attachment which is also shown in FIGS. 1A and 1D, with the view showing upper doors of the man basket attachment partially pivoted open;

FIG. 7B is a perspective view of the other of two embodiments of the relatively wide man basket attachment which is also shown in FIGS. 1B and 1C, with the view showing upper doors of the man basket attachment partially pivoted open;

FIG. 7C is a perspective view of one of two embodiments of the relatively narrow man basket attachment which is also shown in FIGS. 1F, 1G and 1H, with the view showing the upper door of the man basket pivoted closed to align with the flat upper surface of the flatbed of a safety truck;

FIG. 7D is another perspective view of the other of two embodiments of the relatively narrow man basket attachment, with the view showing the upper door of the man basket attachment pivoted to an open position;

FIG. 7E is a perspective view of the relatively wide man basket attachment also shown in FIG. 1I, with the view showing how the man basket attachment is received in an inset of the flatbed of a safety truck, and showing two guide posts the man basket attachment can move along while being raised and lowered relative to the safety truck's flatbed;

FIGS. 7F and 7G are other perspective views of the man basket attachment shown in FIG. 7E;

FIG. 7H is a schematic depiction of a horizontally extending stand-on surface, an upstanding housing sidewall, and a hydraulic cylinder interposed between a post connected to the stand-on surface and a plate connected to the upstanding housing sidewall, by which arrangement the stand-on surface can move up and down relative to the upstanding sidewall;

FIG. 8A is a perspective view of a rear region of a safety truck and showing heavy duty connection point components for supporting various attachments;

FIG. 8B is a rear perspective view showing a step bumper attachment connected to the rear of a safety truck using the heavy duty connection components shown in FIG. 8A;

FIGS. 8C and 8D are other perspective views of the step bumper attachment shown in FIG. 8B;

FIG. 8E is an elevational view of a display board attachment able to be coupled to some of the heavy duty connection components shown in FIG. 8A;

FIG. 8F is an elevational view of a safety basket attachment able to be coupled to some of the heavy duty connection components shown in FIG. 8A;

FIG. 8G is a perspective view of the safety basket attachment;

FIG. 9A is an elevational view of an embodiment of a line of safety trucks operated in a cooperative manner to safely dissipate the kinetic energy of a vehicular impact through use of the inertia of a succession of safety trucks, and the crumpling of a succession of associated TMA units;

FIG. 9B is an elevational view of an alternate embodiment of the line of safety trucks of FIG. 9A;

FIGS. 9C and 9D are elevational views, similar to FIGS. 1B and 1D, respectively, of the different embodiments thereof of the safety truck, each showing locations at which cameras may be carried by the safety truck;

FIG. 9E is an elevational view, somewhat similar to FIG. 6E of the embodiment thereof of the display board, showing locations at which cameras and/or a radar may be carried by the display board;

FIG. 9F is a block diagram of an embodiment of an architecture of a controller of the safety truck;

FIG. 9G is a block diagram depicting aspects of using the controller of FIG. 9F to capture and record aspects of vehicular activity occurring in the vicinity of the safety truck;

FIG. 9H is a block diagram depicting aspects of using the controller of FIG. 9F, in cooperation with a corresponding controller of each of one or more other safety trucks, to extend voice communications and/or the output of warning sounds to personnel associated with multiple safety trucks.

DETAILED DESCRIPTION

This detailed description discloses a plurality of exemplary safety truck embodiments, attachment embodiments and connection point embodiments. The invention, as claimed, is broader than, and is not limited by the several exemplary embodiments that are disclosed in this document. The terms used in the claims have their full ordinary meanings except as is otherwise defined in this document.

Shown in FIG. 1A through FIG. 1I are example embodiments of flatbed safety trucks 1000 to which a variety of attachments can be releasably and interchangeably coupled at connection point embodiments, to enable the safety trucks 1000 to be used with increased effectiveness to safeguard roadway construction, maintenance and repair personnel as they perform tasks within and near to roadway workzones and worksites.

The most basic components of the safety truck embodiments 1000 shown in FIGS. 1A through 1I include a forwardly facing cab 1020, a rearwardly extending flatbed 1040, and a pair of lengthy spaced-apart channel members 300 that form a frame of each of the safety truck embodiments 1000 that underlies and connects the cab 1020 and the flatbed 1040 as is best shown in FIGS. 1D, 1I, 3A and 3C.

The depicted safety truck embodiments 1000 have substantially horizontally extending front bumpers 1010 (best shown in FIGS. 1A through 1E) that are the forwardmost component of the depicted safety truck embodiments 1000. Several of the depicted safety truck embodiments 1000 have an upstanding bulkhead 1030 located between the forwardly-facing cab 1020 and the rearwardly-extending flatbed 1040.

The following DIVISION A of this document provides a summary the many new safety truck CONNECTION POINT embodiments that may be provided by the safety truck embodiments 1000. DIVISION B summarizes the many new safety truck ATTACHMENT embodiments that may be provided by the safety truck embodiments 1000. DIVISION C discloses new METHODS OF OPERATION of safety truck embodiments 1000 that may enhance the capability of the safety truck embodiments 1000 to guard and protect roadway construction, maintenance and repair personnel while they work within and relatively near to roadway workzone and worksite locations.

DIVISION A: Summary of Safety Truck CONNECTION POINTS

The exemplary safety truck embodiments 1000 that are disclosed in this document may be provided with one or more connection points such as are listed below, to enable the safety truck embodiments 1000 to be provided with such attachments as are disclosed in DIVISION B of this document.

1) A Forwardmost Connection Point 650

Figure 2A:
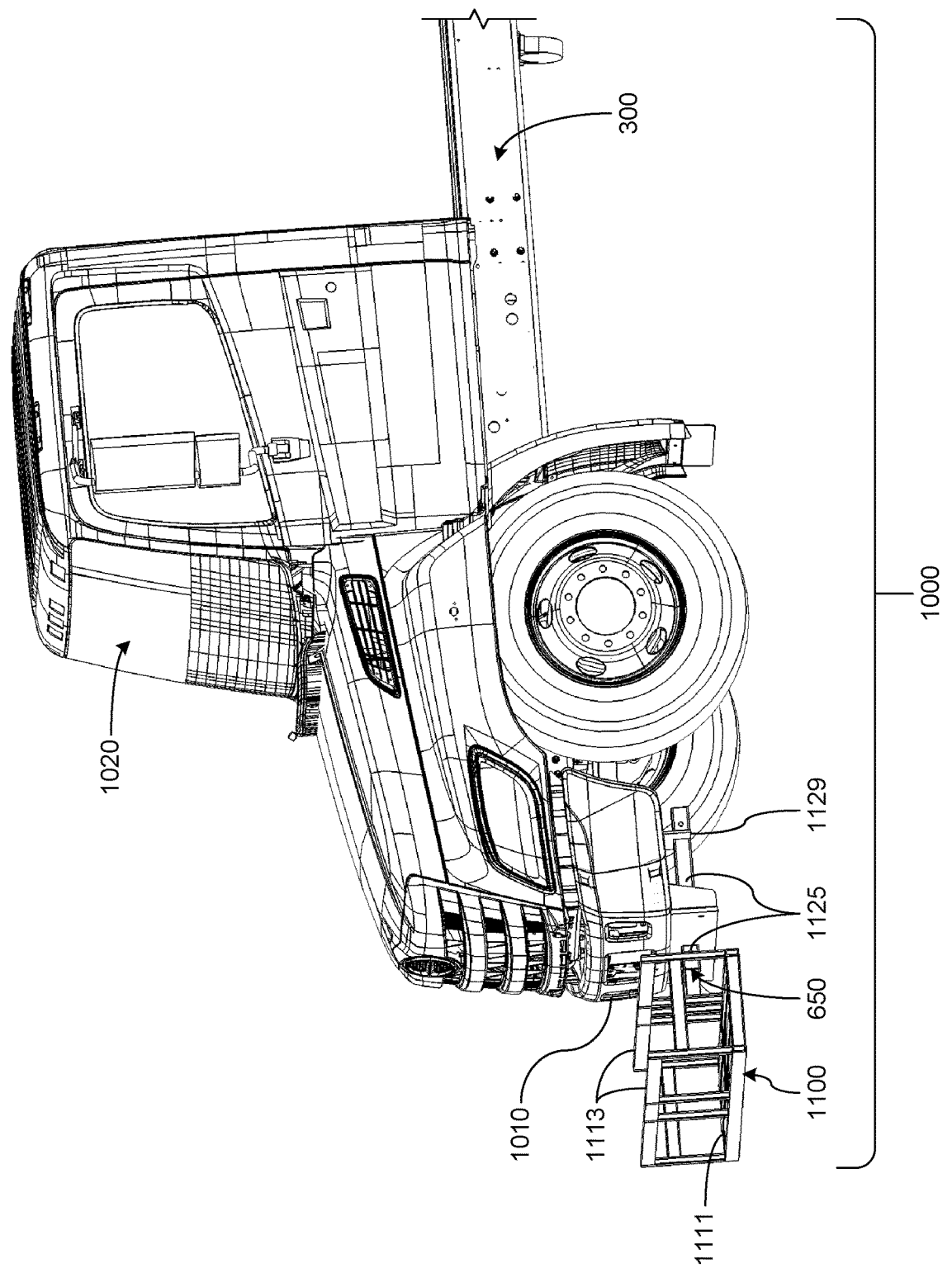
FIG. 2A is a left side perspective view of a cab portion of a typical safety truck, with a rumble strip basket attachment shown carried by the truck's forwardmost connection point and extending forwardly relative to a front bumper of the safety truck.
Figure 2B:
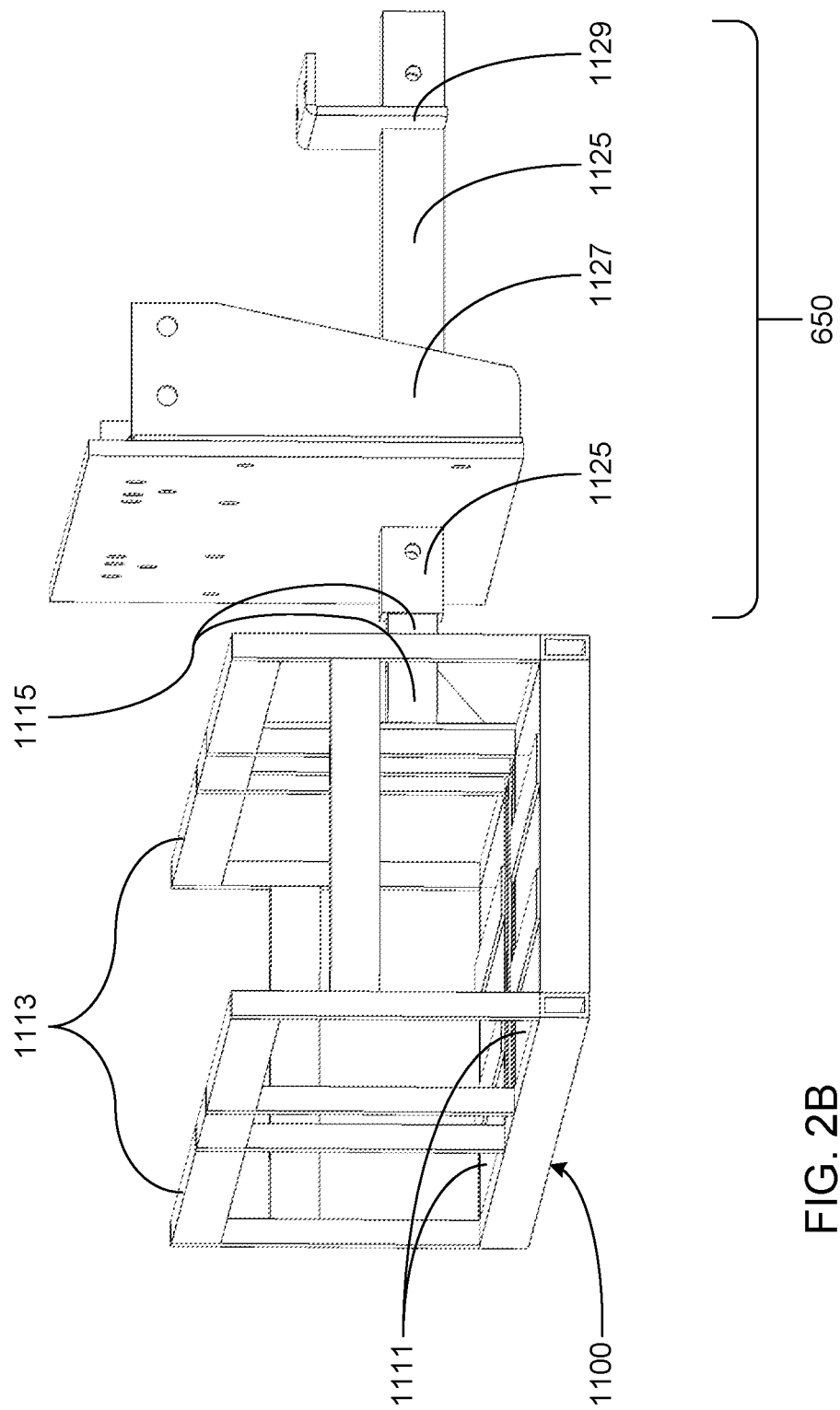
FIG. 2B is a left side perspective view on an enlarged scale of components of a forwardmost connection point shown supporting the rumble strip basket attachment shown in FIG. 2A.

Shown in FIG. 1A, and more clearly in FIG. 2B, is a forwardmost connection point 650 that includes an elongate, tubular sleeve 1125 of rectangular cross-section. A front portion of the elongate sleeve 1125 is rigidly connected to a mounting plate assembly 1127 that may be attached to the front bumper 1010 of a safety truck embodiment 1000, or to other nearby frame components of the safety truck embodiment 1000. A rear end region of the elongate sleeve 1125 extends through and is supported by a mounting bracket 1129 (shown in FIGS. 2A and 2B) that also connects to framework (not shown) of the safety truck embodiment—by which arrangement the rectangular tube of the hitch receiver 1125 is rigidly supported near both ends thereof so the elongate sleeve 1125 can carry various attachments such as a rumble strip basket 1100 which is shown in FIGS. 2A and 2B.

2) Dual Bulkhead Connection Points 710

Figure 1J:
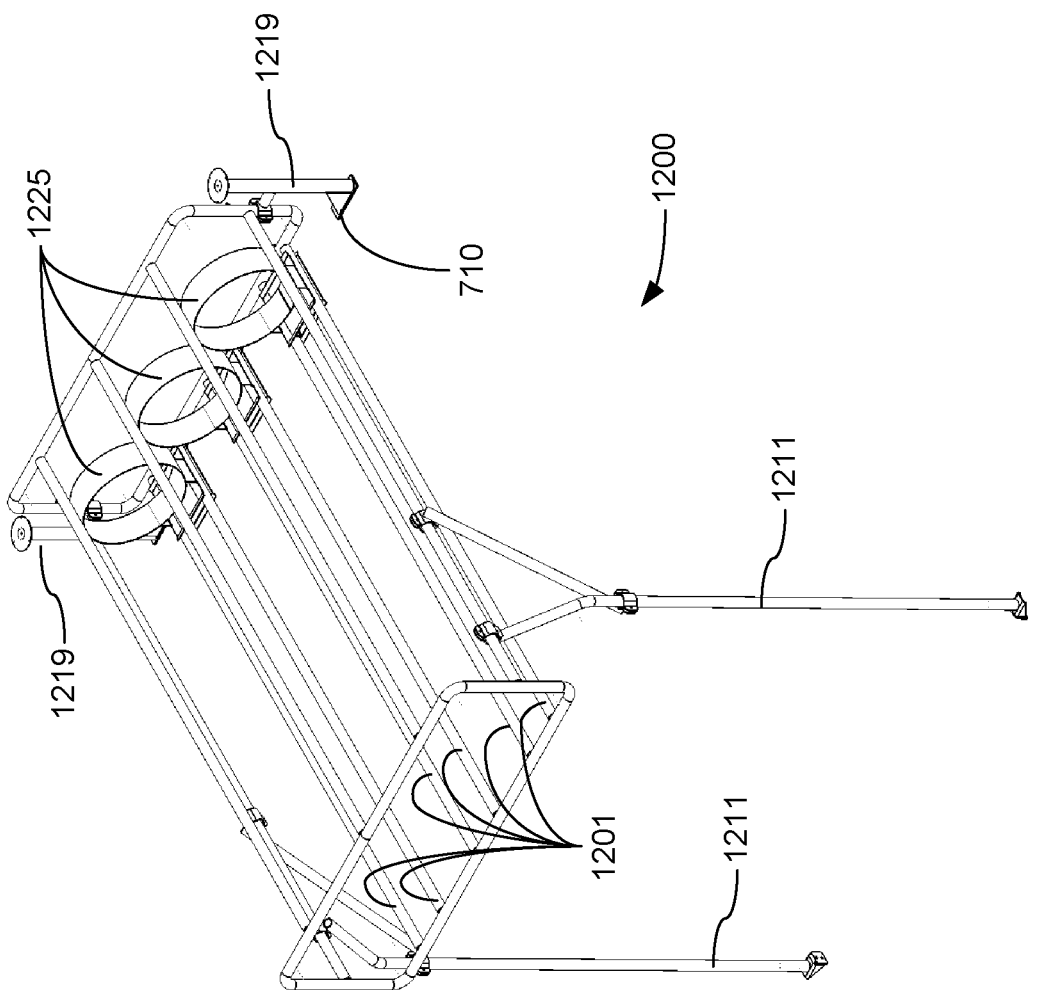
Figure 3C:
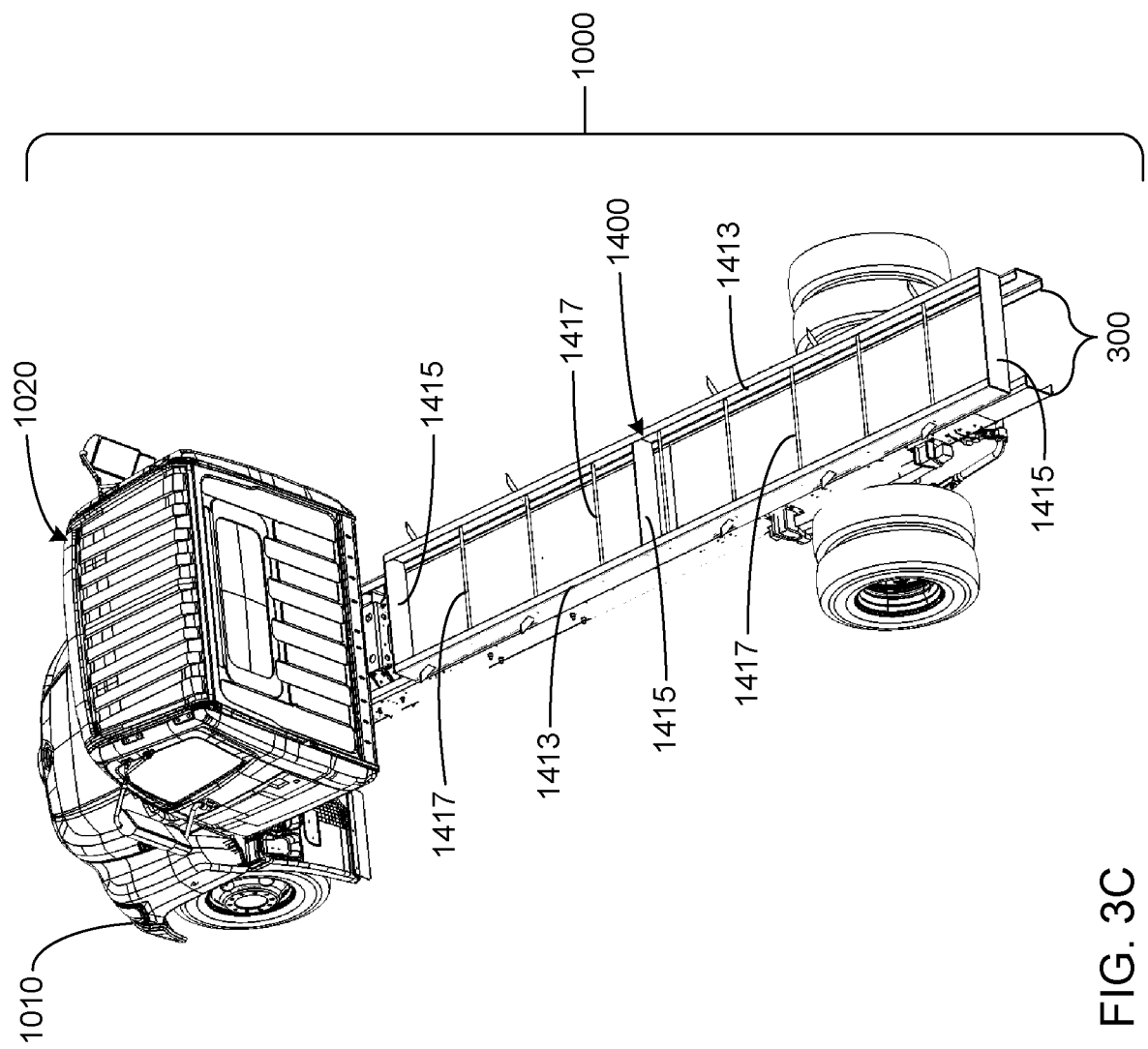
FIG. 3C is a perspective view similar to FIG. 3A, showing how the weight frame attachment shown in FIG. 3B is mounted atop the pair of elongate channel members shown in FIG. 3A.
Figure 3D:
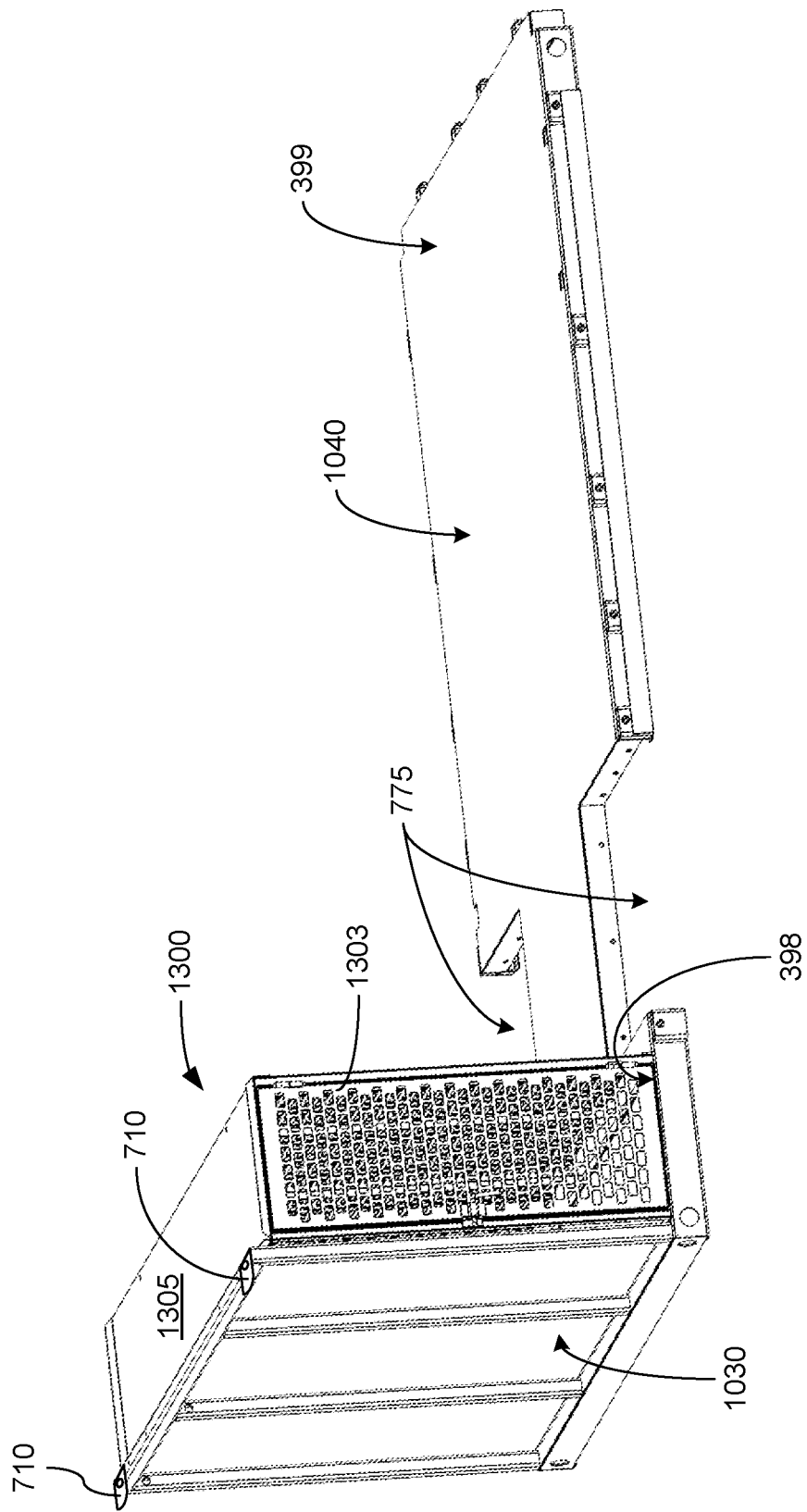
FIG. 3D is a perspective view showing the left side and the top of the flatbed of a safety truck, with a bulkhead and a front sign cage mounted on a front region of the flatbed, and showing left and right side insets in the flatbed where man baskets may eventually be installed.
Figure 3E:
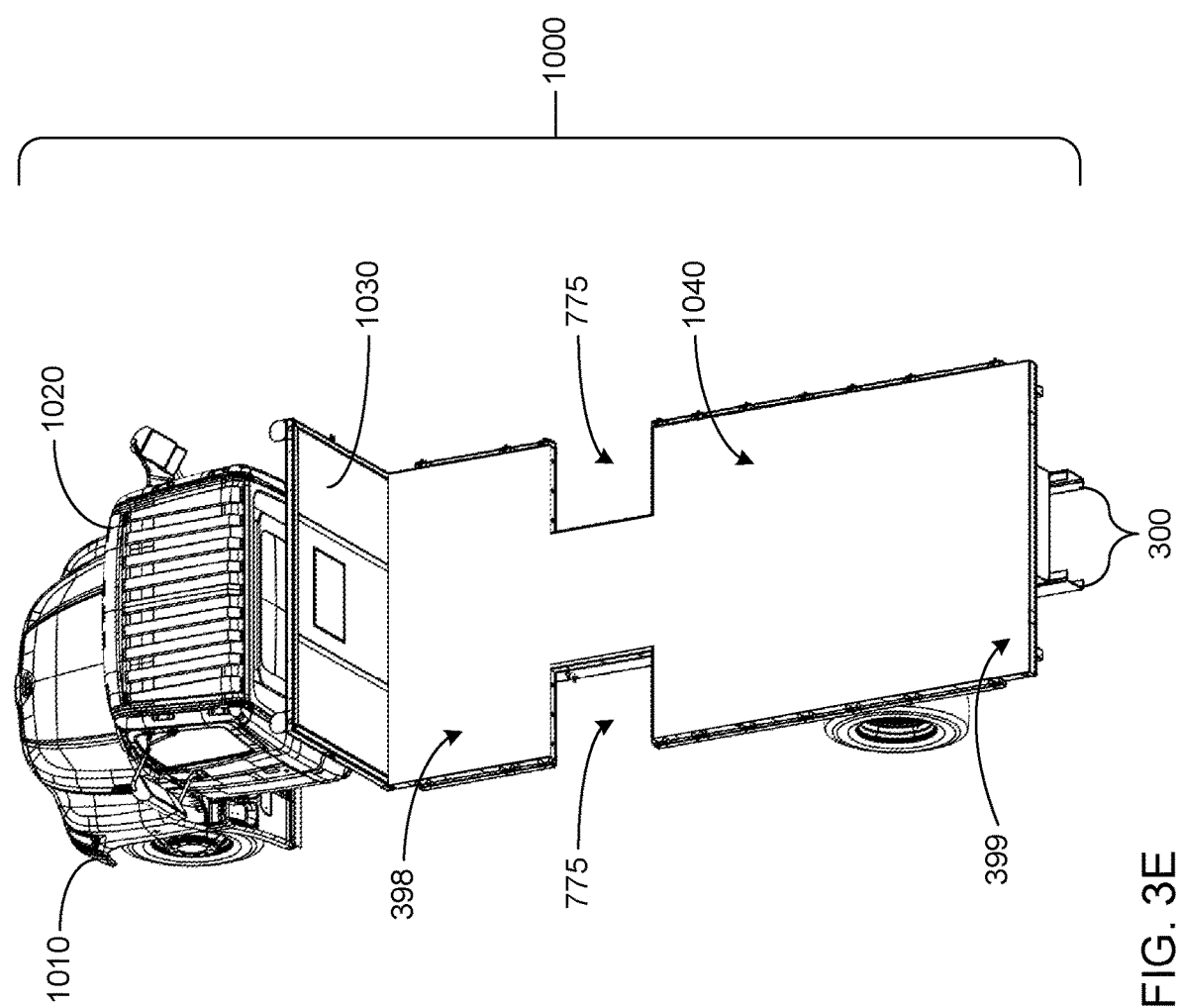
FIG. 3E is a perspective view similar to FIG. 3C showing the flatbed and bulkhead installed atop the weight frame attachment that is shown in FIG. 3C.

Shown in FIGS. 1C, 1D and 3D are flat left and right connection point surfaces 710 to which upstanding rear supports 1219 of the overcab rack attachment 1200 can connect to assist in supporting rear regions of the overcab rack attachment 1200, which is most completely depicted in FIG. 1J.

The flat left and right support surfaces 710 may also be used to underlie and support other attachments such as cameras and radar speed detection attachments 1513 which are depicted in FIGS. 1E and 1I.

3) Inbetween-Cab-and-Flatbed Connection Point Structures 750

Various embodiments of a connection point structure 750 may be provided at locations between the forwardly-facing cab 1020, and the rearwardly extending flatbed 1040 of various safety truck embodiments 1000.

Figure 4A:
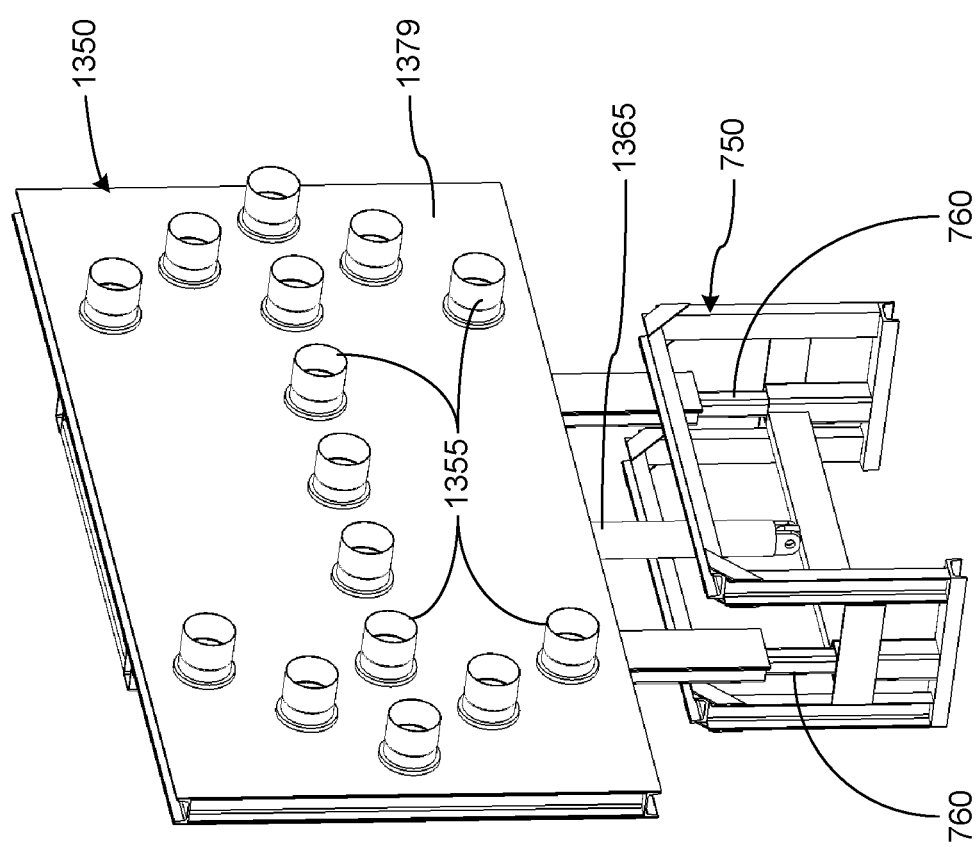
FIG. 4A is a perspective view on an enlarged scale showing one form of an inbetween-cab-and-flatbed connection point structure underlying and supporting one embodiment of the arrow board attachment in a fully lowered, stowed position which is also shown in FIG. 1H.
Figure 4B:
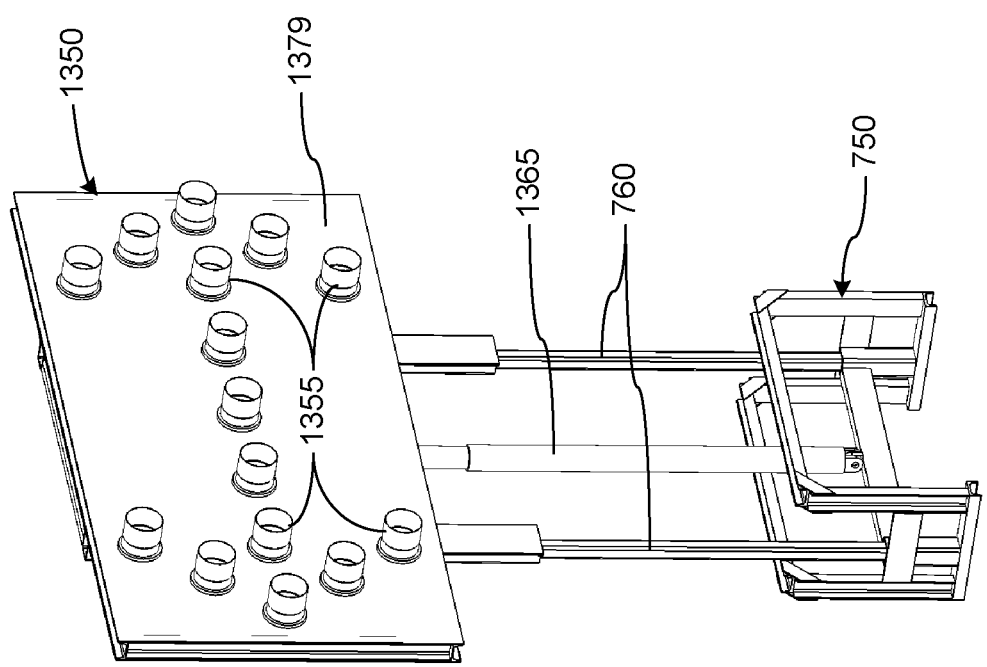
FIG. 4B is a perspective view similar to FIG. 4A but showing the arrow board attachment supported atop the welded frame embodiment of the inbetween-cab-and-flatbed connection point, with the arrow board in a fully raised position such as is also shown in FIG. 1G.
Figure 4C:
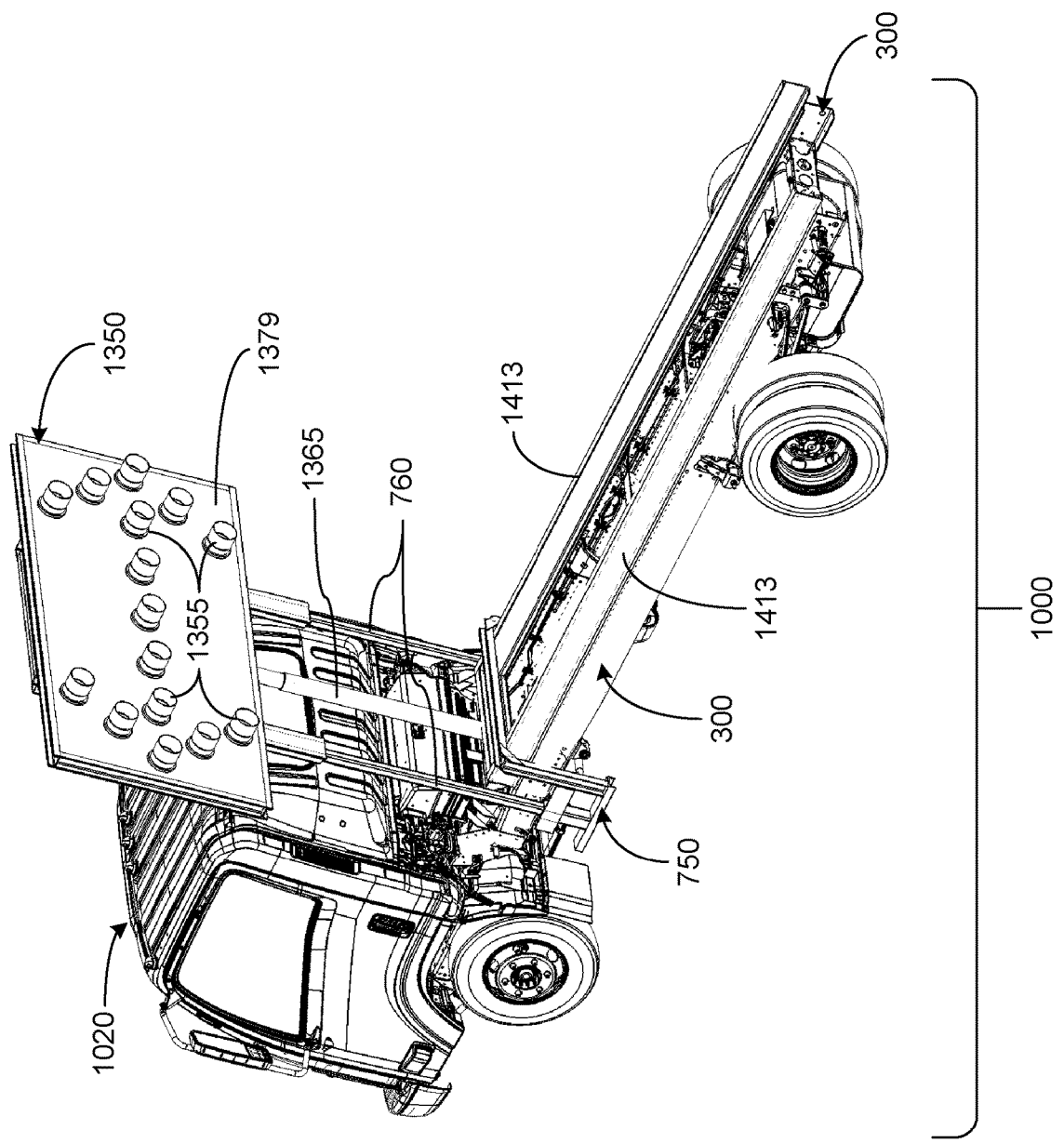
FIG. 4C is a rear and left side perspective view of another safety truck embodiment having with the arrow board attachment supported atop a simpler form of the inbetween-cab-and-flatbed connection point.

Shown in FIGS. 1G and 4C is a simple embodiment of a connection point structure 750 to which bottom regions of uprights 760 connect for supporting an upstanding arrow board attachment 1350 that can be selectively raised and lowered. In FIGS. 1H and 4A the arrow board attachment 1350 is shown in a lowered position. In FIGS. 1F, 1G and 4B, the arrow board attachment 1350 is shown in a raised position.

Shown in FIGS. 4A and 4B is a more complex embodiment of a connection point structure 750 that includes a welded frame, to which a pair of uprights 760 are connected that support the arrow board attachment 1350. Both the simple embodiment 750 shown in FIGS. 1G and 4C, and the more complex embodiment shown in FIGS. 4A and 4B include a hydraulic cylinder 1365 (or other similar components such as a pneumatic cylinder or a linear motor) located between the uprights 760 for raising and lowering the arrow board attachment 1350.

Both the simple embodiment (shown in FIGS. 1G and 4C) and the more complex embodiment (shown in FIGS. 4A and 4B) of the connection point structure 750 are connected to the pair of elongate channel members 300 that support the forwardly-facing cab 1020 and the rearwardly extending flatbed 1040, as is typically shown in FIG. 4C.

When the arrow board 1350 is raised as shown in FIGS. 1F, 1G and 4B, selected lights on the arrow board 1350 can be illuminated to direct traffic around the safety truck 1000, either to the right, or to the left.

4) Generator Compartment Connection Point Structures 455

As is shown in FIGS. 1A, 1B, 1E and 1H, compartment-type connection point structures 4.55 may assume any of a variety of configurations that are provided beneath a left or right forward part of the flatbed 1040 of various ones of the safety truck embodiments 1000 for containing and carrying an auxiliary electricity generator.

The auxiliary electricity generator (not shown) may take any of a wide variety of commercially available gas-engine powered forms for supplying electricity, as needed, to various ones of the safety truck embodiments 1000 and to such safety truck attachments such as are described in the next Division B of this document.

5) Front & Rear Flatbed Connection Point Regions 398 and 399

Shown best in FIG. 3D, are front and rear regions 398 and 399 of the flatbed 1040 which provide connection points for supporting a front sign cage 1300, and a rear sign cage 1700, respectively, either or both of which may be provided and/or used to contain and transport various safety barrier components and warning sign components (not shown).

The front sign cage 1300 is shown on various safety truck embodiments 1000 atop the front connection point region 398 in FIGS. 1F, 1G and 1H. The rear sign cage 1700 is shown on various safety truck embodiments 1000 atop the rear connection point region 399 in FIGS. 1A, 1B, 1C, 1D, 1E and 1I.

6) Mid-Flatbed Inset Region Connection Points 775

Shown best in FIG. 3D are substantially identical left and right open inset regions 775 of the flatbed 1040 that are each provided to receive and carry one of the three embodiments of man basket attachments 1600, 1650 and 2650 that are shown in FIGS. 7A through 7G. The dimensions of the open inset regions are preferably adjusted as may be needed to receive such man basket attachments as the relatively narrow man basket attachment 1600, or the relatively wide man basket attachments 1650 and 2650.

7) Heavy Duty Rear Connection Point Structure 800

Two principal components of a heavy-duty rear connection point structure 800 are best shown in FIG. 8A as including an upstanding vehicle-connected support plate 810, and a carrier plate 820. Such attachments as are to be connected to the vehicle-connected support plate 810 each carry one of the carrier plates 820. One such attachment is shown in FIG. 8E, and another is shown in FIG. 8F.

As is shown in FIG. 8A, the vehicle-connected support plate 810 is securely welded to the rear end regions of the two forwardly/rearwardly extending channel members 300 that form the frame that underlies the forwardly-facing cab 1020 and the rearwardly-extending flatbed 1040, as can best be seen in FIGS. 1D, 1E and 1G.

Referring again to FIG. 8A, the vehicle-connected support plate 810 has one pair of spaced-apart uprights 815 welded to its left side region, and another pair of spaced-apart uprights 815 welded to its right side region. Extending transversely between upper portions of each of the pairs of spaced-apart uprights 815 are tubular sleeves 812 that align with holes 813 that are formed through upper portions of each of the spaced-apart uprights 815. Formed through lower portions of the spaced-apart uprights 815 are aligned holes 814 that are sized to receive hitch pin members 825 in a slip fit.

Referring yet again to FIG. 8A, the attachment carrier plate 820 has upstanding hook structures 822 welded to its left and right side regions. The hook structures 822 are configured to receive corresponding ones of the tubular sleeves 812 that are securely welded to the pairs of the spaced-apart uprights 815 carried by the vehicle-connected support plate 810. Lower regions of the hook structures 822 are provided with holes 824 that can align with holes 814 formed through the spaced-apart uprights 815, to receive hitch pins 825 to thereby lock the hook structures 822 to the spaced-apart uprights 815 when the hook structures 822 engage the tubular sleeves 812 to securely attach the carrier plate 820 to the vehicle-connected support plate 810.

8) An Auxiliary Rear Connection Point 850

Referring to FIGS. 8A and 8B, a central region of the vehicle-connected support plate 810 is provided with a tubular sleeve that forms an auxiliary rear connection point 850. The tubular sleeve that has an opening 851 configured to receive such tubular hitch members as is indicated by the numeral 2961 in FIGS. 8C and 8D for connecting a variety of attachments, such as the step-bumper attachment 2000 shown in FIGS. 8C and 8D.

When the hitch member 2961 of the step-bumper attachment 2000 is inserted into the opening 851 of the auxiliary rear connection point 850, the hitch pins 825 (shown in FIG. 8A) can be inserted through holes 2964 that are provided in supports 2962 of the step-bumper attachment 2000 (as is shown in FIGS. 8C and 8D) and through holes 814 provided in the uprights 815 to assist in securely connecting the step-bumper attachment 2000 to the rear of a safety truck 1000.

In should be noted that, although each of the rearward connection points 800 and 850 are depicted and described herein as rigidly connected to the pair of forwardly-rearwardly extending channel members 300 that define the truck frame, other embodiments are possible in which one or both of the rearward connection points 800 and 850 may be indirectly mounted to the truck frame (and/or other structural components of an embodiment of the safety truck 1000) by any of a variety of actuators. Such actuators may include, and are not limited to, hydraulic and/or pneumatic cylinders, and/or electrically powered linear motors. Such actuators may be operable to raise or lower one of both of the rearward connection points 800 and 850 relative to the roadway surface to thereby raise or lower whatever safety attachment(s) that may be connected thereto.

Thus, for example, one or more of a rumble strip basket 1100, a mounting component 1810 of a display board attachment 1800 to which a TMA unit 1900 may also be coupled (as will be described), a safety basket attachment 1950, and/or a step bumper attachment 2000 that may be coupled to one or both of the rearward connection points 800 and 850 may, accordingly, be raised or lowered relative to the roadway surface.

By way of example, in some of such embodiments, the auxiliary rearward connection point 850 may extend through an aperture (not shown) formed through the support plate 810 of the rearward connection point 800, where such an aperture is shaped and sized to allow the auxiliary rearward connection point 850 a pre-selected degree of freedom of vertical movement rearward to the support plate 810. One or more actuators by which the auxiliary rearward connection point 850 is indirectly mounted to the truck frame and/or other structural components of an embodiment of the safety truck 1000 may be operable to move the auxiliary rearward connection point 850 vertically within the degree of freedom of movement afforded by such an aperture.

9) Attachment-Defined Connection Points 1999 and 2999

The step-bumper attachment 2950 shown in FIGS. 1H, 8B, 8C and 8D is provided with a forwardly-rearwardly extending tubular component 2999 (shown best in FIG. 8D that has a rearwardly-facing rectangular opening 2998 (shown in FIG. 8B) into which standard tubular hitch components of rectangular cross-section (not shown) of various other attachments (not shown) may be inserted to support such other attachments.

Likewise, the safety basket attachment 1950 shown in FIGS. 1F, 1G, 8F and 8G is provided with a rearwardly extending tubular component 1999 that has a rearwardly-facing opening 1998 (shown in FIGS. 1F and 8G) into which standard tubular hitch components of rectangular cross-section (not shown) of various other attachments (not shown) can be inserted to support such other attachments.

DIVISION B: Summary of Safety Truck Attachments

A wide variety of attachments may be releasably and interchangeably connected to the previously identified connection points, for example, as is described in the following paragraphs:

1) The Rumble Strip Basket Attachment 1100

Shown in FIGS. 2A and 2B is the previously-mentioned rumble strip basket attachment 1100 that may be releasably connected to the forward-most connection point 650 (shown in FIG. 1A) that includes an elongate hitch receiver tube 1125 of rectangular cross section, a front end region of which is indicated by the numeral 650 in FIG. 1A.

As has been explained, a front end region of the hitch receiver tube 1125 is connected to and is rigidly supported by a the mounting plate assembly 1127 (shown in FIG. 2B); and the rear end region of the hitch receiver tube 1125 extends through and is rigidly supported by the mounting bracket 1129.

In some embodiments, the cross-section of the rectangular tube of the hitch receiver 1125 may be shaped and sized to provide a 2-inch by 2-inch (or larger, e.g., 2.5 inch by 2.5 inch) hitch receiver that conforms to the specifications for a class III or class IV (or higher) hitch receiver promulgated by the Society of Automotive Engineers (SAE) International of Warrendale, Pa., USA. Thus, in such embodiments, the forward-most connection point 650 may be capable of supporting a range of weights from 650 to 1400 pounds in a cantilever configuration.

Referring to FIG. 2B, the rumble strip basket attachment 1100 includes a support beam 1115 that is inserted into the hitch receiver tube 1125 so as to be supported by the hitch receiver tube 1125. The support beam 1115 is shaped and sized to be inserted into, and to be releasably retained within, the tubular hitch receiver 1125 in a manner that may also conform to specifications promulgated by SAE International.

The rumble strip basket attachment 1110 may also include a generally rectangular basket fabricated from metal tubing and/or rods that form one or more upstanding side walls 1113, and a floor 1111 (which can also provide a stand-on surface) atop which a stack of rumble strips may be placed for being subsequently withdrawn, one at a time at spaced intervals along a roadway 999 (shown in FIG. 7F) that leads up to a roadway workzone or worksite.

As will be familiar to those skilled in the art, rumble strips are elongate strips of hard material having a cross-section that often resembles a typical "speed bump" or "speed hump," but thinner and narrower to interact with the tires of a vehicle in a manner that generates a low frequency "rumbling" noise that easily propagates into the cabin of a vehicle to alert a driver to an upcoming road hazard or to an instance of the vehicle drifting out of its lane. Where the upcoming road hazard is a roadway workzone or worksite, one or more parallel sets of rumble strips may be positioned on a roadway in a manner in which each rumble strip extends crosswise to the path of the vehicle tires that are to roll over the rumble strips, thereby imparting something of a "washboard" effect to the "rumbling" sound generated as a vehicle's tires roll over the one or more parallel sets of rumble strips.

Where rumble strips are to be so placed along a portion of a roadway, a safety truck embodiment 1000 that includes the forward-most connection point 650 to which the rumble strip basket 1100 has been connected may be driven so as to proceed slowly along that portion of the roadway while construction personnel walking alongside of, and/or in front of, such a slow moving safety truck embodiment 1000 install the rumble strips. More specifically, as such a safety truck embodiment 1000 is driven slowly, either forwardly or in reverse, such construction personnel may lift individual rumble strips out of the rumble strip basket attachment 1100, one at a time, and place the rumble strips on the roadway in front the rumble strip basket attachment 1100, while using asphalt and/or any of a variety of adhesives and/or mechanical hardware to secure each rumble strip in place.

It should be noted that, although the forward connection point 650 is depicted and described herein as being rigidly connected to structural portions of embodiments of the safety truck 1000 such that the rumble strip basket 1100 becomes rigidly connected thereto when attached to the forward connection point 650, other embodiments are possible wherein the forward connection point 650 may be indirectly mounted to structural components of an embodiment of the safety truck 1000 by any of a variety of actuators. Such actuators may include, and are not limited to, hydraulic and/or pneumatic cylinders, and/or electrically powered linear motors. Such actuators may be operable to raise or lower the forward connection point 650 relative to the roadway surface to thereby raise or lower whatever safety attachment(s) that may be connected thereto. Thus, for example, one or more of the rumble strip basket attachment 1100, the safety basket attachment 1950, and/or the step bumper attachment 2000 may, accordingly, be raised or lowered relative to the roadway surface.

2) The Over-Cab Rack Attachment 1200

Figure 1K:
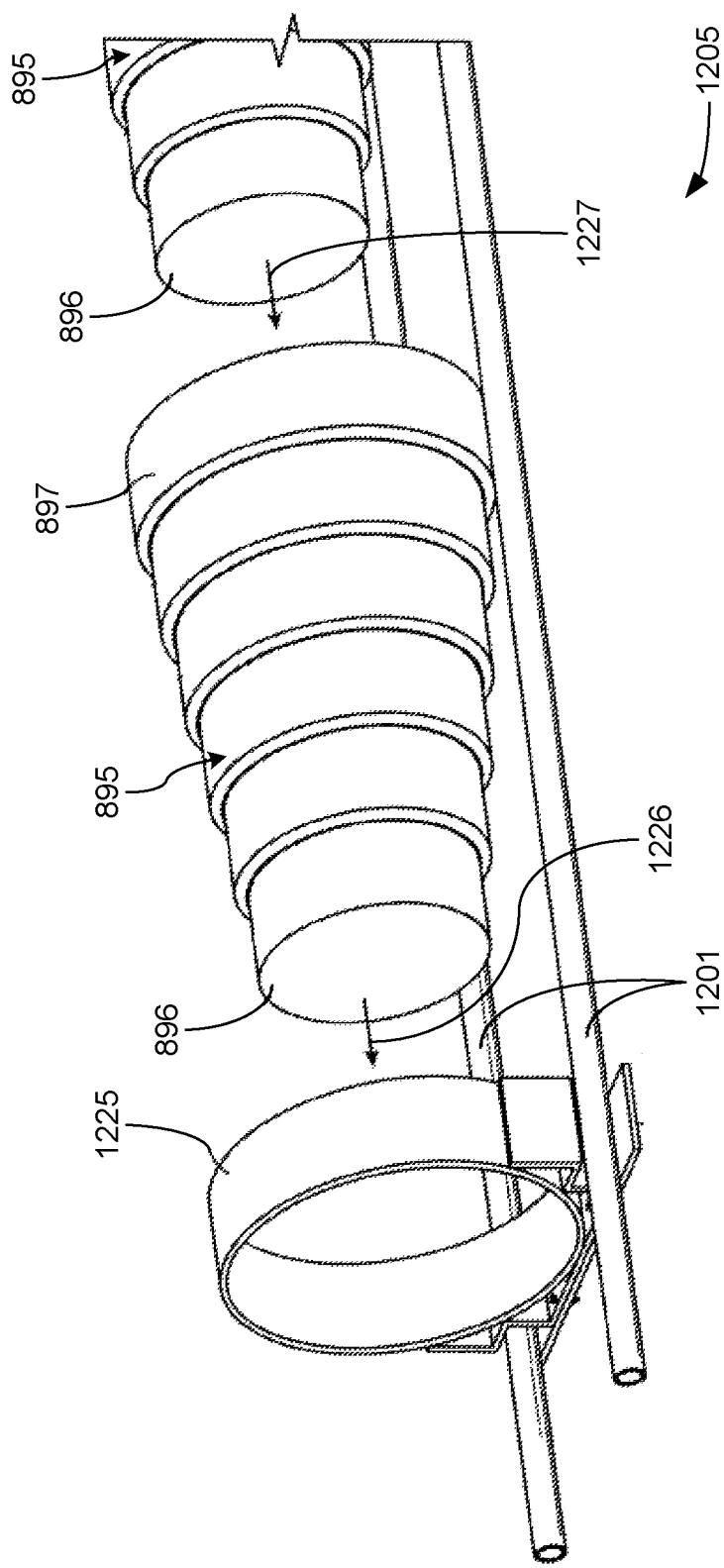

Shown in FIGS. 1A, 1B, 1E and 1J is an over-cab rack attachment 1200 for storing and transporting such barrel-type traffic delineators as are indicated by the numeral 895 in FIG. 1K. When construction and repair work is underway on a roadway surface, such barrel-type traffic delineators 895 are commonly positioned atop the roadway surface to separate lanes of traffic, and to guide traffic around roadway workzones and worksites.

The over-cab rack attachments 1200 shown in FIGS. 1A, 1B, 1E and 1J are each supported by a pair of relatively long upstanding front members 1211 that connect to front fenders of the associated one of the safety truck embodiments 1000, and by a pair of relatively short upstanding rear members 1219 that connect to the pair of flat plate connection points 710 which are provided atop the bulkhead 1030. At least one of the flat plate connection points 710 is shown in each of FIGS. 1A, 1C, 1D, 1I and 1J.

As can be seen in FIG. 1J (and is explained in the previously referenced application Ser. No. 62/638,818 and Ser. No. 16/132,376), the overcab rack attachment 1200 preferably provides three side-by-side forwardly-rearwardly extending rack structures such as is depicted in FIG. 1K.

Referring to FIG. 1K, each of the three side-by-side rack structures of the over-cab rack attachment 1200 includes a pair of tubular supports 1201, along which a hoop structure 1225 can move forwardly and rearwardly. The three identical hoop structures 1225 are of sufficient diameter to receive and support the relatively small diameter upper end regions 896 of a nested plurality of traffic delineators 895 which can be inserted into the hoop structures 1225 as is indicated by an arrow 1226 in FIG. 1K. Because the traffic delineators 895 are hollow, they can be nested by inserting the relatively small diameter front end region 896 of one traffic delineator 895 into the hollow interior of another of the traffic delineators 895, as is indicated by an arrow 1227. The tubular supports 1201 are spaced apart to support the relatively large diameter lower regions 897 of the traffic delineators 895.

Although the barrel-type traffic delineators 895 that can be supported by each of the hoop structures 1225 come in a variety of sizes and configurations, all have in common the closed, relatively small diameter upper end region 896, and the open, relatively large diameter lower end region 897 that provides access to the hollow interior of another traffic delineator 895.

Other details of construction, and a description of how the over-cab rack 1200 is used, are provided in the previously referenced provisional and utility application Ser. Nos. 62/631,840 and 16/132,376, respectively.

3) The Forward & Rearward Sign Cage Attachments 1300 & 1700

Figure 5A:
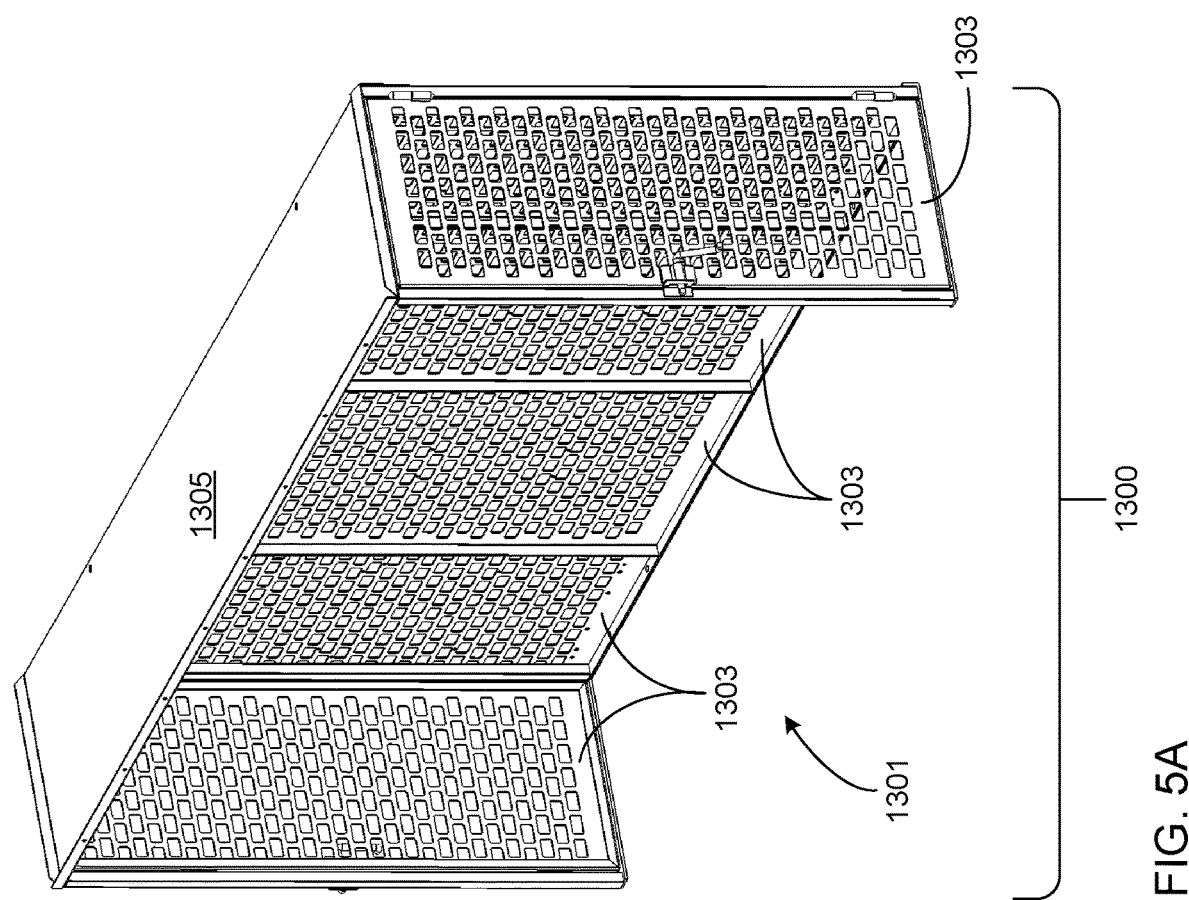
FIG. 5A is a perspective view of a forward sign cage attachment for storing and transporting warning sign components atop a front region connection point of the flat bed of a safety truck.
Figure 5B:
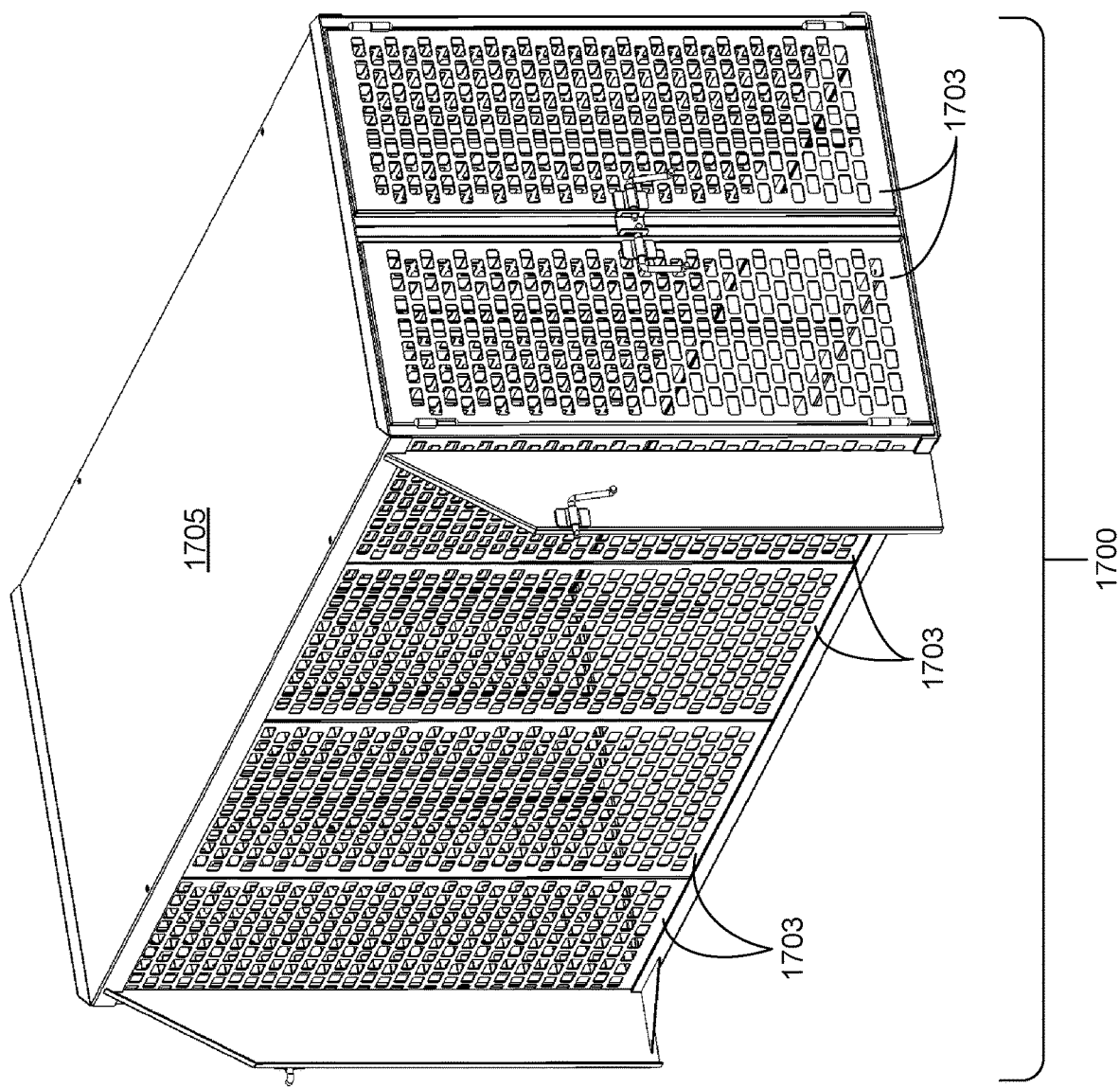
FIG. 5B is a perspective view of a rearward sign cage attachment for storing and transporting warning sign components atop a rear region connection point of the flat bed of a safety truck.
Figure 5C:
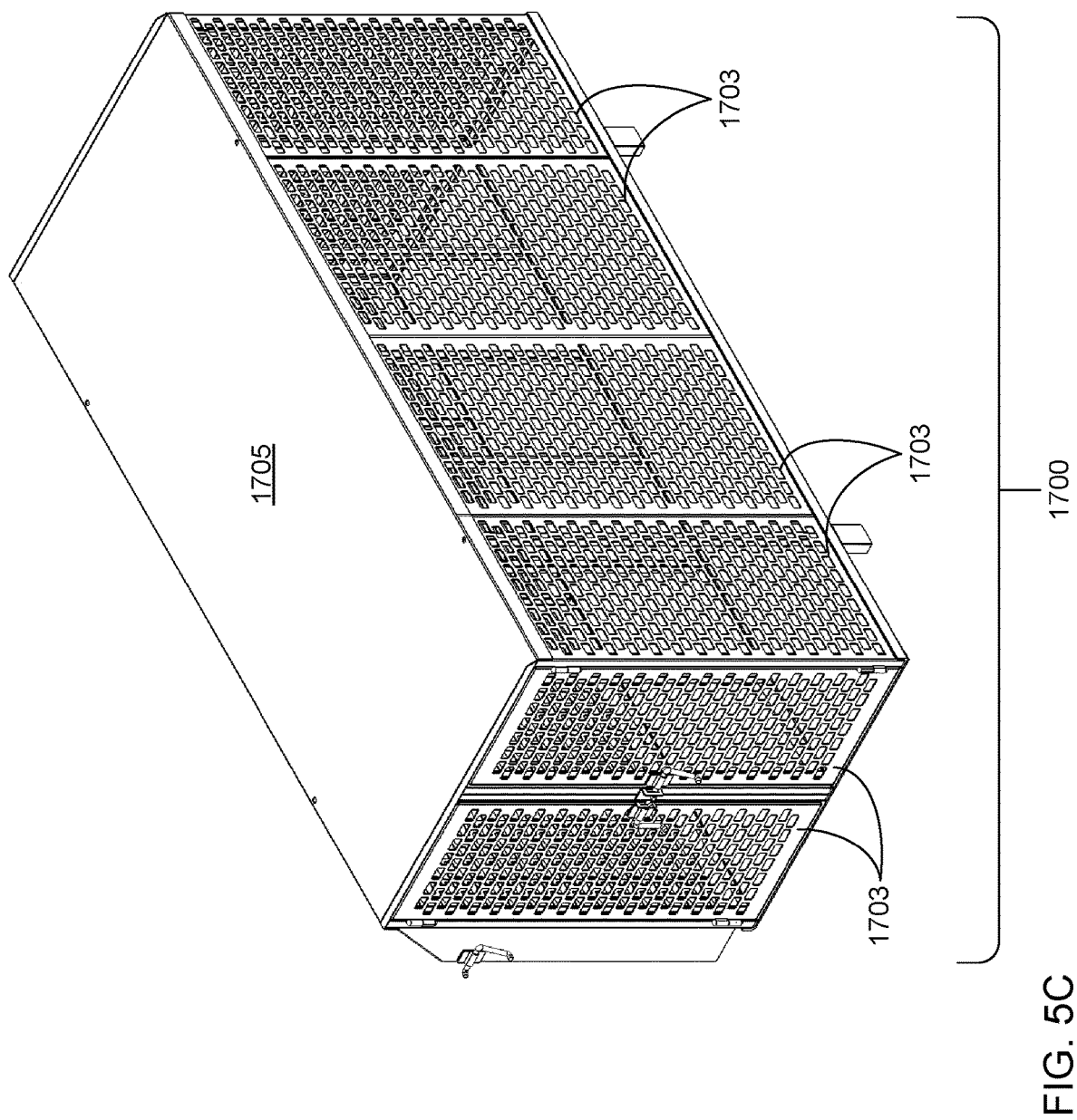
FIG. 5C is another perspective view of the rearward sign cage attachment of FIG. 5B.

The forward sign cage attachment 1300 is best shown in FIG. 5A, where it can be seen that the forward sign cage attachment 1300 has an open front 1301. As can be understood from what is shown in FIG. 3D, the open front 1301 is closed by virtue of the front sign cage 1300 being positioned atop the front connection point region 398 of the flatbed 1040 at a location immediately adjacent to the upstanding bulkhead 1030, so that the bulkhead 1030 closes the open front 1301 of the forward sign cage attachment 1300.

The forward sign cage attachment 1300 is shown positioned atop the forward connection point region 398 of the flatbeds 1040 of safety truck embodiments 1000 in FIGS. 1F, 1G and 1H.

The rearward sign cage attachment 1700 is shown positioned atop the rearward connection point region 399 of the flatbeds 1040 of safety truck embodiments 1000 in FIGS. 1A, 1B, 1C, 1D, 1E and 1I.

Selected ones of the screens 1303, 1703, that form the various upstanding walls of the sign cages 1300 and 1700 can be hinged, so the sign cages 1300 and 1700 can be opened, when needed, to place safety barrier components and/or warning sign components into, and to remove such components from, the front and rear sign cages 1300 and 1700, respectively. The top walls of the sign cages 1300 and 1700, are formed by metal plates 1305, 1705, respectively.

4) The Raisable and Lowerable Arrow Board Attachment 1350

Shown in FIGS. 1G and 4C is one embodiment of an upstanding arrow board attachment 1350 that is supported by one embodiment of the connection point structure 750, as has been explained above. Shown in FIGS. 4A and 4B is another embodiment of the upstanding arrow board attachment 1350 that is supported by a more complex embodiment of the connection point structure 750, as has also been explained above.

Situated between the pairs of upstanding support members 760 is an upstanding hydraulic cylinder 1365 (or other similar component such as a pneumatic cylinder or a linear motor) that can raise and lower the associated arrow board attachment 1350, as has been explained above.

Each of the depicted arrow board attachments 1350 shown in FIGS. 1F, 1G and 1H has a face 1379 that supports light components 1355 which extend away from the plane of the face 1379. The light components 1355 can be selectively illuminated to form left and right pointing arrows to guide traffic around left and right sides of the associated safety truck embodiment 1000.

5) Weight-Frame Defined Connection Point Compartments 1475

As can be seen in FIG. 3A, the pair of elongate, horizontally-extending channel members 300 that form a frame are provided to underlie the forwardly-facing cabs 1020 of the safety truck embodiments 1000. The elongate channel members 300 also extend rearwardly to underlie the flatbeds 1040 of the safety truck embodiments 1000.

Shown in FIG. 3B is a weight frame attachment 1400 that is positioned atop the elongate channel members 300 as is shown in FIG. 3C.

The weight frame attachment 1400 is comprised of a pair of side members 1413 that are interconnected at spaced intervals by a plurality of transversely extending cross members 1415 and rods 1417 that cooperate to define opposite ends of a set of connection point compartments 1475 into which weight attachments 1420 (shown in FIG. 3B) can be inserted to selectively increase the mass of a selected one of the safety truck embodiments 1000.

The weight attachments 1420 can take the form of precast concrete blocks, or can be created by pouring concrete into the compartments 1475.

Referring to FIG. 3B, when the weight attachments 1420 are inserted into the connection point compartments 1475, the associated safety truck embodiment 1000 will have its mass increased so that more kinetic energy will be required to cause the associated safety truck embodiment 1000 to roll forwardly as the result of the associated TMA unit 1950 of the associated safety truck embodiment 1000 being crashed into.

6) Auxiliary Electric Generator Attachments 455

As has been explained, and as is shown in FIGS. 1A, 1B, 1E and 1H, compartments 455 of various sizes and dimensions can be provided to enclose electric generators (not shown) that each is powered by its own gas engine (not shown) to provide such auxiliary electric power as may be needed to operate various ones the attachments that are described in this document.

7) The Man Basket Attachments 1600, 1650 and 2650

The two embodiments of the relatively narrow man basket attachment 1600 that are shown in FIGS. 7C and 7D, are shown on safety truck embodiments 1000 in FIGS. 1F, 1G and 1H. Details and preferred features of the man basket attachment 1600 are disclosed in the previously referenced application Ser. No. 15/913,562 filed Mar. 6, 2018.

The two embodiments of the relatively wide man basket attachment 1650 shown in FIGS. 7A and 78, are shown on safety truck embodiments 1000 in FIGS. 1A, 1B, 1C and 1D. Details and preferred features of the relatively wide man basket attachment 1650 are disclosed in the previously referenced application Ser. No. 62/638,818 filed Mar. 5, 2018, and in previously referenced application Ser. No. 16/159,813 filed Oct. 5, 2018.

The relatively wide man basket attachment 2650 shown in FIGS. 7E, 7F and 7G, is shown on a safety truck embodiment 1000 in FIG. 1E. Details and preferred features of the man basket attachment 2650 are disclosed in the previously referenced application Ser. No. 15/913,562 filed Mar. 6, 2018.

The man baskets 1600 and 1650 have upper doors 1625 and 1675, respectively, that, when closed, continue the level of the flatbed surface 1040, but can be opened to permit personnel to enter the man baskets 1600 and 1650 from the flatbed surface 1040. The upper doors 1675 are best shown in FIGS. 7A and 7B, whereas the upper doors 1625 are best shown in FIGS. 7C and 7D.

The man baskets 1600, 1650 and 2650 have stand-on surfaces 1601, 1651 and 2651, respectively, for supporting personnel at selected heights above a roadway on which an associated safety truck 1000 is driving, while the personnel ergonomically place, install or retrieve such roadway safety articles as reflectors 1997 (which are shown in FIGS. 7F and 7G) man basket 2650 has a seat surface 2652 atop a compartment 2673 wherein supplies and tools may be carried.

The stand-on surface 1601 of the relatively narrow man basket 1600 is shown in FIGS. 1F, 1G, 1H and 7D. The stand-on surface 1651 or the relatively wide man basket 1650 is shown in FIGS. 1A, 1B, 1C, 1D, 7A and 7B. The stand-on surface 2651 of the relatively wide man basket 2650 is shown in FIGS. 1E, 1I, 7E, 7F and 7G.

Referring to FIGS. 7A and 7B, the numeral 1655 designates a gate-like structure, a tubular portion of which can be moved upward and downward to various snap-in-place positions that will assist the gate-like structure 1655 to retain personnel in the man basket 1650. Similarly, in FIGS. 7C and 7D, the numeral 1605 designates another gate-like structure that has a tubular portion that can be moved up and down to various snap-in-place positions that will assist the gate structure in retaining personnel in the man basket 1600.

Each of the various stand-on surfaces mentioned in this document (for example, the stand-on surfaces 1601, 1651 and 2651 of the man baskets 1600, 1650 and 2650) can be provided with a simple mechanism for raising and lowering the stand-on surface relative to nearby upstanding housing walls. For example, as is shown schematically in FIG. 7H, any stand-on surface xxx1 can have an attached upstanding member xxx2, to which a ram of a hydraulic cylinder xxx3 (or other linear movement device) can be attached, with a housing of the hydraulic cylinder xxx3 being connected to an upstanding wall member xxx4, so that operation of the hydraulic cylinder xxx3 will cause the stand-on surface xxx1 to be raised or lowered relative to the upstanding wall member xxx4.

Moreover, as is shown in FIGS. 1E, 1I, 7E and 7F, the relatively wide man basket 2650 is preferably provided with a pair of upstanding posts 2669 for guiding up and down movements of the entire man basket 2650, by which arrangement, the entire man basket 2650 can be raised and lowered to travel from where the stand-on surface 2651 is at the level of the flatbed 1040, to a level only a few inches above an underlying road surface on which the associated safety truck 1000 is being driven.

Additionally, certain ones of the man baskets 1600, 1650 and 2650 may be provided. With compartments or the like that can carry a supply of adhesive and/or hand tools (not shown) for Attaching reflectors 1997 or other roadway safety markers 1998 (shown in FIG. 7F) to roadway surfaces 1999 along which a safety truck 1000 drives.

The man baskets 1600, 1650, 2650 may also be provided with displays (not shown) that enable roadway workers carried by the man baskets 1600, 1650 and 2650 to view images and/or other information captured by one or more of the cameras, sensors and/or speed detection radar units 1513 (shown in FIGS. 1E and 1I) that may be carried by an associated safety truck embodiment 1000 and/or by various safety attachments of the associated safety truck embodiment 1000), and may have wire-based and/or wireless communications that permit personnel within the man baskets 1600, 1650 and 2650 to communicate with a driver of the associated safety truck embodiment 1000 who may be stationed within a cab 1020 of the associated safety truck 1000.

Referring to FIGS. 7E, 7F and 7G, the depicted man basket attachment 2650 has a housing 2661 that can be raised or lowered by a suitable power lift mechanism (not shown) to position the stand-on surface 2651 at a level below the flatbed surface 1040 and above an underlying roadway surface so a roadway worker who is standing atop the surface 2651 or who is seated atop a seat surface 2652 can perform various activities atop a roadway surface 1999 along which the associated safety truck 1000 is being driven.

One or more dispensers 2677 (shown in FIG. 7E) may be provided on one or more of the upstanding walls of the housing 2661 to hold a supply of reflectors 1997 (FIG. 7G) or other items that are to be installed on a roadway surface such as is indicated by the numeral 1999 in FIG. 7F. Controls (not shown) may be provided wherever within the housing 2661 wherever is most convenient for roadway construction workers to operate actuators (not shown) to selectively raise or lower the man basket attachment 2650 relative to the flatbed 1040 of the safety truck 1000. Manually operable controls (not shown) may also be provided in the man basket 2650, such as a throttle control (not shown) to increase or decrease the speed of the associated safety truck embodiment 1000, and/or a braking control (not shown) to stop the safety truck embodiment 1000.

8) The Raisable and Lowerable Display Board Attachment 1800

The raisable and lowerable display board 1800 shown in FIGS. 1B, 1C, 1D, 1E, 1I is preferably supported by a pair of uprights 1805 that are shown in FIGS. 6A, 6B, 6C, 6D, 6E and 8E. A hydraulic cylinder or other device capable of imparting linear motion (not shown) may be provided for raising the display board 1800 relative to a base structure 1810 in much the same manner as a hydraulic cylinder 1365 is provided (as shown in FIGS. 4A, 4B and 4C) for selectively raising and lowering the arrow board 1350.

The rearwardly-facing raisable and lowerable display board attachments 1800 are shown in raised positions in FIGS. 1B and 1E, and in lowered positions in FIGS. 1C, 1D, 1I. As is shown schematically in FIGS. 6A, 6B, 6D and 6E, the display board 1800 may carry cameras and/or speed detection radar units such as are indicated by numerals 1513 in FIGS. 1E and 1I—which may provide information to a control system (not shown) of an associated safety truck embodiment 1000 to predict impending collisions and/or other impending dangers to construction personnel, and may act to provide warnings to construction personnel. The speed detection radar of a display board attachment 1800 may be programmable to detect separate speeds of separate vehicles where each vehicle occupies a separate lane of a roadway.

The display board attachment 1800 may incorporate any of a variety of raster scan display technologies that present a grid of pixels that are able to be selectively illuminated, darkened and/or given any of a variety of colors. Such technologies include, and are not limited to, a liquid crystal display (LCD) panel, an electroluminescent (EL) display panel, a grid of discrete light emitting (LEDs), etc. Regardless of the exact display technology used, such a display may be operable as an all-points addressable display device capable of displaying text, graphical elements (e.g., depictions of road signs, symbols, etc.), motion graphics, motion video, etc.

An embodiment of the safety truck 1000 to which the display board attachment 1800 is connected may be parked at a location along a roadway portion that precedes a roadway workzone or worksite. While the safety truck 1000 remains stationary at that location, the display board attachment 1800 may be deployed to provide visible notices of a reduced speed limit in the vicinity of the associated roadway workzone or worksite, to employ radar incorporated into the display board attachment 1800 to detect the speeds of oncoming vehicles while the display board 1800 displays indications of the detected speeds of oncoming vehicles as well as imagery and/or textual messages reminding the motorists driving the oncoming vehicles to obey the reduced speed limit and/or to advise such motorists to be watchful for the presence of construction equipment, vehicles and/or personnel that may enter into the path of the oncoming vehicles.

9) The TMA Unit Attachments 1900

The safety truck embodiments 1000 shown in FIGS. 1A through 1E and 1I carry rearwardly-extending TMA unit attachments 1900 that are designed to crumple in a controlled manner to dissipate and absorb the kinetic energy of a roadway vehicle that may accidentally crash into the TMA unit attachments 1900 that extends rearwardly from such safety truck embodiments 1000 as are shown in FIGS. 1A through 1G and 1I.

The TMA unit attachments 1900 are each comprised of two hinge-connected components 1935 and 1949. The forward component 1935 can be folded upwardly (as is shown in FIGS. 1C, 1D, 1I, 6A and 6B), and the rearward component 1949 can be folded forwardly (as is shown in FIGS. 1C, 1D, 1I, 6A and 6B) to a transport position shown in FIGS. 1C, 1D, 1I, 6A and 6B.

Hinges 1937 that are shown schematically in FIGS. 6A, 6B, 6C, 6D and 6E pivotally connect the components 1935, 1949 of the TMA units 1900. Hinges 1923 that are shown schematically in the same FIG. 6A through GE pivotally connect the component 1935 to the base structure 1810 also shown schematically in the same FIGS. 6A through 6E.

Shown in FIG. 6A is an upstanding support 1090 atop which is a plate 1099 onto which the forwardly extending component 1949 of the TMA unit attachment 1900 can rest when pivoted to the TMA unit's transport position shown in FIG. 6A.

10) The Safety Basket Attachment 1950

Shown in FIGS. 1F and 1G is a safety basket attachment 1950 that can be connected to rear portions of the safety trucks 1000 when no TMA unit 1900 is attached to the rear of a particular one of the safety truck embodiments 1000.

The mounting component 1810 may also carry the display board attachment 1800, and provides a way in which the display board attachment 1800 and the TMA unit 1900 can be releasably connected to a selected one of the safety trucks 1000. The safety basket attachment 1950 may include a generally rectangular open-top basket structure fabricated from metal tubing and/or rods.

As is shown in FIG. 8F, the safety basket attachment 1950 may include a hitch receiver 1999 that may take the form of a square 2 inch by 2 inch (or larger) receiver tube that, depending at least on the strength of the connection between the safety basket 1950 and the associated safety truck embodiment 1000, may conform to the specifications for a class IA or IVY (or higher) trailer hitch promulgated by SER International. Thus, the hitch receiver 1999 may enable a trailer or other accessory to be connected to the rear of the safety truck 1000 through the safety basket 1950.

11) The Step Bumper Attachment 2000

Shown in FIGS. 1H, 8B, 8C and 8D is a step bumper attachment 2000 that can be connected to a rear region of one of the safety truck embodiments 1000 in place of the TMA unit 1900 and in place of the safety basket attachment 1950 to address low speed vehicle impacts, and to enable construction personnel to step onto and off of the flatbed 1040 of a safety truck 1000 quickly, easily and safely. A step surface is indicated by the numeral 2975 in FIGS. 8B and 8C.

Such a step bumper attachment 2000 can be attached to the rear of a safety truck 1000 when no TMA unit is connected to the rear of the safety truck 1000. The step bumper attachment 2000 serves the dual purposes of providing some degree of protection from minor vehicular impacts to the rear of a safety truck 1000, and provides a step at a level between the roadway surface and a flatbed surface 1040. The step bumper attachment 2000 permits roadway construction personnel to more safely climb onto the surface of the flatbed 1040, or to descend from the flatbed surface 1040 to the roadway surface on which the safety truck 1000 is being driven.

12) Cameras and Radar Speed Detection Attachments 1513

Schematically depicted in FIGS. 1E and 1I are a few of the many cameras and radar speed detection attachments 1513 that may be mounted on portions of safety truck embodiments 1000, or on various ones of the attachments to the safety truck embodiments 1000. Each of the many camera and speed detection attachments 1513 may be aimed at, and/or otherwise configured to capture real-time images of portions of the safety truck embodiments 1000, and/or portions of one or more lanes of a roadway surface being traversed by a safety truck embodiment 1000, including images of other vehicles that may be in motion in roadway lanes extending around one or both sides of the safety truck embodiment 1000.

DIVISION C: Summary of the Use of Combination Safety Truck and TMA Units to Protect Workzones and Worksites The long list of connection points described above in Division A, taken together with the long list of attachments described above in Division B, provide considerable flexibility to create many different safety truck configurations 1000, including but not limited to the possible embodiments depicted in FIGS. 1A through 1I.

Further, the relative ease with which some of the attachments may be releasably connected to at least the front-most connection point 650, and the rearward connection points 800 and 850, enables further configuration and reconfiguration of safety truck embodiments 1000 in the field, including on roar and/or at worksites.

Through such flexibility of configuration, various embodiments of the safety truck 1000 may be configured in various ways to perform different safety enhancing functions at a roadway worksite at different times, as the safety needs of a particular roadway worksite change over time.

By way of example, an embodiment of the safety truck 1000 incorporating the over-cab storage rack 1200 and the man basket(s) 1600, 1650 or 1650, and to which a combination of the display board 1800 and the TMA 1900 has been attached, may initially be used to distribute warning signage and/or safety barriers along a portion of a roadway that leads up to the location of a worksite. More precisely, while one member of a team of construction personnel drives such an embodiment of the safety truck 1000 from within the cab 1020, another member of the team may stand on a lowered support surface 1601 or 1651 provided by a man basket 1600 or 1650, respectively, as such an embodiment of the safety truck 1000 is driven slowly alongside a portion of roadway to place warning signage and/or safety barriers in a manner that forms a boundary line thereof. Still another member of the team may stand upon a flatbed 1040 of the safety truck 1000 to retrieve stacks of barrel-type traffic delineators 895 from the over-cab rack 1200 to replenish the supply of traffic delineators 995 being placed by the team member standing within the man basket 1600 or 1650.

As is familiar to those skilled in the art, such a line of warning signage and/or traffic delineators 995 may define the boundaries of a worksite and/or to shift a lane of traffic to make needed room for the roadway worksite. Additionally, during such activity, the display board attachment 1800 may be deployed to provide visible warnings of at least the presence of such a slow moving embodiment of the safety truck 1000 to make motorists aware of the need to drive around the safety truck 1000.

Further, during such activity, the TMA unit attachment 1900 may be deployed to extend rearwardly from such an embodiment of the safety truck 1000 to provide a degree of protection against the impact of a vehicle driven by a motorist who somehow does not notice or does not take appropriate action in response to the warnings provided by the deployed display board attachment 1800.

By way of another example, an embodiment of the safety truck 1000 to which a combination of the display board attachment 1800 and the TMA unit attachment 1900 have been connected may be parked at a location along a roadway 999 that precedes a roadway worksite. While such an embodiment of the safety truck 1000 remains stationary at that location, the display board attachment 1800 may be deployed to provide visible notices of a reduced speed limit in the vicinity of the roadway worksite.

Additionally, a radar speed detection attachment 1513 may be connected to an embodiment of the safety truck 1000, and/or the display board attachment 1800 may incorporate radar to detect the speeds of oncoming vehicles. In such embodiments, the display board attachment 1800 may be used to display indications of the detected speeds of oncoming vehicles, and to display any of a variety of visual imagery and/or textual messages reminding the motorists driving the oncoming vehicles to obey the reduced speed limit, and/or to advise such motorists to be watchful for the presence of construction equipment, vehicles and/or personnel that may enter the path of the oncoming vehicles.

Further, while such an embodiment of the safety truck 1000 remains stationary, the TMA unit attachment 1900 may be deployed to extend rearwardly therefrom to provide some degree of protection against the impact of a vehicle driven by a motorist who somehow does not notice, or does not take appropriate action in response to the warnings and notice provided by the deployed display board attachment 1900.

Although a single one of the safety truck embodiments 1000 may provide various features that can be used to improve the safety or a roadway worksite, it may be deemed desirable and/or may be necessary to employ a line of safety trucks 1000 in a cooperative manner to more effectively do so.

Although it has been known in the prior art to use a single combination safety truck 100 and TMA unit 1900 to protect personnel working in and near a roadway workzone or worksite, this has not always provided either a proper or a complete solution to the problem of protecting personnel who are working in and relatively near to a workzone or worksite.

A first problem that arises when providing a combination safety truck and TMA unit (positioned just rearwardly from a workzone or worksite) to protect the workzone or worksite is that, when a roadway vehicle traveling a typically fast highway speed crashes into the TMA unit of a combination safety truck and TMA unit is that the very substantial kinetic energy of the fast-moving roadway vehicle is almost always sufficiently extreme as to NOT ONLY cause a crashed-into TMA unit to be crumpled, BUT ALSO to cause the crashed-into combination safety truck and TMA unit to roll forwardly after its TMA unit has crumpled. This "roll forwardly" problem can cause a workzone or worksite that was intended to be protected to be invaded by the combination safety truck and TMA unit that has been caused to "roll forwardly."

A similar problem can arise if a series of two or more combination safety trucks and TMA units are positioned just rearwardly from a workzone or worksite (that is intended to be protected), namely that, after the TMA unit of any one of the combination safety truck and TMA units has been crumpled, the crashed-into combination safety truck and TMA unit is caused to roll forwardly to either crash into a next combination safety truck and TMA unit and/or to cause the most forward-most of the combination safety trucks and TMA units to roll forwardly to invade the workzone or worksite that was intended to be protected.

To prevent such problems as are explained above, the inventors of the present invention have formulated the following guidelines that should be obeyed, namely that:

1) Not only should the forwardmost combination safety truck and TMA unit be spaced sufficiently far to the rear of a workzone or worksite (that is to be protected) to prevent the forwardmost combination safety truck and TMA unit from "rolling forwardly" to invade the workzone or worksite (that is to be protected), but also that:

2) All combination safety truck and TMA units in a series of combination safety truck and TMA units (positioned to the rear of a workzone or worksite that is to be protected) must be spaced sufficiently far to the rear of other adjacent ones of the combination safety truck and TMA units so that no "rolling forwardly" of the combination safety trucks and TMA units will cause anything more than crumpling of the TMA units (of the spaced series of combination safety trucks and TMA units).

3) As an additional safeguard, weight attachments 1420 such as are shown in FIG. 3A may be inserted into the compartments 1475 of the weight frame attachment 1400 to increase the inertia of the associated safety trucks 1000 so the trucks can better resist the tendencies of these associated safety trucks 1000 to "roll forwardly"—which will minimize the distances through which these safety trucks 1000 "roll forwardly" to thereby minimize the problems that are explained above.

As still another safeguard, only the forwardmost one of the combination safety truck and TMA units should carry any personnel on the flatbed 1040 and in the man basket(s) 1600, 1650 and/or 2650, and each of the other ones of the combination safety truck and TMA units should carry personnel only within the cab 1020. This serves to reduce the possibility that personnel may be hit with flying debris from a vehicular collision with the rearmost one of the combination safety truck and TMA unit. This also takes advantage of the fact that the forwardmost one of the combination safety truck and TMA unit will be subjected to the lowest magnitude of kinetic energy from a vehicular crash with the TMA unit of the rearmost one of the combination safety truck and TMA unit. As a result, personnel standing atop the flatbed 1040 and/or in the man basket(s) 1600, 1650 and/or 2650 of the forwardmost one of the combination safety truck and TMA unit are least likely to be thrown therefrom during such a vehicular crash.

If the guidelines explained just above are followed, the damage to safety trucks can usually be limited to a progressive and sequential crumpling of TMA units when one or more combination safety truck and TMA units are provided to protect a particular workzone or worksite, AND will ensure that the protected workzones and worksites are not invaded by front-most ones of the safety trucks 1000 as to cause injuries to personnel working within and near to the protected workzones and worksites.

FIGS. 9A through 9H, taken together, depict various detailed aspects of example embodiments of use of a line of safety trucks 1000a through 1000x to protect a roadway worksite. FIGS. 9A-B depict two embodiments of such a line of safety trucks, and FIGS. 9C-H depict various aspects of embodiments of controllers 1500 incorporated into such safety trucks to provide various features in support of such use of such a line of safety trucks.

FIG. 9A depicts an example of a deployment of a line of safety trucks 1000a, 1000b and onward to 1000x that are each equipped with a TMA unit 1900, and that are positioned end-to-end at a location along a reach of roadway 999 that precedes (i.e., leads up to) the location of a roadway worksite. If the TMA unit 1900 of the rearward-most safety truck 1000a is hit from behind by an oncoming vehicle moving at highway speed, the TMA unit 1900 thereof may absorb an initial significant amount of the kinetic energy exerted thereon, while much of the rest of that kinetic energy may cause the rearmost safety truck 1000a to roll forwardly and collide with the TMA unit 1900 of the next safety truck 1000b in the line of safety trucks. The TMA unit 1900 of the next safety truck 1000b in the line of safety trucks may then absorb another significant portion of the kinetic energy so that, even if the next safety truck 1000b in that line is also caused to roll forwardly, it will be at a significantly reduced speed compared to the speed at which the rearmost safety truck 1000a was caused to roll forward. As that next safety truck 1000b in the line is caused to roll forwardly, the TMA unit 1900 of still another safety truck 1000 (e.g., the forwardmost safety truck 1000x, or another intervening safety truck 1000 that is not shown) in the line may then absorb still more of the kinetic energy, and so on.

This combination of absorption and transfer of portions of an ever diminishing amount of kinetic energy among the safety trucks 1000a through 1000x in such a line may continue to propagate through that line until the TMA unit 1900 of the forwardmost safety truck 1000x may also be impacted and absorb much of the greatly diminished remainder of the kinetic energy from the collision so that the forwardmost safety truck 1000x may not move at all. As a result, personnel, construction machinery and/or construction vehicles (such as the depicted safety truck 1000z) located in front of the forwardmost safety truck 1000x of the depicted line of safety trucks are protected from the collision.

The same protections that are provided to a roadway worksite by a stationary line of safety trucks 1000a through 1000x may also be provided to a slow moving vehicle associated with a roadway worksite, such as the aforedescribed example of a slow moving safety truck 1000 employed to carry personnel who are placing a line of warning signage and/or safety barriers along a lengthy portion of roadway leading up to a roadway worksite. More specifically, it may be deemed desirable to position such a slow moving safety truck 1000 as the forwardmost safety truck 1000x in a line of safety trucks 1000a through 1000x (again referring to FIG. 9A), where the entire line of safety trucks 1000a through 1000x moves slowly in unison. In this way, personnel standing on the flatbed 1040 and/or within the man basket(s) 1600, 1650 and/or 2650 of the forwardmost safety truck 1000x are protected from at least the majority of the kinetic energy that would be exerted in a collision of a vehicle with the TMA unit 1900 of the rearmost safety truck 1000a.

Further, where the quantity of warning signs and/or safety barriers to be placed along the roadway 999 is sufficiently large that no single safety truck 1000 is able to carry all of them, the relative positions of the safety trucks 1000a through 1000x within the line of safety trucks may be changed as the supply of warning signs and/or safety barriers carried within each of the safety trucks 1000 in the line is exhausted so that whichever one of the safety trucks 1000a through 1000x is currently employed in placing the warning signs and/or safety barriers is always at the forward-most position in the line of safety trucks (i.e., becomes the forward-most safety truck 1000x).

Correspondingly, the depicted line of safety trucks 1000a through 1000x may, at another time, be driven slowly and in unison to pick up a line of warning signage and/or safety barriers along a lengthy reach of roadway, instead of placing them. More specifically, it may be deemed desirable to position a slow moving safety truck 1000 that is being utilized to pick up such warning signage and/or barriers from a roadway surface as the forward-most safety truck 1000x in such a slow moving line of safety trucks 1000a through 1000x.

Again, the personnel standing on the flatbed 1040 and/or within the man basket(s) 1600, 1650 and/or 2650 of the forward-most safety truck 1000x are protected from at least the majority of the kinetic force that would be exerted in a collision of a vehicle with the TMA unit 1900 of the rearmost safety truck 1000a. Further, where the quantity of warning signs and/or safety barriers to be retrieved from atop the roadway 999 is sufficiently large that no one safety truck 1000 is able to carry all of them, the relative positions of the safety trucks 1000a through 1000x within the line of safety trucks may be changed as each of the depicted safety trucks is filled to its capacity with warning signs and/or safety barriers collected from atop the roadway 999 so that whichever one of the safety trucks 1000a through 1000x is currently employed in picking up the warning signs and/or safety barriers is always at the forwardmost position in the line of safety trucks (i.e., becomes the forwardmost safety truck 1000x).

Regardless of whether such a line of safety trucks 1000a through 1000x are employed to provide protection while stationary or while moving, and/or are employed to place or remove a line of warning signage and/or safety barriers, more than one of the safety trucks 1000a through 1000x may also have a display board attachment 1800 carried thereby and deployed. In this way, a line of display board attachments 1800 may be provided and operated to display warning messages or detected vehicular speeds, etc., in an effort to provide an even more conspicuous visual notice of the upcoming roadway worksite, and of the need for motorists to slow down and/or alter their path of travel while passing the roadway worksite.

Where such a set of the safety trucks 1000 are used in such a cooperative manner, wireless communications may be employed among those safety trucks 1000 to enable voice communications between the teams of personnel who are associated with different ones of those safety trucks 1000, to enable data to be shared thereamong for recording, and/or to enable warnings of impending vehicular collisions and/or other vehicle-related dangers to be relayed thereamong.

As an alternative to the depicted line of safety trucks 1000a through 1000x being utilized solely for purposes of providing protection for either a stationary or a slow rolling worksite, in other embodiments, such a line of safety trucks may be more directly involved in the performance of the work at a rolling worksite in addition to performing their various safety functions. More specifically, the forwardmost safety truck 1000x may, itself, be involved in the actual work of a slow rolling worksite with the remainder of the safety trucks 1000a, 1000b, etc., positioned behind it to provide protection for it against a vehicular crash.

By way of example, at least the forwardmost safety truck 1000x may be equipped with one or more of the man baskets 2650 by which a member of working personnel may be positioned relatively close to the roadway surface to perform such work as installing and/or replacing a line of the roadway reflectors 997 that cooperate with painted lines 998 (shown in FIG. 7F) to define separate lanes of a roadway surface 999, as previously explained.

As with the above example of placing a line of warning signage and/or safety barriers, supplies of new roadway reflectors 997 and the various adhesives and/or anchoring hardware used to affix the reflectors 997 to the roadway surface 999 are exhaustible resources of which the forwardmost safety truck 1000x can carry only finite amounts. Thus, as with the above example of placing a line of warning signage and/or safety barriers, as the supply of new roadway reflectors 997, and/or the supply of associated adhesives and/or anchoring hardware, carried by the forwardmost safety truck 1000x is exhausted, the positions of the forwardmost safety truck 1000x and another of the safety trucks 1000a, 1000b, etc., in the line of safety trucks that is fully supplied with new reflectors 997 and associated adhesives and/or anchoring hardware may be exchanged to cause that other one of the safety trucks in the line to become the new forwardmost safety truck 1000x.

Again, in this way, the guideline that only the forwardmost safety truck 1000x is permitted to have personnel stationed on its flatbed 1040 and/or within such open and vulnerable positions aboard one of the other safety trucks that is located closer within the line to where a vehicle may collide with the TMA unit of the rearmost safety truck 1000a.

Further, the relative ease with which at least some attachments needed by the forward-most safety truck 1000x are able to be quickly and efficiently switched among the safety trucks within the line of safety trucks 1000a through 1000x may enable those attachments to always be releasably attached to whichever one of the safety trucks within the line becomes the forward-most safety truck 1000*x*.

By way of example, the rumble strip basket attachment 1100 may be releasably connected to the forwardmost attachment point 650 of the forward-most safety truck 1000*x* in embodiments in which the forward-most safety truck 1000*x* is employed to install a lengthy set of rumble strips (e.g., sets of rumble strips that occupy a shoulder of a highway to discourage improper use thereof).

As has been discussed in regard to other exhaustible resources that may be carried by the forwardmost safety truck 1000*x*, as the supply of rumble strips carried by the forward-most safety truck 1000*x* is exhausted, the forward-most safety truck 1000*x* may be exchanged with another of the safety trucks within the line of safety trucks 1000*a* through 1000*x* such that the other of those safety trucks becomes the new forwardmost safety truck 1000*x*. As part of this exchange of safety trucks, the rumble strip basket attachment 1100 may be detached from the forwardmost connection point 650 of the safety truck 1000 that is to cease being the forwardmost safety truck 1000*x*, and then attached to the forwardmost connection point 650 of the other safety truck 1000 that then becomes the forward-most safety truck 1000*x*.

Still further, the relative ease with which at least some attachments needed by each of the safety trucks within the line of safety trucks 1000*a* through 1000*x* depicted in FIG. 9A are able to be quickly and efficiently switched between the safety trucks within the line and others that are not may enable those attachments to be releasably attached to a safety truck 1000 that is exchanged for one within the line of safety trucks 1000*a* through 1000*x* that needs to be pulled out of the line.

By way of example, it may be that one of the safety trucks within the line of safety trucks 1000*a* through 1000*x* develops a mechanical problem or other issue that requires its replacement with another safety truck 1000 that is not already within the line, and that may not already be specifically configured for inclusion in the line (e.g., the safety truck 1000*z*, which as previously discussed, may be involved in other work at the worksite). At a minimum, the provision of the rearward connection points 800 and/or 850 may improve the ease with which attachments that are connected thereto on both trucks involved in such an exchange may be detached and switched therebetween. Thus, for example, the depicted safety truck 1000*z* with its safety basket attachment 1950 may be swapped for the TMA unit 1900 attached to the one of the safety trucks 1000*a* through 1000*x* within the line that the safety truck 1000*z* is to replace, thereby allowing the replaced safety truck from the line to be driven (or towed, if need be) to where the mechanical problem can be addressed.

It should be noted, however, that mechanical problems are not the only reason why safety trucks within the line of safety trucks 1000*a* through 1000*x* may need to be replaced. For example, where the line of safety trucks 1000*a* through 1000*x* are operated in unison in support of slowly moving worksite, and/or to place or pick up a line of warning signage and/or safety barriers, it may be that each of the safety trucks within the line must be replaced periodically to allow each to be driven to a refueling station or other location for refueling. The aforedescribed ability to relatively easily switch at least TMA units 1900 between safety trucks 1000 that are used to replace those within the line and that are replaced may greatly reduce the effort required to do so.

FIG. 9B depicts another example of a deployment of a line of safety trucks 1000*a*, 1000*b* and onward to 1000*x* to illustrate some of the flexibility that is enabled by the provision of the connection points 650, 800, 850 on forwardmost and rearmost portions of each of the safety trucks 1000*a* through 1000*x*. More specifically, FIG. 9B depicts that 1) a single TMA unit 1900 may be releasably attached to the rear of a safety truck 1000 (as specifically shown with safety truck 1000*a*), 2) one each of a pair of TMA units 1900 may be releasably attached to both the front and rear of a safety truck 1000 (as specifically shown with safety truck 1000*b*); and 3) a single TMA unit 1900 may be releasably attached to the front of a safety truck 1000 (as specifically shown with safety truck 1000*c*). As further depicted, as long as there remains at least one TMA unit 1900 interposed between each pair of adjacent safety trucks 1000 in the line of safety trucks 1000*a* through 1000*x* used to protect a worksite (whether stationary, or not), direct collisions between pairs of adjacent safety trucks 1000 are avoided, and the TMA units 1900 within the line are able to perform their earlier described function of progressively absorbing more and more portions of the kinetic energy imparted by a collision by a motor vehicle.

As previously mentioned, FIGS. 9C through 9H, taken together, depict various detailed aspects of an example embodiment of a controller 1500 that may be incorporated into each of the safety trucks 1000*a* through 1000*x* of the line of safety trucks to implement and/or support various safety features thereof. The controller 1500 (depicted in FIG. 9G) may be implemented with any of a variety of processing devices capable of performing a variety of recording, calculation and/or decision making operations. In some embodiments, at least core components of the controller 1500 may be installed within the cab 1020 of each of the safety trucks 1000*a* through 1000*x*.

Turning to FIGS. 9C-E, multiple devices that provide inputs to the controller 1500 may be carried at various locations throughout the length of a safety truck 1000. Among such devices may be a set of cameras, including: a camera 1511 that may be carried either behind a windshield of the cab 1020 or on a portion of the over-cab barrel-type storage rack 1200 to capture imagery of the area in front of the safety truck 1000; a camera 1512 positioned within the cab 1020 to capture imagery of the driver of the safety truck 1000; a camera 1513 that may be carried on a portion of the bulkhead 1030 to capture imagery of events occurring on the flat bed 1040; a camera 1517 that may be carried either on a portion of the rearward sign cage 1700 or a forward-facing portion of the display board 1800 to capture imagery of events occurring on the flat bed 1040; a camera 1518 carried on a rearward-facing portion of the display board 1800 to capture imagery of the area behind the safety truck 1000; and/or a camera 1519 carried on one of the sections 1935 or 1949 of a TMA unit 1900 to capture imagery of the area behind the safety truck 1000. The imagery captured by each of these cameras and provided to the controller 1500 for storage may include motion video and/or still images (e.g., sequences of still images captured at a recurring interval).

Turning to FIGS. 9E-F, among the devices providing inputs to the controller 1500 may also be various sensors that detect various aspects of the operation of the safety truck 1000 and/or its safety features. Such sensors may include: one or more sensors 1538 that may be incorporated into the display board 1800 to detect deployment and/or stowage thereof; one or more sensors 1539 that may be incorporated into the TMA 1900 to detect deployment and/or stowage thereof; and/or one or more vehicle sensors 1004 incorporated into the engine, transmission, brakes and/or other components of the safety truck 1000, and which may be made accessible to the controller 1500 through an implementation of a vehicle bus 1005 serving as an internal network of the safety truck 1000 by which such components of the safety truck 1000 may exchange information pertinent to the operation of those components. Additionally among the sensors carried at various locations throughout the safety truck 1000 may be a speed detection radar 1528 incorporated into a portion of the display board 1800 to detect the speeds of vehicles approaching the safety truck 1000 from behind, at least at times when the display board 1800 is deployed.

Also among the devices providing inputs to the controller 1500 may be various devices incorporating microphones by which speech sounds and/or other sounds may be captured and provided to the controller 1500 for storage. Such microphones may include: microphone(s) incorporated into one or more of the cameras 1511, 1512, 1513, 1517, 1518 and 1519; one or more separate microphones that may be installed in portions of the safety truck 1000 that are used to carry personnel, such as within the cab 1020; and/or microphone(s) incorporated into each of multiple headsets 1592 that may be wirelessly coupled to the controller 1500, and may use the controller 1500 as a base station to enable the exchange of voice communications among the multiple headsets 1592.

In addition to various devices carried at various locations throughout the length of the safety truck 1000 providing inputs to the controller 1500, some of the same devices and/or still other devices may receive outputs from the controller 1500. The devices receiving outputs from the controller 1500 may include one or more display devices 1575 incorporated into the display board 1800 to present visual indications to motorists of current speed limit, the speeds at which the motorists are detected as driving, various messages conveying safety information, notices of the fact that motorists are being video recorded, and/or portions of captured video of the motorists to emphasize that they are being video recorded. Alternatively or additionally, the devices receiving outputs from the controller 1500 may include one or more actuators incorporated into various safety features of the safety truck 1000 to permit automated control thereof, including and not limited to, the actuator(s) 1865 incorporated into the display board 1800, and/or the actuators 1923 and/or 1937 incorporated into the TMA unit 1900. Also alternatively or additionally, the devices receiving outputs from the controller 1500 may include the aforementioned headsets 1592, lights 1002 and/or horn(s) 1003 to which the controller 1500 may transmit various informational sounds, and/or which the controller 1500 may operate to generate informational sounds and/or visual indications, to provide indications of various conditions, such as warning sounds of a detected, developing and/or potential dangerous situation.

Also among the devices receiving outputs from the controller 1500 may be various devices with which the controller 1500 may communicate to provide a user interface to construction personnel for operating and/or configuring the controller 1500 and/or various safety features of the safety truck, and/or for viewing video imagery captured by the one or more aforementioned cameras carried by the safety truck 1000. Such devices may include a combination of manually operable controls 1522 and a display 1525 that may be installed within the cab 1020 for operation by personnel located therein. The display 1525 may be any of a variety of types of display based on any of a variety of technologies, including and not limited to, LCD, OLED, EL, plasma, etc. In some embodiments, the controls 1522 may include any of a variety of mechanical manually operable controls, including and not limited to, rotary knobs, depressible buttons, rocker and/or lever switches, etc. Alternatively or additionally, the controls 1522 may include stationary touch-sensitive sensors and/or other forms of sensor capable of detecting contact by human digits, including and not limited to, capacitive, resistive and/or strain-gauge based touch-sensitive components. Also alternatively or additionally, the controls 1522 may include one or more touch-sensitive components that overlie the display 1525 such that the controls 1522 and the display 1525 are combined to form a touch-sensitive display.

As an alternative to, or in addition to, the combination of controls 1522 and the display 1525, such devices may alternatively or additionally include a remote control device 1593 that may be wirelessly linked to the controller 1500 to perform similar functions as the combination of controls 1522 and display 1525 while located either within the cab 1020, or elsewhere on or in the vicinity of the safety truck 1000. In some embodiments, the remote control device 1593 may include a hand-holdable remote control incorporating one or more manually operable controls (e.g., depressible buttons, etc.) that emits infrared and/or radio frequency signals to transceiver(s) 1590 of the controller 1500. In other embodiments, the remote control device 1593 may include a tablet computer, a smart phone or other portable processing device that may execute an application routine to provide a user interface for use by construction personnel to interact with the controller 1500.

Turning more specifically to FIG. 9F, the controller 1500 may be capable of drawing electric power from multiple sources, including an internal battery 1505, a battery 1055 of the safety truck 1000 (e.g., the battery normally employed in the operation of the engine of the safety truck 1000), and/or one or more generators 1050 of the safety truck 1000 (e.g., an alternator coupled to the engine of the safety truck 1000 and/or an entirely separate generator incorporated into the safety truck 1000 to power devices unrelated to the engine). As will be familiar to those skilled in the art, a safety truck maintained at a stationary position while operating an illuminated display to provide warnings to motorists typically requires an ongoing supply of electric power from either a battery (or other electric power storage device) of considerable capacity or an electric generator, such as a generator coupled to an engine (e.g., an internal combustion of the safety truck 1000) or a fuel cell.

However, as will also be familiar to those skilled in the art, the internal combustion engines employed in driving relatively large trucks are often ill suited to being used simply to provide electric power to electrical devices carried by such trucks. The large size of such engines usually results in inefficient consumption of fuel at a high rate, which can lead to complete depletion of a fuel tank within a single day or night. Also, such engines are typically designed with a presumption that there will be recurring access to an airflow arising from forward movement of the truck such that components thereof may tend to overheat and/or be damaged if operated for an extended period of time without access to such an airflow as a result of the truck remaining stationary throughout. Further, such inefficient fuel consumption and/or the overheating of one or more engine components can result in the emission of excessive levels of pollutants that may be cause such operation of a truck to violate emission regulations and/or laws.

In response to such issues, embodiments of the safety truck 1000 may incorporate an additional electric generator 1050 that operates entirely independently of the engine of the safety truck 1000. Such a generator may draw fuel from the same fuel tank as the engine that is used to drive the safety truck 1000, but may do so at a considerably reduced rate, while still providing the amount of electric power needed to operate the various safety features of the safety truck 1000. In some of such embodiments, such a generator may be provided with a fuel inlet within the shared fuel tank that is at a different elevation in comparison to the fuel inlet used by the engine of the safety truck 1000. Such a difference in elevation may be to allow the engine of the safety truck 1000 to fully drain the shared fuel tank, but to not allow the generator 1050 to do so. Thus, in a situation in which such an embodiment of the safety truck 1000 is used unattended overnight, the generator 1050 may drain the fuel tank to only a limited extent that still leaves an amount of fuel within the fuel tank that enables the engine of the safety truck 1000 to be used to drive to a location where more fuel may be obtained.

Regardless of what provision may be made for such a separate electric generator 1050 to be supplied with fuel, in some embodiments, such an electric generator may not run continuously to provide electric power to safety features of the safety truck 1000. Instead, such a separate electric generator 1050 may be triggered to generate electric power to recharge the battery 1055 in response to the voltage level of the battery 1055 falling below a predetermined voltage level. Such a generator 1050 may then continue to recharge the battery 1050 either until the voltage level thereof rises above another predetermined voltage level or until the amount of current flowing between the generator 1050 and the battery 1055 reaches a predetermined level indicative of the battery 1055 having been successfully recharged to a predetermined degree.

Regardless of what provision may be made for the availability of electric power from a generator, the controller 1500 may additionally include the internal battery 1505 to allow at least some functionality of the controller 1500 to continue for at least some amount of time without the provision of any electric power from any source external to the controller 1500. As will shortly be explained, this may be deemed desirable to enable the capture and recording of details of a vehicular collision for some amount of time after an embodiment of the safety truck 1000 has been parked and fully turned off.

The controller 1500 may include the internal battery 1505, a processor 1555, a clock circuit 1556, recording storage 1560, operational storage 1565, one or more accelerometers 1570, and/or one or more wireless transceivers 1590. The processor 1555 may be any of a variety of types of processor based on any of a variety of processing technologies, including and not limited to, a microcontroller, a sequencer, programmable gate array logic, a complex instruction set computing (CISC) processor, a reduced instruction set computing (RISC) processor, a highly parallel graphics processing unit (GPU), etc. The clock 1556 may be any of a variety of types of timing keeping, time delay or other device capable of monitoring and/or providing an indication of the elapsing of a selected amount of time.

The recording storage 1560 may include one or more storage devices based on any of a variety of storage technologies (or combination of storage technologies) that is capable of retaining at least some amount of data absent the ongoing provision of electric power (e.g., a non-volatile storage technology). In some embodiments, in response to the fact that the safety truck 1000 may be collided with by another vehicle, the recording storage 1560 may be at least partially implemented with a form of solid state non-volatile storage technology (e.g., NAND FLASH memory) to be more resistant to damage from a vehicular impact. The operating storage 1565 may include one or more storage devices based on any of a variety of storage technologies (or combination of storage technologies) that is capable of providing sufficient speed of access to data to enable the processor 1555 to perform various functions. As will be familiar to those skilled in the art, such storage technologies may include volatile storage technologies requiring an uninterrupted supply of electric power to retain data, such as any of a variety of types of random access memory (RAM).

As depicted, the recording storage 1560 may be used to store recorded audio/video 1531, including and not limited to, imagery captured by cameras and/or audio captured by microphones. The recording storage 1560 may also be used to store recorded data 1533, which may include any of a variety of forms of data other than captured audio and/or video. The capacity of the recording storage 1560 may be selected to enable multiple hours, multiple days and/or multiple weeks of data, such as captured audio and/or video to enable data associated with significant events (e.g., vehicular collisions) that may have occurred at some amount of time in the past to be retrieved. As also depicted, the operational storage 1565 may be used to store a control routine 1545 that includes executable instructions that are operable on the processor 1555 to cause the processor 1555 to perform various functions as will be described in greater detail. Alternatively or additionally, the operational storage 1565 may be used to store settings data 1535 the may include indications of various setting values that may control various aspects of the operations that the processor 1555 is caused by the control routine 1545 to perform, as will also be described in greater detail.

Each of the one or more accelerometers 1570 may be based on any of a variety of technologies for sensing changes in direction and/or magnitude of motion, including and not limited to micro-electromechanical systems (MEMS) technology. In some embodiments, multiple accelerometers 1570 may be employed in a configuration in which each is oriented differently from the others to sense a change in magnitude of motion (i.e., sense an acceleration or deceleration) along a different axis. In other embodiments, a single multi-dimensionally sensitive accelerometer 1570 may be used.

As has been discussed, a wide variety of differing wireless devices may be used in conjunction with various possible embodiments of the controller 1500. Thus, in some embodiments, more than the controller 1500 may incorporate more than one transceiver 1590 with each configured to engage in wireless communications using any of a variety of wireless communications technologies (e.g., infrared, ultrasound, radio frequency, etc.) within any of a variety of communications frequency bands and/or employing any of a variety of different communications protocols.

Turning to FIG. 9G, as previously discussed, the controller 1500 may be operated to cooperate with at least the cameras 1511, 1512, 1513, 1517, 1518 and/or 1519 to capture and then store imagery associated with conditions in the vicinity of an embodiment of the safety truck 1000, including conditions leading up to a vehicular collision with the safety truck 1000. As depicted, the processor 1555 may be caused, by its execution of the instructions of the control routine 1545, to receive imagery (e.g., motion video and/or still images) captured by one or more of the cameras 1511, 1512, 1513, 1517 and 1519, and to store that captured imagery as part of the recorded audio/video 1531 within the recorded storage 1560.

Alternatively or additionally, the processor 1555 may be similarly caused to store captured audio received through at least one transceiver 1590 from one or more of the headsets 1592. As previously discussed, the controller 1500 may be employed as a base station with which multiple ones of the headsets 1592 may exchange wireless signals conveying voice sounds, and through which those voice sounds may be retransmitted among the multiple headsets 1592 to enable bidirectional voice communications thereamong through the controller 1500. In so doing, the processor 1555 may be caused to recurringly engage in exchanges of various control signals and/or other protocol signals with one or more of the headsets 1592 to establish and/or maintain wireless links with each. Such exchanges may also include a pairing protocol by which the processor 1555 is caused to perform the pairing of each of the headsets 1592 with the controller 1500.

In addition to being caused to store captured audio and/or video, the processor 1555 may also be caused to store non-audio and/or non-video data provided by one or more other devices incorporated into an embodiment of the safety truck 1000 as the recorded data 1533. Such data storage may be performed at a recurring interval of time that may be selected to provide at least a desired minimal temporal granularity, while not tending to excessively consume the storage space provided by the recording storage 1560. Such data may include, and not be limited to, indications of the current time and/or date received from the clock 1556 (e.g., a recurringly updated timestamp), indications of any currently occurring accelerations of the safety truck 1000 as indicated by the one or more accelerometers 1570, indications of the current geographic location of the safety truck as provided by GPS satellites 991 through one or more transceivers 1590, and/or one or more indications of the current operating conditions of the safety truck 1000 as provided by one or more vehicle sensors 1004 through a connection to the vehicle bus 1005 (e.g., indications of current speed, current gear selection, current operation of the steering wheel, current engine revolutions per minute, current engagement of any of the brakes of the safety truck 1000, etc.).

The processor 1555 may also be caused to monitor for and receive indications of speeds detected by the speed detection radar 1528 that may be incorporated into the display board 1800. In some embodiments, the processor 1555 may simply be caused to also store such indications of detected speeds as part of the recorded data 1533. However, as depicted, in other embodiments, the processor 1555 may alternatively or additionally be caused to perform various processing operations on such indications of detected speeds using other data to adjust for the current speed and/or direction of travel of the safety truck. As will be familiar to those skilled in the art, an indication of a speed of another vehicle detected by the speed detection radar 1528 may, in truth, be an indication of the speed of that other vehicle relative to the safety truck 1000, and not relative to a roadway 999. As a result, at a time when the safety truck 1000 is also in motion, the indication of a detected speed provided by the speed detection radar 1528 may provide a misleading indication of how fast a vehicle is actually traveling relative to a roadway 999. The processor 1555 may be caused to use an indication of the current speed of the safety truck 1000 that is provided either by a speed sensor (i.e., one of the vehicle sensors 1004) of the safety truck 1000 through the vehicle bus 1005, or by employing a speed of the safety truck 1000 that is calculated from the rate of change in geographic positions indicated by GPS data received from GPS satellites 991 through appropriate configured transceiver(s) 1590. The processor 1555 may be caused to perform such corrective calculations of the speed of another vehicle on a recurring interval of time.

With such a corrected speed for another vehicle so derived, the processor 1555 may then combine the corrected vehicle speed with captured video of the other vehicle received from the camera 1518, which may be incorporated into the display board 1800 in a position and orientation relative to the speed detection radar 1528 that causes the fields of view of the camera 1518 and the radar 1528 to at least significantly overlap to the extent that there is at least a relatively high likelihood that a vehicle speed detected by the radar 1528 will be associated with the vehicle image captured by the camera 1518. To so combine the corrected vehicle speed with the captured video from the camera 1518, the processor 1550 may overlay a textual representation of the corrected vehicle speed onto frames of the image of the vehicle captured by the camera 1518. The processor 1555 may then store the captured video with the textual overlay as part of the recorded audio/video 1531.

In addition to recording audio, video and/or recurring indications of various pieces of data, the processor 1555 may also be caused to store an indication of when a vehicular collision involving the safety truck 1000 has occurred (e.g., a timestamp). In some embodiments, the processor 1555 may be triggered to store such an indication of such an event based on receiving an indication from the one or more accelerometers 1570 of the detection of an acceleration meeting one or more characteristics deemed consistent with such a collision (e.g., a predetermined threshold magnitude of acceleration, a threshold magnitude of rate of change in velocity and/or acceleration, a range of direction along which an acceleration consistent with a collision is expected to occur, etc.). The processor 1555 may be caused to store such a timestamp as part of the recorded audio/video 1531 and/or as part of the recorded data 1533. Regardless of the exact manner in which such a timestamp is recorded, the recordation of such a timestamp may be used by the processor 1555 to designate a portion of the recorded audio/video 1531 preceding and/or following the timestamp by predetermined amounts of time as a portion thereof that is not to be overwritten while continuing to record more captured audio and/or video.

As will be familiar to those skilled in the art, many audio/video recording systems employ a ring-buffer architecture in which the oldest data (e.g., the oldest recorded audio and/or video) within the buffer is always the data that is next to be overwritten when new data is received for storage. However, with an indication having been stored of when a vehicle collision has occurred, a portion of the recorded audio/video 1531 leading up to and/or following that timestamp is effectively removed from such treatment as part of a ring buffer, and may be retained until personnel provide an indication to the controller 1500 that it can be overwritten, and/or until a selected relatively lengthy period of time has elapsed (e.g., multiple weeks or months).

In addition to performing such recording operations, the processor 1555 may also be caused to operate the display device 1525 to display imagery (e.g., motion video and/or still images) captured from one or more of the cameras 1511, 1512, 1513, 1517, 1518 and 1519. Where captured imagery from more than one camera is to be displayed, the processor 1555 may be caused to arrange the imagery captured from each of multiple ones of these cameras in a tiled manner (e.g., two display regions side-by-side, four display regions arranged in a 2×2 array, etc.). In displaying the captured imagery received from the camera 1518, the processor 1555 may be caused to display such imagery with the overlain textual indication of the speed of an approaching vehicle. There may also be occasions where the processor 1555 may be caused to override a manual selection of which camera's captured imagery is to be displayed. By way of example, and as can be appreciated by comparing the relative positions of the cameras 1518 and 1519 depicted in FIGS. 9C and 9D, depending on whether or not the TMA unit 1900 is in its deployed or stowed position, one or the other of the cameras 1518 and 1519 may be prevented from effectively providing a view of the area behind the safety truck 1000. To address this, the processor 1555 may automatically switch between visually presenting captured imagery from the camera 1518 and visually presenting captured imagery from the camera 1519, depending at least on the position of the TMA 1900. By way of another example, where the processor 1555 receives an indication (e.g., from a sensor 1004 via the vehicle bus 1005) of the safety truck 1000 being driven in reverse and/or being prepared to be driven in reverse (e.g., where a shift lever of the transmission of the safety truck is detected to have been moved to select a reverse gear), the processor 1555 may automatically switch the view provided on the display 1525 to a view of the area behind the safety truck 1000 to enable the display 1525 to be used by a driver thereof to watch for obstacles behind the safety truck 1000.

Turning to FIG. 9H, as well as referring back to FIGS. 9A-B, as previously discussed the controller 1500 incorporated into each safety truck 1000 may be paired and/or otherwise configured to serve as a base station for a set of multiple headsets 1592 that are associated with it. However, such pairing and/or other configuration between controllers 1500 and sets of multiple headsets 1592 may result in a headset 1592 that has been paired and/or configured for use with the controller 1500 of one safety truck 1000 not being usable with the controller 1500 of another safety truck 1000. To address this, the controllers 1500 of each of the safety trucks 1000*a* through 1000*x* of a line of multiple safety trucks used to protect a worksite maybe be capable of being directly paired and/or otherwise configured to relay voice communications received from their respective headsets 1592 therebetween. In this way voice communications received by the controller 1500 of the rearmost safety truck 1000*a* from a headset 1592 associated therewith may be relayed to the controllers 1500 of each of the other safety trucks 1000*b* through 1000*x* of the line that they have formed to enable personnel wearing the headsets 1592 associated with the controllers 1500 of those other safety trucks 1000*b* through 1000*x* to hear those voice communications.

Alternatively or additionally, such pairing or other configuration of the controllers 1500 among the safety trucks 1000*a* through 1000*x* of the line formed thereamong may be used to relay an automatically generated warning of impending danger from one of these safety trucks to the others. More specifically, and by way of example, the processor 1555 of the controller 1500 within the rearmost safety truck 1000*a* may be caused to perform a calculation as each vehicle approaches the TMA unit 1900 of the rearmost safety truck 1000*a* to determine whether there is a sufficiently high probability of a collision about to be caused by that vehicle that an alarm or other indication should be provided to construction personnel.

In so performing each instance of such a calculation, the processor 1555 may be caused to retrieve a set of vehicle characteristics data that may include indications of various known minimum and/or maximum measures of various characteristics of vehicles, such as maximum rate of deceleration that can be achieved by typical braking systems, minimum amount of time required for a typical vehicle to change between lanes, etc. The processor 1555 may use such information as part of making a determination as to whether a vehicle approaching from directly behind the rearmost safety truck 1000*a* at a particular detected rate of speed will be able to stop or change lanes before colliding with the TMA 1900 carried by the safety truck 1000*a*.

Where the processor 1555 of the controller 1500 within the rearmost safety truck 1000*a* determines that it is at least relatively unlikely that a collision is able to be avoided, given typical vehicle characteristics, such that a collision caused by an approaching car is relatively likely to occur, the processor 1555 may present a visual warning on the display 1525 and/or on a display of the remote control device 1593, may provide an audio and/or visual warning in the vicinity of the rearmost safety truck 1000*a* by operating the horn 1003 to generate a warning sound and/or the lights 1002 to generate a visual warning, and/or may transmit a warning sound to the headsets 1592 that have been paired and/or otherwise configured to work directly with the controller 1500 of the safety truck 1000*a*. Alternatively or additionally, the processor 1555 of the controller 1500 of the safety truck 1000*a* may use the wireless communications established with the controllers 1500 of the other safety trucks 1000*b* through 1000*x* to relay a warning of the likely collision thereto. In turn, the processors 1555 of the controllers 1500 within each of the other safety trucks 1000*b* through 1000*x* may then provide similar audible and/or visual warnings to the construction personnel associated with the other safety trucks 1000*b* through 1000*x*.

As can be appreciated by those skilled in the art, the provision of a warning of an impending collision, even within a relatively brief time before the collision may aid in preventing injuries by affording personnel opportunities to pull limbs away from locations where injuries may occur, and/or to stop themselves from proceeding to perform an action that might result in injury when the collision occurs, such as unbuckling a safety belt. Alternatively or additionally, construction personnel standing alongside one of the safety trucks 1000*a* through 1000*x* who are given an audible warning via the horn 1003 or a headset 1592, and/or who are given a visual warning via the lights 1002 or the display device 1525, may be given the opportunity by such a warning to take at least a step or two away from the safety trucks 1000*a* through 1000*x* so as to ensure they are not in the path of any of the ones of the safety trucks 1000*a* through 1000*x*, which as previously described, may each be caused to roll some distance forward as a result of the collision. Especially of concern may be providing a warning that provides at least some opportunity to move away from positions between pairs of adjacent ones of the safety trucks 1000*a* through 1000*x* so as to avoid be caught thereby between when one or more of those trucks rolls forward.

Although the invention has been described in a preferred form with particularity, it is understood that the present disclosure of the preferred form has been made only by way of example, and that numerous changes in the details of construction and the combination and arrangement of parts may be resorted to without departing from the spirit and scope of the invention.

What is claimed is:

1. A flatbed safety truck, comprising:
   a) a forwardly-facing cab containing controls for driving the safety truck along a roadway surface;
   b) a rearwardly extending flatbed located behind the forwardly-facing cab, having a generally flat surface atop which roadway safety items including traffic delineators, components of roadway warning signs, components of traffic barriers and components of other safety devices may be transported for being placed atop and/or retrieved from the roadway surface;

c) an upstanding bulkhead structure interposed between the forwardly-facing cab and the rearwardly extending flatbed;

d) a pair of elongate, spaced apart, forwardly-rearwardly extending members that define a frame of the safety truck that is connected to and at least partially supporting the forwardly-facing cab, the upstanding bulkhead structure, and the rearwardly extending flatbed;

e) at least one forward connection point located forwardly with respect to the forward-rearwardly extending members, to which forward connection point attachments can be removably and interchangeably connected, including at least a rumble strip basket attachment; and f) at least one rearward connection point located rearwardly with respect to the forwardly-rearwardly extending members, to which rearward connection point attachments can be removably and interchangeably connected, including at least one of a step-bumper attachment to provide a stand-on surface extending at a level lower than the flatbed surface for assisting personnel to ascend to and to descend from the flatbed surface to and from the roadway surface, and a safety basket attachment to provide a stand-on surface extending at a level below the flatbed surface and above the roadway surface where personnel can be supported while performing activities atop the roadway surface.

2. The flatbed safety truck of claim 1 wherein either the safety truck or an attachment connected to at least one of the connection points includes a mechanism for selectively raising and lowering the stand-on surface of said attachment.

3. The flatbed safety truck of claim 1 wherein the upstanding bulkhead structure is also provided with at least one connection point to which attachments can be removably and interchangeably connected, including at least one of an over-cab rack, and a camera that monitors at least one of an area of the safety truck and an area of the roadway surface located in the vicinity of the safety truck.

4. The flatbed safety truck of claim 1 wherein the flatbed surface of the safety truck is provided with opposite left and right inset connection points located along the left and right sides of the flatbed surface, respectively, where man-basket attachments can be installed that each provide a stand-on surface that can support roadway personnel at a level below that of the flatbed surface and above that of the roadway surface.

5. The flatbed safety truck of claim 1 wherein the flatbed has at least one inset connection point located along the length of a selected one of the left and right sides of the flatbed at which a man-basket attachment is able to be connected to provide a stand-on surface situated at or below the height of the flatbed of the safety truck for supporting roadway construction or repair personnel for performing safety-related roadway tasks.

6. The flatbed safety truck of claim 5 wherein the man-basket attachment has a capability to raise and lower the stand-on surface to adjust its height between the heights of the flatbed surface and the roadway surface.

7. The flatbed safety truck of claim 5 wherein the man-basket attachment includes at least one of a throttle control to enable control of a speed of movement of the safety truck from within the man-basket attachment and a brake control to enable stopping of the safety truck from within the man-basket attachment.

8. The flatbed safety truck of claim 7 wherein the man-basket attachment includes a display to present images captured by a camera attachment of a portion of the roadway surface either in front of the safety truck or behind the safety truck to be displayed within the man-basket attachment.

9. The flatbed safety truck of claim 1 additionally including an over-cab rack attachment for transporting a plurality of side-by-side sets of nested traffic delineators.

10. The flatbed safety truck of claim 1 additionally including a sign cage attachment that is mountable atop either a forward connection point atop a forward portion of the flatbed or a rearward connection point atop a rearward portion of the flatbed.

11. The flatbed safety truck of claim 1 additionally including at least one weight attachment connected to the frame to increase the mass of the safety truck.

12. The flatbed safety truck of claim 1 additionally including an auxiliary electrical generator attachment connected to the safety truck at a location below the flatbed surface for supplying auxiliary electrical power to at least one of the safety truck and an attachment connected to the safety truck.

13. The flatbed safety truck of claim 1 additionally including a TMA unit connected to the rearward connection point to either extend rearwardly from the safety truck absorb kinetic energy of a vehicular crash, or to fold upwardly and forwardly for transport.

14. The flatbed safety truck of claim 1 additionally including a display board attachment carried by a support structure that positions the display board attachment to face rearwardly to cause information displayed thereon to be readable by drivers of vehicles located on the surface of the roadway behind the safety truck.

15. The flatbed safety truck of claim 14 wherein the support structure that carries the display board attachment is provided with a mechanism for selectively raising and lowering the display board attachment.

16. The flatbed safety truck of claim 14 wherein the support structure that carries the display board is connected to and supported by the frame at a location interposed between the forwardly-facing cab and the upstanding bulkhead.

17. The flatbed safety truck of claim 14 wherein the support structure that carries the display board is connected to the rearward connection point, and carries an additional connection point that enables a TMA unit to be connected thereto to either extend rearwardly from the safety truck absorb kinetic energy of a vehicular crash, or to fold upwardly and forwardly for transport.

18. The flatbed safety truck of claim 1 additionally including the rumble strip basket attachment releasably coupled to a selected one of the forward and rearward connection points.

* * * * *